(12) United States Patent  
Chiappetta

(10) Patent No.: US 8,972,052 B2
(45) Date of Patent: Mar. 3, 2015

(54) CELESTIAL NAVIGATION SYSTEM FOR AN AUTONOMOUS VEHICLE

(75) Inventor: Mark Joseph Chiappetta, Chelmsford, MA (US)

(73) Assignee: iRobot Corporation, Bedford, MA (US)

( * ) Notice: Subject to any disclaimer, the term of this patent is extended or adjusted under 35 U.S.C. 154(b) by 996 days.

(21) Appl. No.: 12/611,814

(22) Filed: Nov. 3, 2009

(65) Prior Publication Data

US 2010/0082193 A1    Apr. 1, 2010

Related U.S. Application Data

(63) Continuation-in-part of application No. 12/415,554, filed on Mar. 31, 2009, now Pat. No. 8,594,840, and a continuation-in-part of application No. 12/415,512, filed on Mar. 31, 2009, said application No. 12/415,554 is a continuation of application No. 11/176,048, filed on Jul. 7, 2005, now Pat. No. 7,706,917, said application No. 12/415,512 is a continuation of application No. 11/176,048.

(60) Provisional application No. 60/586,046, filed on Jul. 7, 2004.

(51) Int. Cl.
  *G06F 19/00* (2011.01)
  *G06F 17/00* (2006.01)
  *G05D 1/02* (2006.01)

(52) U.S. Cl.
  CPC .............. *G06F 17/00* (2013.01); *G05D 1/0225* (2013.01); *G05D 1/0242* (2013.01); *Y10S 901/01* (2013.01); *G05D 2201/0203* (2013.01)
  USPC .............................................. 700/245; 901/1

(58) Field of Classification Search
  USPC .................................................. 307/149, 104
  See application file for complete search history.

(56) References Cited

U.S. PATENT DOCUMENTS 1,755,054 A   4/1930   Darst
1,780,221 A  11/1930   Buchmann
(Continued)

FOREIGN PATENT DOCUMENTS

DE        2128842 C3   12/1980
DE        3317376 C2   12/1987
(Continued)

OTHER PUBLICATIONS

Kurs, A., et al., "Wireless Power Transfer via Strongly Coupled Magnetic Resonances," *Science*, vol. 317, pp. 83-86, Jul. 6, 2008.
(Continued)

*Primary Examiner* — Bhavesh V Amin
(74) *Attorney, Agent, or Firm* — Fish & Richardson P.C.

(57) ABSTRACT

A navigation control system for an autonomous vehicle comprises a transmitter and an autonomous vehicle. The transmitter comprises an emitter for emitting at least one signal, a power source for powering the emitter, a device for capturing wireless energy to charge the power source, and a printed circuit board for converting the captured wireless energy to a form for charging the power source. The autonomous vehicle operates within a working area and comprises a receiver for detecting the at least one signal emitted by the emitter, and a processor for determining a relative location of the autonomous vehicle within the working area based on the signal emitted by the emitter.

16 Claims, 27 Drawing Sheets

(56) References Cited

U.S. PATENT DOCUMENTS

| | | |
|---|---|---|
| 1,970,302 A | 8/1934 | Gerhardt |
| 2,136,324 A | 11/1938 | John |
| 2,302,111 A | 11/1942 | Dow et al. |
| 2,353,621 A | 7/1944 | Sav et al. |
| 2,770,825 A | 11/1956 | Pullen |
| 2,930,055 A | 3/1960 | Fallen et al. |
| 3,119,369 A | 1/1964 | Harland et al. |
| 3,166,138 A | 1/1965 | Dunn |
| 3,333,564 A | 8/1967 | Waters |
| 3,375,375 A | 3/1968 | Robert et al. |
| 3,381,652 A | 5/1968 | Schaefer et al. |
| 3,457,575 A | 7/1969 | Bienek |
| 3,550,714 A | 12/1970 | Bellinger |
| 3,569,727 A | 3/1971 | Aggarwal et al. |
| 3,649,981 A | 3/1972 | Woodworth |
| 3,674,316 A | 7/1972 | De Brey |
| 3,678,882 A | 7/1972 | Kinsella |
| 3,690,559 A | 9/1972 | Rudloff |
| 3,744,586 A | 7/1973 | Leinauer |
| 3,756,667 A | 9/1973 | Bombardier et al. |
| 3,809,004 A | 5/1974 | Leonheart |
| 3,816,004 A | 6/1974 | Bignardi |
| 3,845,831 A | 11/1974 | James |
| RE28,268 E | 12/1974 | Autrand |
| 3,851,349 A | 12/1974 | Lowder |
| 3,853,086 A | 12/1974 | Asplund |
| 3,863,285 A | 2/1975 | Hukuba |
| 3,888,181 A | 6/1975 | Kups |
| 3,937,174 A | 2/1976 | Haaga |
| 3,952,361 A | 4/1976 | Wilkins |
| 3,989,311 A | 11/1976 | Debrey |
| 3,989,931 A | 11/1976 | Phillips |
| 4,004,313 A | 1/1977 | Capra |
| 4,012,681 A | 3/1977 | Finger et al. |
| 4,070,170 A | 1/1978 | Leinfelt |
| 4,099,284 A | 7/1978 | Shinozaki et al. |
| 4,119,900 A | 10/1978 | Kremnitz |
| 4,175,589 A | 11/1979 | Nakamura et al. |
| 4,175,892 A | 11/1979 | De Brey |
| 4,196,727 A | 4/1980 | Verkaart et al. |
| 4,198,727 A | 4/1980 | Farmer |
| 4,199,838 A | 4/1980 | Simonsson |
| 4,209,254 A | 6/1980 | Reymond et al. |
| D258,901 S | 4/1981 | Keyworth |
| 4,297,578 A | 10/1981 | Carter |
| 4,305,234 A | 12/1981 | Pichelman |
| 4,306,329 A | 12/1981 | Yokoi |
| 4,309,758 A | 1/1982 | Halsall et al. |
| 4,328,545 A | 5/1982 | Halsall et al. |
| 4,367,403 A | 1/1983 | Miller |
| 4,369,543 A | 1/1983 | Chen et al. |
| 4,401,909 A | 8/1983 | Gorsek |
| 4,416,033 A | 11/1983 | Specht |
| 4,445,245 A | 5/1984 | Lu |
| 4,465,370 A | 8/1984 | Yuasa et al. |
| 4,477,998 A | 10/1984 | You |
| 4,481,692 A | 11/1984 | Kurz |
| 4,482,960 A | 11/1984 | Pryor |
| 4,492,058 A | 1/1985 | Goldfarb et al. |
| 4,513,469 A | 4/1985 | Godfrey et al. |
| D278,732 S | 5/1985 | Ohkado |
| 4,518,437 A | 5/1985 | Sommer |
| 4,534,637 A | 8/1985 | Suzuki et al. |
| 4,556,313 A | 12/1985 | Miller et al. |
| 4,575,211 A | 3/1986 | Matsumura et al. |
| 4,580,311 A | 4/1986 | Kurz |
| 4,601,082 A | 7/1986 | Kurz |
| 4,618,213 A | 10/1986 | Chen |
| 4,620,285 A | 10/1986 | Perdue |
| 4,624,026 A | 11/1986 | Olson et al. |
| 4,626,995 A | 12/1986 | Lofgren et al. |
| 4,628,454 A | 12/1986 | Ito |
| 4,638,445 A * | 1/1987 | Mattaboni .................. 701/23 |
| 4,644,156 A | 2/1987 | Takahashi et al. |
| 4,649,504 A | 3/1987 | Krouglicof et al. |
| 4,652,917 A | 3/1987 | Miller |
| 4,654,492 A | 3/1987 | Koerner et al. |
| 4,654,924 A | 4/1987 | Getz et al. |
| 4,660,969 A | 4/1987 | Sorimachi et al. |
| 4,662,854 A | 5/1987 | Fang |
| 4,674,048 A | 6/1987 | Okumura |
| 4,679,152 A | 7/1987 | Perdue |
| 4,680,827 A | 7/1987 | Hummel |
| 4,696,074 A | 9/1987 | Cavalli |
| D292,223 S | 10/1987 | Trumbull |
| 4,700,301 A | 10/1987 | Dyke |
| 4,700,427 A | 10/1987 | Knepper |
| 4,703,820 A | 11/1987 | Reinaud |
| 4,709,773 A | 12/1987 | Clement et al. |
| 4,710,020 A | 12/1987 | Maddox et al. |
| 4,712,740 A | 12/1987 | Duncan et al. |
| 4,716,621 A | 1/1988 | Zoni |
| 4,728,801 A | 3/1988 | O'Connor |
| 4,733,343 A | 3/1988 | Yoneda et al. |
| 4,733,430 A | 3/1988 | Westergren |
| 4,733,431 A | 3/1988 | Martin |
| 4,735,136 A | 4/1988 | Lee et al. |
| 4,735,138 A | 4/1988 | Gawler et al. |
| 4,748,336 A | 5/1988 | Fujie et al. |
| 4,748,833 A | 6/1988 | Nagasawa |
| 4,756,049 A | 7/1988 | Uehara |
| 4,767,213 A | 8/1988 | Hummel |
| 4,769,700 A | 9/1988 | Pryor |
| 4,777,416 A | 10/1988 | George et al. |
| D298,766 S | 11/1988 | Tanno et al. |
| 4,782,550 A | 11/1988 | Jacobs |
| 4,796,198 A | 1/1989 | Boultinghouse et al. |
| 4,806,751 A | 2/1989 | Abe et al. |
| 4,811,228 A | 3/1989 | Hyyppa |
| 4,813,906 A | 3/1989 | Matsuyama et al. |
| 4,815,157 A | 3/1989 | Tsuchiya |
| 4,817,000 A | 3/1989 | Eberhardt |
| 4,818,875 A | 4/1989 | Weiner |
| 4,829,442 A | 5/1989 | Kadonoff et al. |
| 4,829,626 A | 5/1989 | Harkonen et al. |
| 4,832,098 A | 5/1989 | Palinkas et al. |
| 4,851,661 A | 7/1989 | Everett |
| 4,854,000 A | 8/1989 | Takimoto |
| 4,854,006 A | 8/1989 | Nishimura et al. |
| 4,855,915 A | 8/1989 | Dallaire |
| 4,857,912 A | 8/1989 | Everett et al. |
| 4,858,132 A | 8/1989 | Holmquist |
| 4,867,570 A | 9/1989 | Sorimachi et al. |
| 4,880,474 A | 11/1989 | Koharagi et al. |
| 4,887,415 A | 12/1989 | Martin |
| 4,891,762 A | 1/1990 | Chotiros |
| 4,893,025 A | 1/1990 | Lee |
| 4,901,394 A | 2/1990 | Nakamura et al. |
| 4,905,151 A | 2/1990 | Weiman et al. |
| 4,909,972 A | 3/1990 | Britz |
| 4,912,643 A | 3/1990 | Beirne |
| 4,918,441 A | 4/1990 | Bohman |
| 4,919,224 A | 4/1990 | Shyu et al. |
| 4,919,489 A | 4/1990 | Kopsco |
| 4,920,060 A | 4/1990 | Parrent et al. |
| 4,920,605 A | 5/1990 | Takashima |
| 4,933,864 A | 6/1990 | Evans et al. |
| 4,937,912 A | 7/1990 | Kurz |
| 4,953,253 A | 9/1990 | Fukuda et al. |
| 4,954,962 A | 9/1990 | Evans et al. |
| 4,955,714 A | 9/1990 | Stotler et al. |
| 4,956,891 A | 9/1990 | Wulff |
| 4,961,303 A | 10/1990 | McCarty et al. |
| 4,961,304 A | 10/1990 | Ovsborn et al. |
| 4,962,453 A | 10/1990 | Pong et al. |
| 4,967,862 A | 11/1990 | Pong et al. |
| 4,971,591 A | 11/1990 | Raviv et al. |
| 4,973,912 A | 11/1990 | Kaminski et al. |
| 4,974,283 A | 12/1990 | Holsten et al. |
| 4,977,618 A | 12/1990 | Allen |
| 4,977,639 A | 12/1990 | Takahashi et al. |
| 4,986,663 A | 1/1991 | Cecchi et al. |
| 5,001,635 A | 3/1991 | Yasutomi et al. |
| 5,002,145 A | 3/1991 | Wakaumi et al. |

(56) References Cited

U.S. PATENT DOCUMENTS

| | | |
|---|---|---|
| 5,012,886 A | 5/1991 | Jonas et al. |
| 5,018,240 A | 5/1991 | Holman |
| 5,020,186 A | 6/1991 | Lessig et al. |
| 5,022,812 A | 6/1991 | Coughlan et al. |
| 5,023,788 A | 6/1991 | Kitazume et al. |
| 5,024,529 A | 6/1991 | Svetkoff et al. |
| D318,500 S | 7/1991 | Malewicki et al. |
| 5,032,775 A | 7/1991 | Mizuno et al. |
| 5,033,151 A | 7/1991 | Kraft et al. |
| 5,033,291 A | 7/1991 | Podoloff et al. |
| 5,040,116 A | 8/1991 | Evans et al. |
| 5,045,769 A | 9/1991 | Everett |
| 5,049,802 A | 9/1991 | Mintus et al. |
| 5,051,906 A | 9/1991 | Evans et al. |
| 5,062,819 A | 11/1991 | Mallory |
| 5,070,567 A | 12/1991 | Holland |
| 5,084,934 A | 2/1992 | Lessig et al. |
| 5,086,535 A | 2/1992 | Grossmeyer et al. |
| 5,090,321 A | 2/1992 | Abouav |
| 5,093,955 A | 3/1992 | Blehert et al. |
| 5,094,311 A | 3/1992 | Akeel |
| 5,098,262 A | 3/1992 | Wecker et al. |
| 5,105,502 A | 4/1992 | Takashima |
| 5,105,550 A | 4/1992 | Shenoha |
| 5,109,566 A | 5/1992 | Kobayashi et al. |
| 5,111,401 A | 5/1992 | Everett, Jr. et al. |
| 5,115,538 A | 5/1992 | Cochran et al. |
| 5,127,128 A | 7/1992 | Lee |
| 5,136,675 A | 8/1992 | Hodson |
| 5,136,750 A | 8/1992 | Takashima et al. |
| 5,142,985 A | 9/1992 | Stearns et al. |
| 5,144,471 A | 9/1992 | Takanashi et al. |
| 5,144,714 A | 9/1992 | Mori et al. |
| 5,144,715 A | 9/1992 | Matsuyo et al. |
| 5,152,028 A | 10/1992 | Hirano |
| 5,152,202 A | 10/1992 | Strauss |
| 5,155,684 A | 10/1992 | Burke et al. |
| 5,163,202 A | 11/1992 | Kawakami et al. |
| 5,163,320 A | 11/1992 | Goshima et al. |
| 5,164,579 A | 11/1992 | Pryor et al. |
| 5,165,064 A | 11/1992 | Mattaboni |
| 5,170,352 A | 12/1992 | McTamaney et al. |
| 5,173,881 A | 12/1992 | Sindle |
| 5,182,833 A | 2/1993 | Yamaguchi et al. |
| 5,187,662 A | 2/1993 | Kamimura et al. |
| 5,202,742 A | 4/1993 | Frank et al. |
| 5,204,814 A | 4/1993 | Noonan et al. |
| 5,206,500 A | 4/1993 | Decker et al. |
| 5,208,521 A | 5/1993 | Aoyama |
| 5,216,777 A | 6/1993 | Moro et al. |
| 5,222,786 A | 6/1993 | Sovis et al. |
| 5,227,985 A | 7/1993 | DeMenthon |
| 5,233,682 A | 8/1993 | Abe et al. |
| 5,239,720 A | 8/1993 | Wood et al. |
| 5,251,358 A | 10/1993 | Moro et al. |
| 5,261,139 A | 11/1993 | Lewis |
| 5,276,618 A | 1/1994 | Everett |
| 5,276,939 A | 1/1994 | Uenishi |
| 5,277,064 A | 1/1994 | Knigga et al. |
| 5,279,672 A | 1/1994 | Betker et al. |
| 5,284,452 A | 2/1994 | Corona |
| 5,284,522 A | 2/1994 | Kobayashi et al. |
| 5,293,955 A | 3/1994 | Lee |
| D345,707 S | 4/1994 | Alister |
| 5,303,448 A | 4/1994 | Hennessey et al. |
| 5,307,273 A | 4/1994 | Oh et al. |
| 5,309,592 A | 5/1994 | Hiratsuka |
| 5,310,379 A | 5/1994 | Hippely et al. |
| 5,315,227 A | 5/1994 | Pierson et al. |
| 5,319,827 A | 6/1994 | Yang |
| 5,319,828 A | 6/1994 | Waldhauser et al. |
| 5,321,614 A | 6/1994 | Ashworth |
| 5,323,483 A | 6/1994 | Baeg |
| 5,324,948 A | 6/1994 | Dudar et al. |
| 5,331,713 A | 7/1994 | Tipton |
| 5,341,186 A | 8/1994 | Kato |
| 5,341,540 A | 8/1994 | Soupert et al. |
| 5,341,549 A | 8/1994 | Wirtz et al. |
| 5,345,649 A | 9/1994 | Whitlow |
| 5,352,901 A | 10/1994 | Poorman |
| 5,353,224 A | 10/1994 | Lee et al. |
| 5,363,305 A | 11/1994 | Cox et al. |
| 5,363,935 A | 11/1994 | Schempf et al. |
| 5,369,347 A | 11/1994 | Yoo |
| 5,369,838 A | 12/1994 | Wood et al. |
| 5,386,862 A | 2/1995 | Glover et al. |
| 5,399,951 A | 3/1995 | Lavallee et al. |
| 5,400,244 A | 3/1995 | Watanabe et al. |
| 5,404,612 A | 4/1995 | Ishikawa |
| 5,410,479 A | 4/1995 | Coker |
| 5,435,405 A | 7/1995 | Schempf et al. |
| 5,440,216 A | 8/1995 | Kim |
| 5,442,358 A | 8/1995 | Keeler et al. |
| 5,444,965 A | 8/1995 | Colens |
| 5,446,356 A | 8/1995 | Kim |
| 5,446,445 A | 8/1995 | Bloomfield et al. |
| 5,451,135 A | 9/1995 | Schempf et al. |
| 5,454,129 A | 10/1995 | Kell |
| 5,455,982 A | 10/1995 | Armstrong et al. |
| 5,465,525 A | 11/1995 | Mifune et al. |
| 5,465,619 A | 11/1995 | Sotack et al. |
| 5,467,273 A | 11/1995 | Faibish et al. |
| 5,471,560 A | 11/1995 | Allard et al. |
| 5,491,670 A | 2/1996 | Weber |
| 5,497,529 A | 3/1996 | Boesi |
| 5,498,948 A | 3/1996 | Bruni et al. |
| 5,502,638 A | 3/1996 | Takenaka |
| 5,505,072 A | 4/1996 | Oreper |
| 5,507,067 A | 4/1996 | Hoekstra et al. |
| 5,510,893 A | 4/1996 | Suzuki |
| 5,511,147 A | 4/1996 | Abdel |
| 5,515,572 A | 5/1996 | Hoekstra et al. |
| 5,534,762 A | 7/1996 | Kim |
| 5,535,476 A | 7/1996 | Kresse et al. |
| 5,537,017 A | 7/1996 | Feiten et al. |
| 5,537,711 A | 7/1996 | Tseng |
| 5,539,953 A | 7/1996 | Kurz |
| 5,542,146 A | 8/1996 | Hoekstra et al. |
| 5,542,148 A | 8/1996 | Young |
| 5,546,631 A | 8/1996 | Chambon |
| 5,548,511 A | 8/1996 | Bancroft |
| 5,551,119 A | 9/1996 | Worwag |
| 5,551,525 A | 9/1996 | Pack et al. |
| 5,553,349 A | 9/1996 | Kilstrom et al. |
| 5,555,587 A | 9/1996 | Guha |
| 5,560,077 A | 10/1996 | Crotchett |
| 5,568,589 A | 10/1996 | Hwang |
| D375,592 S | 11/1996 | Ljunggren |
| 5,608,306 A | 3/1997 | Rybeck et al. |
| 5,608,894 A | 3/1997 | Kawakami et al. |
| 5,608,944 A | 3/1997 | Gordon |
| 5,610,488 A | 3/1997 | Miyazawa |
| 5,611,106 A | 3/1997 | Wulff |
| 5,611,108 A | 3/1997 | Knowlton et al. |
| 5,613,261 A | 3/1997 | Kawakami et al. |
| 5,613,269 A | 3/1997 | Miwa |
| 5,621,291 A | 4/1997 | Lee |
| 5,622,236 A | 4/1997 | Azumi et al. |
| 5,634,237 A | 6/1997 | Paranjpe |
| 5,634,239 A | 6/1997 | Tuvin et al. |
| 5,636,402 A | 6/1997 | Kubo et al. |
| 5,642,299 A | 6/1997 | Hardin et al. |
| 5,646,494 A | 7/1997 | Han |
| 5,647,554 A | 7/1997 | Ikegami et al. |
| 5,650,702 A | 7/1997 | Azumi |
| 5,652,489 A | 7/1997 | Kawakami |
| 5,682,313 A | 10/1997 | Edlund et al. |
| 5,682,839 A | 11/1997 | Grimsley et al. |
| 5,696,675 A | 12/1997 | Nakamura et al. |
| 5,698,861 A | 12/1997 | Oh |
| 5,709,007 A | 1/1998 | Chiang |
| 5,710,506 A | 1/1998 | Broell et al. |
| 5,714,119 A | 2/1998 | Kawagoe et al. |
| 5,717,169 A | 2/1998 | Liang et al. |

(56) References Cited

U.S. PATENT DOCUMENTS

| | | |
|---|---|---|
| 5,717,484 A | 2/1998 | Hamaguchi et al. |
| 5,720,077 A | 2/1998 | Nakamura et al. |
| 5,732,401 A | 3/1998 | Conway |
| 5,735,017 A | 4/1998 | Barnes et al. |
| 5,735,959 A | 4/1998 | Kubo et al. |
| 5,742,975 A | 4/1998 | Knowlton et al. |
| 5,745,235 A | 4/1998 | Vercammen et al. |
| 5,752,871 A | 5/1998 | Tsuzuki |
| 5,756,904 A | 5/1998 | Oreper et al. |
| 5,761,762 A | 6/1998 | Kubo |
| 5,764,888 A | 6/1998 | Bolan et al. |
| 5,767,437 A | 6/1998 | Rogers |
| 5,767,960 A | 6/1998 | Orman |
| 5,770,936 A * | 6/1998 | Hirai et al. .................. 318/538 |
| 5,777,596 A | 7/1998 | Herbert |
| 5,778,486 A | 7/1998 | Kim |
| 5,781,697 A | 7/1998 | Jeong |
| 5,781,960 A | 7/1998 | Kilstrom et al. |
| 5,784,755 A | 7/1998 | Karr et al. |
| 5,786,602 A | 7/1998 | Pryor et al. |
| 5,787,545 A | 8/1998 | Colens |
| 5,793,900 A | 8/1998 | Nourbakhsh et al. |
| 5,794,297 A | 8/1998 | Muta |
| 5,802,665 A | 9/1998 | Knowlton et al. |
| 5,812,267 A | 9/1998 | Everett et al. |
| 5,814,808 A | 9/1998 | Takada et al. |
| 5,815,880 A | 10/1998 | Nakanishi |
| 5,815,884 A | 10/1998 | Imamura et al. |
| 5,819,008 A | 10/1998 | Asama et al. |
| 5,819,360 A | 10/1998 | Fujii |
| 5,819,936 A | 10/1998 | Saveliev et al. |
| 5,820,821 A | 10/1998 | Kawagoe et al. |
| 5,821,730 A | 10/1998 | Drapkin |
| 5,825,981 A | 10/1998 | Matsuda |
| 5,828,770 A | 10/1998 | Leis et al. |
| 5,831,597 A | 11/1998 | West et al. |
| 5,836,045 A | 11/1998 | Anthony et al. |
| 5,839,156 A | 11/1998 | Park et al. |
| 5,839,532 A | 11/1998 | Yoshiji et al. |
| 5,841,259 A | 11/1998 | Kim et al. |
| 5,867,800 A | 2/1999 | Leif |
| 5,867,861 A | 2/1999 | Kasen et al. |
| 5,869,910 A | 2/1999 | Colens |
| 5,894,621 A | 4/1999 | Kubo |
| 5,896,611 A | 4/1999 | Haaga |
| 5,903,124 A | 5/1999 | Kawakami |
| 5,905,209 A | 5/1999 | Oreper |
| 5,907,886 A | 6/1999 | Buscher |
| 5,910,700 A | 6/1999 | Crotzer |
| 5,911,260 A | 6/1999 | Suzuki |
| 5,916,008 A | 6/1999 | Wong |
| 5,924,167 A | 7/1999 | Wright et al. |
| 5,926,909 A | 7/1999 | McGee |
| 5,933,102 A | 8/1999 | Miller et al. |
| 5,933,913 A | 8/1999 | Wright et al. |
| 5,935,179 A | 8/1999 | Kleiner et al. |
| 5,935,333 A | 8/1999 | Davis |
| 5,940,346 A | 8/1999 | Sadowsky et al. |
| 5,940,927 A | 8/1999 | Haegermarck et al. |
| 5,940,930 A | 8/1999 | Oh et al. |
| 5,942,869 A | 8/1999 | Katou et al. |
| 5,943,730 A | 8/1999 | Boomgaarden |
| 5,943,733 A | 8/1999 | Tagliaferri |
| 5,943,933 A | 8/1999 | Evans et al. |
| 5,947,225 A | 9/1999 | Kawakami et al. |
| 5,950,408 A | 9/1999 | Schaedler |
| 5,959,423 A | 9/1999 | Nakanishi et al. |
| 5,968,281 A | 10/1999 | Wright et al. |
| 5,974,348 A | 10/1999 | Rocks |
| 5,974,365 A | 10/1999 | Mitchell |
| 5,983,448 A | 11/1999 | Wright et al. |
| 5,984,880 A | 11/1999 | Lander et al. |
| 5,987,383 A | 11/1999 | Keller et al. |
| 5,989,700 A | 11/1999 | Krivopal |
| 5,991,951 A | 11/1999 | Kubo et al. |
| 5,995,883 A | 11/1999 | Nishikado |
| 5,995,884 A | 11/1999 | Allen et al. |
| 5,996,167 A | 12/1999 | Close |
| 5,998,953 A | 12/1999 | Nakamura et al. |
| 5,998,971 A | 12/1999 | Corbridge |
| 6,000,088 A | 12/1999 | Wright et al. |
| 6,009,358 A | 12/1999 | Angott et al. |
| 6,012,618 A | 1/2000 | Matsuo |
| 6,021,545 A | 2/2000 | Delgado et al. |
| 6,023,813 A | 2/2000 | Thatcher et al. |
| 6,023,814 A | 2/2000 | Imamura |
| 6,025,687 A | 2/2000 | Himeda et al. |
| 6,026,539 A | 2/2000 | Mouw et al. |
| 6,030,464 A | 2/2000 | Azevedo |
| 6,030,465 A | 2/2000 | Marcussen et al. |
| 6,032,327 A | 3/2000 | Oka et al. |
| 6,032,542 A | 3/2000 | Warnick et al. |
| 6,036,572 A | 3/2000 | Sze |
| 6,038,501 A | 3/2000 | Kawakami |
| 6,040,669 A | 3/2000 | Hog |
| 6,041,471 A | 3/2000 | Charky et al. |
| 6,041,472 A | 3/2000 | Kasen et al. |
| 6,046,800 A | 4/2000 | Ohtomo et al. |
| 6,049,620 A | 4/2000 | Dickinson et al. |
| 6,050,648 A | 4/2000 | Keleny |
| 6,052,821 A | 4/2000 | Chouly et al. |
| 6,055,042 A | 4/2000 | Sarangapani |
| 6,055,702 A | 5/2000 | Imamura et al. |
| 6,061,868 A | 5/2000 | Moritsch et al. |
| 6,065,182 A | 5/2000 | Wright et al. |
| 6,070,290 A | 6/2000 | Schwarze et al. |
| 6,073,432 A | 6/2000 | Schaedler |
| 6,076,025 A | 6/2000 | Ueno et al. |
| 6,076,026 A | 6/2000 | Jambhekar et al. |
| 6,076,226 A | 6/2000 | Reed |
| 6,076,227 A | 6/2000 | Schallig et al. |
| 6,081,257 A | 6/2000 | Zeller |
| 6,088,020 A | 7/2000 | Mor |
| 6,094,775 A | 8/2000 | Behmer |
| 6,099,091 A | 8/2000 | Campbell |
| 6,101,670 A | 8/2000 | Song |
| 6,101,671 A | 8/2000 | Wright et al. |
| 6,108,031 A | 8/2000 | King et al. |
| 6,108,067 A | 8/2000 | Okamoto |
| 6,108,076 A | 8/2000 | Hanseder |
| 6,108,269 A | 8/2000 | Kabel |
| 6,108,597 A | 8/2000 | Kirchner et al. |
| 6,108,859 A | 8/2000 | Burgoon |
| 6,112,143 A | 8/2000 | Allen et al. |
| 6,112,996 A | 9/2000 | Matsuo |
| 6,119,057 A | 9/2000 | Kawagoe |
| 6,122,798 A | 9/2000 | Kobayashi et al. |
| 6,124,694 A | 9/2000 | Bancroft et al. |
| 6,125,498 A | 10/2000 | Roberts et al. |
| 6,131,237 A | 10/2000 | Kasper et al. |
| 6,138,063 A | 10/2000 | Himeda |
| 6,142,252 A | 11/2000 | Kinto et al. |
| 6,146,041 A | 11/2000 | Chen et al. |
| 6,146,278 A | 11/2000 | Kobayashi |
| 6,154,279 A | 11/2000 | Thayer |
| 6,154,694 A | 11/2000 | Aoki et al. |
| 6,160,479 A | 12/2000 | Ahlen et al. |
| 6,167,332 A | 12/2000 | Kurtzberg et al. |
| 6,167,587 B1 | 1/2001 | Kasper et al. |
| 6,192,548 B1 | 2/2001 | Huffman |
| 6,192,549 B1 | 2/2001 | Kasen et al. |
| 6,202,243 B1 | 3/2001 | Beaufoy et al. |
| 6,216,307 B1 | 4/2001 | Kaleta et al. |
| 6,220,865 B1 | 4/2001 | Macri et al. |
| 6,226,830 B1 | 5/2001 | Hendriks et al. |
| 6,230,362 B1 | 5/2001 | Kasper et al. |
| 6,237,741 B1 | 5/2001 | Guidetti |
| 6,240,342 B1 | 5/2001 | Fiegert et al. |
| 6,243,913 B1 | 6/2001 | Frank et al. |
| 6,255,793 B1 | 7/2001 | Peless et al. |
| 6,259,979 B1 | 7/2001 | Holmquist |
| 6,261,379 B1 | 7/2001 | Conrad et al. |
| 6,263,539 B1 | 7/2001 | Baig |
| 6,263,989 B1 | 7/2001 | Won |

(56) References Cited

U.S. PATENT DOCUMENTS

| | | | |
|---|---|---|---|
| 6,272,936 B1 | 8/2001 | Oreper et al. | |
| 6,276,478 B1 | 8/2001 | Hopkins et al. | |
| 6,278,918 B1 | 8/2001 | Dickson et al. | |
| 6,279,196 B2 | 8/2001 | Kasen et al. | |
| 6,282,526 B1 | 8/2001 | Ganesh | |
| 6,283,034 B1 | 9/2001 | Miles | |
| 6,285,778 B1 | 9/2001 | Nakajima et al. | |
| 6,285,930 B1 | 9/2001 | Dickson et al. | |
| 6,286,181 B1 | 9/2001 | Kasper et al. | |
| 6,300,737 B1 | 10/2001 | Bergvall et al. | |
| 6,321,337 B1 | 11/2001 | Reshef et al. | |
| 6,321,515 B1 | 11/2001 | Colens | |
| 6,323,570 B1 | 11/2001 | Nishimura et al. | |
| 6,324,714 B1 | 12/2001 | Walz et al. | |
| 6,327,741 B1 | 12/2001 | Reed | |
| 6,332,400 B1 | 12/2001 | Meyer | |
| 6,339,735 B1 | 1/2002 | Peless et al. | |
| 6,362,875 B1 | 3/2002 | Burkley | |
| 6,370,453 B2 | 4/2002 | Sommer | |
| 6,374,155 B1 | 4/2002 | Wallach et al. | |
| 6,374,157 B1 | 4/2002 | Takamura | |
| 6,381,802 B2 | 5/2002 | Park | |
| 6,385,515 B1 | 5/2002 | Dickson et al. | |
| 6,388,013 B1 | 5/2002 | Saraf et al. | |
| 6,389,329 B1 | 5/2002 | Colens | |
| 6,397,429 B1 | 6/2002 | Legatt et al. | |
| 6,400,048 B1 | 6/2002 | Nishimura et al. | |
| 6,401,294 B2 | 6/2002 | Kasper | |
| 6,408,226 B1 | 6/2002 | Byrne et al. | |
| 6,412,141 B2 | 7/2002 | Kasper et al. | |
| 6,415,203 B1 | 7/2002 | Inoue et al. | |
| 6,418,586 B2 | 7/2002 | Fulghum | |
| 6,421,870 B1 | 7/2002 | Basham et al. | |
| 6,427,285 B1 | 8/2002 | Legatt et al. | |
| 6,430,471 B1 | 8/2002 | Kintou et al. | |
| 6,431,296 B1 | 8/2002 | Won | |
| 6,437,227 B1 | 8/2002 | Theimer | |
| 6,437,465 B1 | 8/2002 | Nishimura et al. | |
| 6,438,456 B1 | 8/2002 | Feddema et al. | |
| 6,438,793 B1 | 8/2002 | Miner et al. | |
| 6,442,476 B1 | 8/2002 | Poropat | |
| 6,442,789 B1 | 9/2002 | Legatt et al. | |
| 6,443,509 B1 | 9/2002 | Levin et al. | |
| 6,444,003 B1 | 9/2002 | Sutcliffe | |
| 6,446,302 B1 | 9/2002 | Kasper et al. | |
| 6,454,036 B1 | 9/2002 | Airey et al. | |
| D464,091 S | 10/2002 | Christianson | |
| 6,457,206 B1 | 10/2002 | Judson | |
| 6,459,955 B1 | 10/2002 | Bartsch et al. | |
| 6,463,368 B1 | 10/2002 | Feiten et al. | |
| 6,465,982 B1 | 10/2002 | Bergvall et al. | |
| 6,473,167 B1 | 10/2002 | Odell | |
| 6,480,762 B1 | 11/2002 | Uchikubo et al. | |
| 6,481,515 B1 | 11/2002 | Kirkpatrick et al. | |
| 6,482,252 B1 | 11/2002 | Conrad et al. | |
| 6,490,539 B1 | 12/2002 | Dickson et al. | |
| 6,491,127 B1 | 12/2002 | Holmberg et al. | |
| 6,493,612 B1 | 12/2002 | Bisset et al. | |
| 6,493,613 B2 | 12/2002 | Peless et al. | |
| 6,496,754 B2 | 12/2002 | Song et al. | |
| 6,496,755 B2 | 12/2002 | Wallach et al. | |
| 6,502,657 B2 | 1/2003 | Kerrebrock et al. | |
| 6,504,610 B1 | 1/2003 | Bauer et al. | |
| 6,507,773 B2 | 1/2003 | Parker et al. | |
| 6,519,808 B2 | 2/2003 | Legatt et al. | |
| 6,525,509 B1 | 2/2003 | Petersson et al. | |
| D471,243 S | 3/2003 | Cioffi et al. | |
| 6,530,102 B1 | 3/2003 | Pierce et al. | |
| 6,530,117 B2 | 3/2003 | Peterson | |
| 6,532,404 B2 | 3/2003 | Colens | |
| 6,535,793 B2 | 3/2003 | Allard | |
| 6,540,424 B1 | 4/2003 | Hall et al. | |
| 6,540,607 B2 | 4/2003 | Mokris et al. | |
| 6,543,210 B2 | 4/2003 | Rostoucher et al. | |
| 6,548,982 B1 | 4/2003 | Papanikolopoulos et al. | |
| 6,553,612 B1 | 4/2003 | Dyson et al. | |
| 6,556,722 B1 | 4/2003 | Russell et al. | |
| 6,556,892 B2 | 4/2003 | Kuroki et al. | |
| 6,557,104 B2 | 4/2003 | Vu et al. | |
| D474,312 S | 5/2003 | Stephens et al. | |
| 6,563,130 B2 | 5/2003 | Dworkowski et al. | |
| 6,571,415 B2 | 6/2003 | Gerber et al. | |
| 6,571,422 B1 | 6/2003 | Gordon et al. | |
| 6,572,711 B2 | 6/2003 | Sclafani et al. | |
| 6,574,536 B1 | 6/2003 | Kawagoe et al. | |
| 6,580,246 B2 | 6/2003 | Jacobs | |
| 6,581,239 B1 | 6/2003 | Dyson et al. | |
| 6,584,376 B1 | 6/2003 | Van Kommer | |
| 6,586,908 B2 | 7/2003 | Petersson et al. | |
| 6,587,573 B1 | 7/2003 | Stam et al. | |
| 6,590,222 B1 | 7/2003 | Bisset et al. | |
| 6,594,551 B2 | 7/2003 | McKinney et al. | |
| 6,594,844 B2 | 7/2003 | Jones | |
| 6,597,076 B2 * | 7/2003 | Scheible et al. | 307/104 |
| D478,884 S | 8/2003 | Slipy et al. | |
| 6,601,265 B1 | 8/2003 | Burlington | |
| 6,604,021 B2 | 8/2003 | Imai et al. | |
| 6,604,022 B2 | 8/2003 | Parker et al. | |
| 6,605,156 B1 | 8/2003 | Clark et al. | |
| 6,609,269 B2 | 8/2003 | Kasper | |
| 6,611,120 B2 | 8/2003 | Song et al. | |
| 6,611,734 B2 | 8/2003 | Parker et al. | |
| 6,611,738 B2 | 8/2003 | Ruffner | |
| 6,615,108 B1 | 9/2003 | Peless et al. | |
| 6,615,434 B1 | 9/2003 | Davis et al. | |
| 6,615,885 B1 | 9/2003 | Ohm | |
| 6,622,465 B2 | 9/2003 | Jerome et al. | |
| 6,624,744 B1 | 9/2003 | Wilson et al. | |
| 6,625,843 B2 | 9/2003 | Kim et al. | |
| 6,629,028 B2 | 9/2003 | Paromtchik et al. | |
| 6,633,150 B1 | 10/2003 | Wallach et al. | |
| 6,637,546 B1 | 10/2003 | Wang | |
| 6,639,659 B2 | 10/2003 | Granger | |
| 6,658,325 B2 | 12/2003 | Zweig | |
| 6,658,354 B2 | 12/2003 | Lin | |
| 6,658,692 B2 | 12/2003 | Lenkiewicz et al. | |
| 6,658,693 B1 | 12/2003 | Reed | |
| 6,661,239 B1 | 12/2003 | Ozick | |
| 6,662,889 B2 | 12/2003 | De Fazio et al. | |
| 6,668,951 B2 | 12/2003 | Won | |
| 6,670,817 B2 | 12/2003 | Fournier et al. | |
| 6,671,592 B1 | 12/2003 | Bisset et al. | |
| 6,671,925 B2 | 1/2004 | Field et al. | |
| 6,677,938 B1 | 1/2004 | Maynard | |
| 6,687,571 B1 | 2/2004 | Byrne et al. | |
| 6,690,134 B1 | 2/2004 | Jones et al. | |
| 6,690,993 B2 | 2/2004 | Foulke et al. | |
| 6,697,147 B2 | 2/2004 | Ko et al. | |
| 6,705,332 B2 | 3/2004 | Field et al. | |
| 6,711,280 B2 | 3/2004 | Stafsudd et al. | |
| 6,732,826 B2 | 5/2004 | Song et al. | |
| 6,735,811 B2 | 5/2004 | Field et al. | |
| 6,735,812 B2 | 5/2004 | Hekman et al. | |
| 6,737,591 B1 | 5/2004 | Lapstun et al. | |
| 6,741,054 B2 | 5/2004 | Koselka et al. | |
| 6,741,364 B2 | 5/2004 | Lange et al. | |
| 6,748,297 B2 | 6/2004 | Song et al. | |
| 6,756,703 B2 | 6/2004 | Chang | |
| 6,760,647 B2 | 7/2004 | Nourbakhsh et al. | |
| 6,764,373 B1 | 7/2004 | Osawa et al. | |
| 6,769,004 B2 | 7/2004 | Barrett | |
| 6,774,596 B1 | 8/2004 | Bisset | |
| 6,779,380 B1 | 8/2004 | Nieuwkamp | |
| 6,781,338 B2 | 8/2004 | Jones et al. | |
| 6,809,490 B2 | 10/2004 | Jones et al. | |
| 6,810,305 B2 | 10/2004 | Kirkpatrick | |
| 6,810,350 B2 | 10/2004 | Blakley | |
| 6,830,120 B1 | 12/2004 | Yashima et al. | |
| 6,832,407 B2 | 12/2004 | Salem et al. | |
| 6,836,701 B2 | 12/2004 | McKee | |
| 6,841,963 B2 | 1/2005 | Song et al. | |
| 6,845,297 B2 | 1/2005 | Allard | |
| 6,848,146 B2 | 2/2005 | Wright et al. | |
| 6,854,148 B1 | 2/2005 | Rief et al. | |

(56) References Cited

U.S. PATENT DOCUMENTS

| | | |
|---|---|---|
| 6,856,811 B2 | 2/2005 | Burdue et al. |
| 6,859,010 B2 | 2/2005 | Jeon et al. |
| 6,859,682 B2 | 2/2005 | Naka et al. |
| 6,860,206 B1 | 3/2005 | Rudakevych et al. |
| 6,865,447 B2 | 3/2005 | Lau et al. |
| 6,870,792 B2 | 3/2005 | Chiappetta |
| 6,871,115 B2 | 3/2005 | Huang et al. |
| 6,883,201 B2 | 4/2005 | Jones et al. |
| 6,886,651 B1 | 5/2005 | Slocum et al. |
| 6,888,333 B2 | 5/2005 | Laby |
| 6,901,624 B2 | 6/2005 | Mori et al. |
| 6,906,702 B1 | 6/2005 | Tanaka et al. |
| 6,914,403 B2 | 7/2005 | Tsurumi |
| 6,917,854 B2 | 7/2005 | Bayer |
| 6,925,357 B2 | 8/2005 | Wang et al. |
| 6,925,679 B2 | 8/2005 | Wallach et al. |
| 6,929,548 B2 | 8/2005 | Wang |
| D510,066 S | 9/2005 | Hickey et al. |
| 6,938,298 B2 | 9/2005 | Aasen |
| 6,940,291 B1 | 9/2005 | Ozick |
| 6,941,199 B1 | 9/2005 | Bottomley et al. |
| 6,956,348 B2 | 10/2005 | Landry et al. |
| 6,957,712 B2 | 10/2005 | Song et al. |
| 6,960,986 B2 | 11/2005 | Asama et al. |
| 6,965,209 B2 | 11/2005 | Jones et al. |
| 6,965,211 B2 | 11/2005 | Tsurumi |
| 6,968,592 B2 | 11/2005 | Takeuchi et al. |
| 6,971,140 B2 | 12/2005 | Kim |
| 6,975,246 B1 | 12/2005 | Trudeau |
| 6,980,229 B1 | 12/2005 | Ebersole |
| 6,985,556 B2 | 1/2006 | Shanmugavel et al. |
| 6,993,954 B1 | 2/2006 | George et al. |
| 6,999,850 B2 | 2/2006 | McDonald |
| 7,013,527 B2 | 3/2006 | Thomas et al. |
| 7,024,278 B2 | 4/2006 | Chiappetta et al. |
| 7,024,280 B2 | 4/2006 | Parker et al. |
| 7,027,893 B2 | 4/2006 | Perry et al. |
| 7,030,768 B2 | 4/2006 | Wanie |
| 7,031,805 B2 | 4/2006 | Lee et al. |
| 7,032,469 B2 | 4/2006 | Bailey |
| 7,040,869 B2 | 5/2006 | Beenker |
| 7,051,399 B2 | 5/2006 | Field et al. |
| 7,053,578 B2 | 5/2006 | Diehl et al. |
| 7,054,716 B2 | 5/2006 | McKee et al. |
| 7,055,210 B2 | 6/2006 | Keppler et al. |
| 7,057,120 B2 | 6/2006 | Ma et al. |
| 7,057,643 B2 | 6/2006 | Iida et al. |
| 7,059,012 B2 | 6/2006 | Song et al. |
| 7,065,430 B2 | 6/2006 | Naka et al. |
| 7,066,291 B2 | 6/2006 | Martins et al. |
| 7,069,124 B1 | 6/2006 | Whittaker et al. |
| 7,079,923 B2 | 7/2006 | Abramson et al. |
| 7,085,623 B2 | 8/2006 | Siegers |
| 7,085,624 B2 | 8/2006 | Aldred et al. |
| 7,113,847 B2 | 9/2006 | Chmura et al. |
| 7,133,746 B2 | 11/2006 | Abramson et al. |
| 7,142,198 B2 | 11/2006 | Lee |
| 7,148,458 B2 | 12/2006 | Schell et al. |
| 7,155,308 B2 | 12/2006 | Jones |
| 7,167,775 B2 | 1/2007 | Abramson et al. |
| 7,171,285 B2 | 1/2007 | Kim et al. |
| 7,173,391 B2 | 2/2007 | Jones et al. |
| 7,174,238 B1 | 2/2007 | Zweig |
| 7,188,000 B2 | 3/2007 | Chiappetta et al. |
| 7,193,384 B1 | 3/2007 | Norman et al. |
| 7,196,487 B2 | 3/2007 | Jones et al. |
| 7,201,786 B2 | 4/2007 | Wegelin et al. |
| 7,206,677 B2 | 4/2007 | Huldén |
| 7,211,980 B1 | 5/2007 | Bruemmer et al. |
| 7,225,500 B2 | 6/2007 | Diehl et al. |
| 7,246,405 B2 | 7/2007 | Yan |
| 7,248,951 B2 | 7/2007 | Huldén |
| 7,275,280 B2 | 10/2007 | Haegermarck et al. |
| 7,283,892 B1 | 10/2007 | Boillot et al. |
| 7,288,912 B2 | 10/2007 | Landry et al. |
| 7,318,248 B1 | 1/2008 | Yan |
| 7,320,149 B1 | 1/2008 | Huffman et al. |
| 7,321,807 B2 | 1/2008 | Laski |
| 7,324,870 B2 | 1/2008 | Lee |
| 7,328,196 B2 | 2/2008 | Peters |
| 7,332,890 B2 | 2/2008 | Cohen et al. |
| 7,346,428 B1 | 3/2008 | Huffman et al. |
| 7,352,153 B2 | 4/2008 | Yan |
| 7,359,766 B2 | 4/2008 | Jeon et al. |
| 7,360,277 B2 | 4/2008 | Moshenrose et al. |
| 7,363,108 B2 | 4/2008 | Noda et al. |
| 7,388,879 B2 | 6/2008 | Sabe et al. |
| 7,389,156 B2 | 6/2008 | Ziegler et al. |
| 7,389,166 B2 | 6/2008 | Harwig et al. |
| 7,408,157 B2 | 8/2008 | Yan |
| 7,418,762 B2 | 9/2008 | Arai et al. |
| 7,430,455 B2 | 9/2008 | Casey et al. |
| 7,430,462 B2 | 9/2008 | Chiu et al. |
| 7,441,298 B2 | 10/2008 | Svendsen et al. |
| 7,444,206 B2 | 10/2008 | Abramson et al. |
| 7,448,113 B2 | 11/2008 | Jones et al. |
| 7,459,871 B2 | 12/2008 | Landry et al. |
| 7,467,026 B2 | 12/2008 | Sakagami et al. |
| 7,474,941 B2 | 1/2009 | Kim et al. |
| 7,503,096 B2 | 3/2009 | Lin |
| 7,515,991 B2 | 4/2009 | Egawa et al. |
| 7,539,557 B2 | 5/2009 | Yamauchi |
| 7,555,363 B2 | 6/2009 | Augenbraun et al. |
| 7,557,703 B2 | 7/2009 | Yamada et al. |
| 7,568,259 B2 | 8/2009 | Yan |
| 7,571,511 B2 | 8/2009 | Jones et al. |
| 7,578,020 B2 | 8/2009 | Jaworski et al. |
| 7,600,521 B2 | 10/2009 | Woo |
| 7,603,744 B2 | 10/2009 | Reindle |
| 7,611,583 B2 | 11/2009 | Buckley et al. |
| 7,617,557 B2 | 11/2009 | Reindle |
| 7,620,476 B2 | 11/2009 | Morse et al. |
| 7,636,928 B2 | 12/2009 | Uno |
| 7,636,982 B2 | 12/2009 | Jones et al. |
| 7,647,144 B2 | 1/2010 | Haegermarck |
| 7,650,666 B2 | 1/2010 | Jang |
| 7,660,650 B2 | 2/2010 | Kawagoe et al. |
| 7,663,333 B2 | 2/2010 | Jones et al. |
| 7,693,605 B2 | 4/2010 | Park |
| 7,706,917 B1 | 4/2010 | Chiappetta et al. |
| 7,761,954 B2 | 7/2010 | Ziegler et al. |
| 7,765,635 B2 | 8/2010 | Park |
| 7,784,147 B2 | 8/2010 | Burkholder et al. |
| 7,801,645 B2 | 9/2010 | Taylor et al. |
| 7,805,220 B2 | 9/2010 | Taylor et al. |
| 7,809,944 B2 | 10/2010 | Kawamoto |
| 7,832,048 B2 | 11/2010 | Harwig et al. |
| 7,849,555 B2 | 12/2010 | Hahm et al. |
| 7,853,645 B2 | 12/2010 | Brown et al. |
| 7,860,680 B2 * | 12/2010 | Arms et al. ............ 702/127 |
| 7,920,941 B2 | 4/2011 | Park et al. |
| 7,937,800 B2 | 5/2011 | Yan |
| 7,957,836 B2 | 6/2011 | Myeong et al. |
| 8,035,255 B2 | 10/2011 | Kurs et al. |
| 8,087,117 B2 | 1/2012 | Kapoor et al. |
| 8,106,539 B2 | 1/2012 | Schatz et al. |
| 8,304,935 B2 | 11/2012 | Karalis et al. |
| 8,324,759 B2 | 12/2012 | Karalis et al. |
| 8,400,017 B2 | 3/2013 | Kurs et al. |
| 8,410,636 B2 | 4/2013 | Kurs et al. |
| 8,441,154 B2 | 5/2013 | Karalis et al. |
| 8,461,719 B2 | 6/2013 | Kesler et al. |
| 8,461,720 B2 | 6/2013 | Kurs et al. |
| 8,461,721 B2 | 6/2013 | Karalis et al. |
| 8,461,722 B2 | 6/2013 | Kurs et al. |
| 8,466,583 B2 | 6/2013 | Karalis et al. |
| 8,471,410 B2 | 6/2013 | Karalis et al. |
| 8,476,788 B2 | 7/2013 | Karalis et al. |
| 8,482,158 B2 | 7/2013 | Kurs et al. |
| 8,487,480 B1 | 7/2013 | Kesler et al. |
| 8,497,601 B2 | 7/2013 | Hall et al. |
| 8,552,592 B2 | 10/2013 | Schatz et al. |
| 8,569,914 B2 | 10/2013 | Karalis et al. |
| 8,587,153 B2 | 11/2013 | Schatz et al. |

(56) References Cited

U.S. PATENT DOCUMENTS

| | | |
|---|---|---|
| 8,587,155 B2 | 11/2013 | Giler et al. |
| 8,598,743 B2 | 12/2013 | Hall et al. |
| 8,618,696 B2 | 12/2013 | Kurs et al. |
| 2001/0004719 A1 | 6/2001 | Sommer |
| 2001/0013929 A1 | 8/2001 | Torsten |
| 2001/0020200 A1 | 9/2001 | Das et al. |
| 2001/0025183 A1 | 9/2001 | Shahidi |
| 2001/0037163 A1 | 11/2001 | Allard |
| 2001/0043509 A1 | 11/2001 | Green et al. |
| 2001/0045883 A1 | 11/2001 | Holdaway et al. |
| 2001/0047231 A1 | 11/2001 | Peless et al. |
| 2001/0047895 A1 | 12/2001 | De Fazio et al. |
| 2002/0011367 A1 | 1/2002 | Kolesnik |
| 2002/0011813 A1 | 1/2002 | Koselka et al. |
| 2002/0016649 A1 | 2/2002 | Jones |
| 2002/0021219 A1 | 2/2002 | Edwards |
| 2002/0027652 A1 | 3/2002 | Paromtchik et al. |
| 2002/0036779 A1 | 3/2002 | Kiyoi et al. |
| 2002/0081937 A1 | 6/2002 | Yamada et al. |
| 2002/0095239 A1 | 7/2002 | Wallach et al. |
| 2002/0097400 A1 | 7/2002 | Jung et al. |
| 2002/0104963 A1 | 8/2002 | Mancevski |
| 2002/0108209 A1 | 8/2002 | Peterson |
| 2002/0112742 A1 | 8/2002 | Bredo et al. |
| 2002/0113973 A1 | 8/2002 | Ge |
| 2002/0116089 A1 | 8/2002 | Kirkpatrick |
| 2002/0120364 A1 | 8/2002 | Colens |
| 2002/0124343 A1 | 9/2002 | Reed |
| 2002/0153185 A1 | 10/2002 | Song et al. |
| 2002/0156556 A1 | 10/2002 | Ruffner |
| 2002/0159051 A1 | 10/2002 | Guo |
| 2002/0166193 A1 | 11/2002 | Kasper |
| 2002/0169521 A1 | 11/2002 | Goodman et al. |
| 2002/0173877 A1 | 11/2002 | Zweig |
| 2002/0189871 A1 | 12/2002 | Won |
| 2003/0009259 A1 | 1/2003 | Hattori et al. |
| 2003/0019071 A1 | 1/2003 | Field et al. |
| 2003/0023356 A1 | 1/2003 | Keable |
| 2003/0024986 A1 | 2/2003 | Mazz et al. |
| 2003/0025472 A1 | 2/2003 | Jones et al. |
| 2003/0028286 A1 | 2/2003 | Glenn et al. |
| 2003/0030399 A1 | 2/2003 | Jacobs |
| 2003/0058262 A1 | 3/2003 | Sato et al. |
| 2003/0060928 A1 | 3/2003 | Abramson et al. |
| 2003/0067451 A1 | 4/2003 | Tagg et al. |
| 2003/0097875 A1 | 5/2003 | Lentz et al. |
| 2003/0120389 A1 | 6/2003 | Abramson et al. |
| 2003/0124312 A1 | 7/2003 | Autumn |
| 2003/0126352 A1 | 7/2003 | Barrett |
| 2003/0137268 A1 | 7/2003 | Papanikolopoulos et al. |
| 2003/0146384 A1 | 8/2003 | Logsdon et al. |
| 2003/0159232 A1 | 8/2003 | Hekman et al. |
| 2003/0168081 A1 | 9/2003 | Lee et al. |
| 2003/0175138 A1 | 9/2003 | Beenker |
| 2003/0192144 A1 | 10/2003 | Song et al. |
| 2003/0193657 A1 | 10/2003 | Uomori et al. |
| 2003/0216834 A1 | 11/2003 | Allard |
| 2003/0221114 A1 | 11/2003 | Hino et al. |
| 2003/0229421 A1 | 12/2003 | Chmura et al. |
| 2003/0229474 A1 | 12/2003 | Suzuki et al. |
| 2003/0233171 A1 | 12/2003 | Heiligensetzer |
| 2003/0233177 A1 | 12/2003 | Johnson et al. |
| 2003/0233870 A1 | 12/2003 | Mancevski |
| 2003/0233930 A1 | 12/2003 | Ozick |
| 2004/0016077 A1 | 1/2004 | Song et al. |
| 2004/0020000 A1 | 2/2004 | Jones |
| 2004/0030448 A1 | 2/2004 | Solomon |
| 2004/0030449 A1 | 2/2004 | Solomon |
| 2004/0030450 A1 | 2/2004 | Solomon |
| 2004/0030451 A1 | 2/2004 | Solomon |
| 2004/0030570 A1 | 2/2004 | Solomon |
| 2004/0030571 A1 | 2/2004 | Solomon |
| 2004/0031113 A1 | 2/2004 | Wosewick et al. |
| 2004/0049877 A1 | 3/2004 | Jones et al. |
| 2004/0055163 A1 | 3/2004 | McCambridge et al. |
| 2004/0068351 A1 | 4/2004 | Solomon |
| 2004/0068415 A1 | 4/2004 | Solomon |
| 2004/0068416 A1 | 4/2004 | Solomon |
| 2004/0074038 A1 | 4/2004 | Im et al. |
| 2004/0074044 A1 | 4/2004 | Diehl et al. |
| 2004/0076324 A1 | 4/2004 | Burl et al. |
| 2004/0083570 A1 | 5/2004 | Song et al. |
| 2004/0085037 A1 | 5/2004 | Jones et al. |
| 2004/0088079 A1 | 5/2004 | Lavarec et al. |
| 2004/0093122 A1 | 5/2004 | Galibraith |
| 2004/0098167 A1 | 5/2004 | Yi et al. |
| 2004/0111184 A1 | 6/2004 | Chiappetta et al. |
| 2004/0111821 A1 | 6/2004 | Lenkiewicz et al. |
| 2004/0113777 A1 | 6/2004 | Matsuhira et al. |
| 2004/0117064 A1 | 6/2004 | McDonald |
| 2004/0117846 A1 | 6/2004 | Karaoguz et al. |
| 2004/0118998 A1 | 6/2004 | Wingett et al. |
| 2004/0128028 A1 | 7/2004 | Miyamoto et al. |
| 2004/0133316 A1 | 7/2004 | Dean |
| 2004/0134336 A1 | 7/2004 | Solomon |
| 2004/0134337 A1 | 7/2004 | Solomon |
| 2004/0143919 A1 | 7/2004 | Wilder |
| 2004/0148419 A1 | 7/2004 | Chen et al. |
| 2004/0148731 A1 | 8/2004 | Damman et al. |
| 2004/0153212 A1 | 8/2004 | Profio et al. |
| 2004/0156541 A1 | 8/2004 | Jeon et al. |
| 2004/0158357 A1 | 8/2004 | Lee et al. |
| 2004/0181706 A1 | 9/2004 | Chen et al. |
| 2004/0187249 A1 | 9/2004 | Jones et al. |
| 2004/0187457 A1 | 9/2004 | Colens |
| 2004/0196451 A1 | 10/2004 | Aoyama |
| 2004/0200505 A1 | 10/2004 | Taylor et al. |
| 2004/0201361 A1* | 10/2004 | Koh et al. ............ 320/104 |
| 2004/0204792 A1 | 10/2004 | Taylor et al. |
| 2004/0204804 A1 | 10/2004 | Lee et al. |
| 2004/0210345 A1 | 10/2004 | Noda et al. |
| 2004/0210347 A1 | 10/2004 | Sawada et al. |
| 2004/0211444 A1 | 10/2004 | Taylor et al. |
| 2004/0221790 A1 | 11/2004 | Sinclair et al. |
| 2004/0236468 A1 | 11/2004 | Taylor et al. |
| 2004/0244138 A1 | 12/2004 | Taylor et al. |
| 2004/0255425 A1 | 12/2004 | Arai et al. |
| 2005/0000543 A1 | 1/2005 | Taylor et al. |
| 2005/0010330 A1 | 1/2005 | Abramson et al. |
| 2005/0010331 A1 | 1/2005 | Taylor et al. |
| 2005/0015913 A1 | 1/2005 | Kim et al. |
| 2005/0021181 A1 | 1/2005 | Kim et al. |
| 2005/0028316 A1 | 2/2005 | Thomas et al. |
| 2005/0053912 A1 | 3/2005 | Roth et al. |
| 2005/0055796 A1 | 3/2005 | Wright et al. |
| 2005/0067994 A1 | 3/2005 | Jones et al. |
| 2005/0085947 A1 | 4/2005 | Aldred et al. |
| 2005/0091782 A1 | 5/2005 | Gordon et al. |
| 2005/0091786 A1 | 5/2005 | Wright et al. |
| 2005/0137749 A1 | 6/2005 | Jeon et al. |
| 2005/0144751 A1 | 7/2005 | Kegg et al. |
| 2005/0150074 A1 | 7/2005 | Diehl et al. |
| 2005/0150519 A1 | 7/2005 | Keppler et al. |
| 2005/0154795 A1 | 7/2005 | Kuz et al. |
| 2005/0156562 A1 | 7/2005 | Cohen et al. |
| 2005/0163119 A1 | 7/2005 | Ito et al. |
| 2005/0165508 A1 | 7/2005 | Kanda et al. |
| 2005/0166354 A1 | 8/2005 | Uehigashi |
| 2005/0166355 A1 | 8/2005 | Tani |
| 2005/0172445 A1 | 8/2005 | Diehl et al. |
| 2005/0183229 A1 | 8/2005 | Uehigashi |
| 2005/0183230 A1 | 8/2005 | Uehigashi |
| 2005/0187678 A1 | 8/2005 | Myeong et al. |
| 2005/0192707 A1 | 9/2005 | Park et al. |
| 2005/0204717 A1 | 9/2005 | Colens |
| 2005/0209736 A1 | 9/2005 | Kawagoe |
| 2005/0211880 A1 | 9/2005 | Schell et al. |
| 2005/0212929 A1 | 9/2005 | Schell et al. |
| 2005/0213082 A1 | 9/2005 | DiBernardo et al. |
| 2005/0213109 A1 | 9/2005 | Schell et al. |
| 2005/0217042 A1 | 10/2005 | Reindle |
| 2005/0218852 A1 | 10/2005 | Landry et al. |
| 2005/0222933 A1 | 10/2005 | Wesby |
| 2005/0229340 A1 | 10/2005 | Sawalski et al. |

(56) References Cited

U.S. PATENT DOCUMENTS

| | | | |
|---|---|---|---|
| 2005/0229355 A1 | 10/2005 | Crouch et al. | |
| 2005/0235451 A1 | 10/2005 | Yan | |
| 2005/0251292 A1 | 11/2005 | Casey et al. | |
| 2005/0255425 A1 | 11/2005 | Pierson | |
| 2005/0258154 A1 | 11/2005 | Blankenship et al. | |
| 2005/0273967 A1 | 12/2005 | Taylor et al. | |
| 2005/0288819 A1 | 12/2005 | de Guzman | |
| 2006/0000050 A1 | 1/2006 | Cipolla et al. | |
| 2006/0009879 A1 | 1/2006 | Lynch et al. | |
| 2006/0010638 A1 | 1/2006 | Shimizu et al. | |
| 2006/0020369 A1 | 1/2006 | Taylor et al. | |
| 2006/0020370 A1 | 1/2006 | Abramson | |
| 2006/0021168 A1 | 2/2006 | Nishikawa | |
| 2006/0025134 A1 | 2/2006 | Cho et al. | |
| 2006/0037170 A1 | 2/2006 | Shimizu | |
| 2006/0042042 A1 | 3/2006 | Mertes et al. | |
| 2006/0044546 A1 | 3/2006 | Lewin et al. | |
| 2006/0060216 A1 | 3/2006 | Woo | |
| 2006/0061657 A1 | 3/2006 | Rew et al. | |
| 2006/0064828 A1 | 3/2006 | Stein et al. | |
| 2006/0087273 A1 | 4/2006 | Ko et al. | |
| 2006/0089765 A1 | 4/2006 | Pack et al. | |
| 2006/0100741 A1 | 5/2006 | Jung | |
| 2006/0107894 A1 | 5/2006 | Buckley et al. | |
| 2006/0119839 A1 | 6/2006 | Bertin et al. | |
| 2006/0143295 A1 | 6/2006 | Costa et al. | |
| 2006/0146776 A1 | 7/2006 | Kim | |
| 2006/0150361 A1 | 7/2006 | Aldred et al. | |
| 2006/0184293 A1 | 8/2006 | Konandreas et al. | |
| 2006/0185690 A1 | 8/2006 | Song et al. | |
| 2006/0190133 A1 | 8/2006 | Konandreas et al. | |
| 2006/0190134 A1 | 8/2006 | Ziegler et al. | |
| 2006/0190146 A1 | 8/2006 | Morse et al. | |
| 2006/0196003 A1 | 9/2006 | Song et al. | |
| 2006/0200281 A1 | 9/2006 | Ziegler et al. | |
| 2006/0220900 A1 | 10/2006 | Ceskutti et al. | |
| 2006/0229774 A1 | 10/2006 | Park et al. | |
| 2006/0259194 A1 | 11/2006 | Chiu | |
| 2006/0259494 A1 | 11/2006 | Watson et al. | |
| 2006/0278161 A1 | 12/2006 | Burkholder et al. | |
| 2006/0288519 A1 | 12/2006 | Jaworski et al. | |
| 2006/0293787 A1 | 12/2006 | Kanda et al. | |
| 2006/0293808 A1 | 12/2006 | Qian | |
| 2007/0006404 A1 | 1/2007 | Cheng et al. | |
| 2007/0016328 A1 | 1/2007 | Ziegler et al. | |
| 2007/0017061 A1 | 1/2007 | Yan | |
| 2007/0028574 A1 | 2/2007 | Yan | |
| 2007/0032904 A1 | 2/2007 | Kawagoe et al. | |
| 2007/0042716 A1 | 2/2007 | Goodall et al. | |
| 2007/0043459 A1 | 2/2007 | Abbott et al. | |
| 2007/0061041 A1 | 3/2007 | Zweig | |
| 2007/0061043 A1 | 3/2007 | Ermakov et al. | |
| 2007/0114975 A1 | 5/2007 | Cohen et al. | |
| 2007/0142964 A1 | 6/2007 | Abramson | |
| 2007/0150096 A1 | 6/2007 | Yeh et al. | |
| 2007/0156286 A1 | 7/2007 | Yamauchi | |
| 2007/0157415 A1 | 7/2007 | Lee et al. | |
| 2007/0157420 A1 | 7/2007 | Lee et al. | |
| 2007/0179670 A1 | 8/2007 | Chiappetta et al. | |
| 2007/0226949 A1 | 10/2007 | Hahm et al. | |
| 2007/0234492 A1 | 10/2007 | Svendsen et al. | |
| 2007/0244610 A1 | 10/2007 | Ozick et al. | |
| 2007/0245511 A1 | 10/2007 | Hahm et al. | |
| 2007/0250212 A1 | 10/2007 | Halloran et al. | |
| 2007/0261193 A1 | 11/2007 | Gordon et al. | |
| 2007/0266508 A1 | 11/2007 | Jones et al. | |
| 2008/0007203 A1 | 1/2008 | Cohen et al. | |
| 2008/0039974 A1* | 2/2008 | Sandin et al. | 700/258 |
| 2008/0052846 A1 | 3/2008 | Kapoor et al. | |
| 2008/0091304 A1 | 4/2008 | Ozick et al. | |
| 2008/0109126 A1* | 5/2008 | Sandin et al. | 701/23 |
| 2008/0134458 A1 | 6/2008 | Ziegler et al. | |
| 2008/0140255 A1 | 6/2008 | Ziegler et al. | |
| 2008/0155768 A1 | 7/2008 | Ziegler et al. | |
| 2008/0184518 A1 | 8/2008 | Taylor et al. | |
| 2008/0266748 A1* | 10/2008 | Lee | 361/270 |
| 2008/0276407 A1 | 11/2008 | Schnittman et al. | |
| 2008/0281470 A1 | 11/2008 | Gilbert et al. | |
| 2008/0282494 A1 | 11/2008 | Won et al. | |
| 2008/0294288 A1 | 11/2008 | Yamauchi | |
| 2008/0302586 A1 | 12/2008 | Yan | |
| 2008/0307590 A1 | 12/2008 | Jones et al. | |
| 2009/0007366 A1 | 1/2009 | Svendsen et al. | |
| 2009/0038089 A1 | 2/2009 | Landry et al. | |
| 2009/0048727 A1 | 2/2009 | Hong et al. | |
| 2009/0049640 A1 | 2/2009 | Lee et al. | |
| 2009/0055022 A1 | 2/2009 | Casey et al. | |
| 2009/0102296 A1* | 4/2009 | Greene et al. | 307/149 |
| 2009/0292393 A1 | 11/2009 | Casey et al. | |
| 2010/0006028 A1 | 1/2010 | Buckley et al. | |
| 2010/0011529 A1 | 1/2010 | Won et al. | |
| 2010/0049365 A1 | 2/2010 | Jones et al. | |
| 2010/0063628 A1 | 3/2010 | Landry et al. | |
| 2010/0082193 A1* | 4/2010 | Chiappetta | 701/24 |
| 2010/0257690 A1 | 10/2010 | Jones et al. | |
| 2010/0257691 A1 | 10/2010 | Jones et al. | |
| 2010/0263158 A1 | 10/2010 | Jones et al. | |
| 2010/0268384 A1 | 10/2010 | Jones et al. | |
| 2010/0293742 A1 | 11/2010 | Chung et al. | |
| 2010/0312429 A1 | 12/2010 | Jones et al. | |

FOREIGN PATENT DOCUMENTS

| | | |
|---|---|---|
| DE | 3536907 C2 | 2/1989 |
| DE | 3404202 C2 | 12/1992 |
| DE | 199311014 U1 | 10/1993 |
| DE | 4338841 A1 | 5/1995 |
| DE | 4414683 A1 | 10/1995 |
| DE | 19849978 | 2/2001 |
| DE | 102004038074 B3 | 6/2005 |
| DE | 10357636 A1 | 7/2005 |
| DE | 102004041021 B3 | 8/2005 |
| DE | 102005046813 A1 | 4/2007 |
| DK | 338988 A | 12/1988 |
| EP | 0114926 A2 | 8/1984 |
| EP | 265542 A1 | 5/1988 |
| EP | 281085 A2 | 9/1988 |
| EP | 286328 A1 | 10/1988 |
| EP | 294101 A2 | 12/1988 |
| EP | 352045 A2 | 1/1990 |
| EP | 433697 A2 | 6/1991 |
| EP | 437024 A1 | 7/1991 |
| EP | 554978 A2 | 8/1993 |
| EP | 0615719 A1 | 9/1994 |
| EP | 792726 A1 | 9/1997 |
| EP | 861629 B1 | 9/1998 |
| EP | 930040 A2 | 7/1999 |
| EP | 845237 B1 | 4/2000 |
| EP | 1139847 A1 | 10/2001 |
| EP | 1228734 A2 | 8/2002 |
| EP | 1331537 A1 | 7/2003 |
| EP | 1380245 A1 | 1/2004 |
| EP | 1380246 A2 | 1/2004 |
| EP | 1018315 B1 | 11/2004 |
| EP | 1557730 A1 | 7/2005 |
| EP | 1642522 A2 | 4/2006 |
| EP | 1836941 A2 | 9/2007 |
| ES | 2238196 A1 | 8/2005 |
| FR | 722755 A | 3/1932 |
| FR | 2601443 A1 | 1/1988 |
| FR | 2828589 B4 | 2/2003 |
| GB | 702426 A | 1/1954 |
| GB | 2128842 A | 5/1984 |
| GB | 2225221 A | 5/1990 |
| GB | 2267360 A | 12/1993 |
| GB | 2283838 A | 5/1995 |
| GB | 2284957 A | 6/1995 |
| GB | 2300082 A | 10/1996 |
| GB | 2404330 A | 2/2005 |
| GB | 2417354 A | 2/2006 |
| JP | 53021869 | 2/1978 |
| JP | 53110257 A | 9/1978 |
| JP | 57064217 A | 4/1982 |
| JP | 59005315 A | 1/1984 |

(56) References Cited

FOREIGN PATENT DOCUMENTS

| | | |
|---|---|---|
| JP | 59033511 A | 2/1984 |
| JP | 59094005 A | 5/1984 |
| JP | 59112311 | 6/1984 |
| JP | 59120124 | 7/1984 |
| JP | 59131668 | 9/1984 |
| JP | 59164973 A | 9/1984 |
| JP | 59184917 A | 10/1984 |
| JP | 59212924 A | 12/1984 |
| JP | 59226909 A | 12/1984 |
| JP | 60089213 | 5/1985 |
| JP | 68889213 | 5/1985 |
| JP | 60211510 A | 10/1985 |
| JP | 60259895 A | 12/1985 |
| JP | 61023221 A | 1/1986 |
| JP | 61097712 A | 5/1986 |
| JP | 61160366 A | 7/1986 |
| JP | 62074018 A | 4/1987 |
| JP | 62263507 A | 11/1987 |
| JP | 62263508 | 11/1987 |
| JP | 62263508 A | 11/1987 |
| JP | 63079623 | 4/1988 |
| JP | 63079623 A | 4/1988 |
| JP | 63158032 A | 7/1988 |
| JP | 63183032 A | 7/1988 |
| JP | 63203483 A | 8/1988 |
| JP | 63241610 A | 10/1988 |
| JP | 10295595 A | 11/1988 |
| JP | 1118752 A | 5/1989 |
| JP | 2283343 A | 11/1990 |
| JP | 3051023 | 3/1991 |
| JP | 4019586 A | 1/1992 |
| JP | 4074285 A | 3/1992 |
| JP | 4084921 A | 3/1992 |
| JP | 04300516 A | 10/1992 |
| JP | 5023269 A | 2/1993 |
| JP | 5042076 | 2/1993 |
| JP | 5046246 | 2/1993 |
| JP | 5060049 | 3/1993 |
| JP | 5091604 | 4/1993 |
| JP | 5095879 A | 4/1993 |
| JP | 5150827 A | 6/1993 |
| JP | 5150829 A | 6/1993 |
| JP | 5054620 | 7/1993 |
| JP | 5257527 A | 10/1993 |
| JP | 5257533 A | 10/1993 |
| JP | 5285861 A | 11/1993 |
| JP | 5302836 A | 11/1993 |
| JP | 5312514 A | 11/1993 |
| JP | 5046239 Y2 | 12/1993 |
| JP | 5341904 A | 12/1993 |
| JP | 6003251 | 1/1994 |
| JP | 6038912 A | 2/1994 |
| JP | 6105781 | 4/1994 |
| JP | 6154143 A | 6/1994 |
| JP | 6293095 | 10/1994 |
| JP | 6293095 A | 10/1994 |
| JP | 6327598 A | 11/1994 |
| JP | 7047046 A | 2/1995 |
| JP | 7129239 A | 5/1995 |
| JP | 7059702 | 6/1995 |
| JP | 7222705 A | 8/1995 |
| JP | 7270518 A | 10/1995 |
| JP | 7281752 | 10/1995 |
| JP | 7311041 | 11/1995 |
| JP | 7313417 A | 12/1995 |
| JP | 7319542 | 12/1995 |
| JP | 8000393 A | 1/1996 |
| JP | 8016241 | 1/1996 |
| JP | 8063229 | 3/1996 |
| JP | 8084696 A | 4/1996 |
| JP | 8089449 A | 4/1996 |
| JP | 80894151 A | 4/1996 |
| JP | 8123548 A | 5/1996 |
| JP | 8152916 A | 6/1996 |
| JP | 8256960 | 10/1996 |
| JP | 8263137 A | 10/1996 |
| JP | 8286741 | 11/1996 |
| JP | 8286744 | 11/1996 |
| JP | 8286745 | 11/1996 |
| JP | 8286747 | 11/1996 |
| JP | 8322774 | 12/1996 |
| JP | 8335112 | 12/1996 |
| JP | 8339297 A | 12/1996 |
| JP | 9044240 A | 2/1997 |
| JP | 9047413 | 2/1997 |
| JP | 10240343 | 2/1997 |
| JP | 9066855 A | 3/1997 |
| JP | 9145309 A | 6/1997 |
| JP | 9160644 A | 6/1997 |
| JP | 9179625 A | 7/1997 |
| JP | 9185410 A | 7/1997 |
| JP | 9192069 A | 7/1997 |
| JP | 9204223 | 8/1997 |
| JP | 9204224 | 8/1997 |
| JP | 9233712 A | 9/1997 |
| JP | 9251318 | 9/1997 |
| JP | 9265319 A | 10/1997 |
| JP | 9269807 A | 10/1997 |
| JP | 9269810 A | 10/1997 |
| JP | 9269824 | 10/1997 |
| JP | 9319431 | 12/1997 |
| JP | 9319432 A | 12/1997 |
| JP | 9319434 A | 12/1997 |
| JP | 9325812 A | 12/1997 |
| JP | 10055215 A | 2/1998 |
| JP | 10117973 A | 5/1998 |
| JP | 10118963 A | 5/1998 |
| JP | 10165738 A | 6/1998 |
| JP | 10177414 A | 6/1998 |
| JP | 10214114 A | 8/1998 |
| JP | 10240342 | 9/1998 |
| JP | 10260727 | 9/1998 |
| JP | 10314088 A | 12/1998 |
| JP | 11015941 A | 1/1999 |
| JP | 11065655 | 3/1999 |
| JP | 11102219 | 4/1999 |
| JP | 11102220 A | 4/1999 |
| JP | 11162454 A | 6/1999 |
| JP | 11174145 A | 7/1999 |
| JP | 11175149 A | 7/1999 |
| JP | 11178765 A | 7/1999 |
| JP | 11212642 A | 8/1999 |
| JP | 11213157 A | 8/1999 |
| JP | 11282532 A | 10/1999 |
| JP | 11282533 A | 10/1999 |
| JP | 11295412 A | 10/1999 |
| JP | 11346964 | 12/1999 |
| JP | 2000047728 A | 2/2000 |
| JP | 2000056006 A | 2/2000 |
| JP | 2000056831 A | 2/2000 |
| JP | 2000060782 A | 2/2000 |
| JP | 2000075925 A | 3/2000 |
| JP | 2000102499 A | 4/2000 |
| JP | 2000275321 A | 10/2000 |
| JP | 2000279353 A | 10/2000 |
| JP | 2000342497 A | 12/2000 |
| JP | 2000353014 A | 12/2000 |
| JP | 2001022443 A | 1/2001 |
| JP | 2001067588 A | 3/2001 |
| JP | 2001087182 A | 4/2001 |
| JP | 2001121455 A | 5/2001 |
| JP | 2001197008 A | 7/2001 |
| JP | 3197758 B2 | 8/2001 |
| JP | 3201903 B2 | 8/2001 |
| JP | 2001216482 A | 8/2001 |
| JP | 2001258807 A | 9/2001 |
| JP | 2001265437 A | 9/2001 |
| JP | 2001275908 A | 10/2001 |
| JP | 2001289939 A | 10/2001 |
| JP | 2001306170 A | 11/2001 |
| JP | 2002078650 A | 3/2002 |
| JP | 2002204768 A | 7/2002 |
| JP | 2002204769 A | 7/2002 |
| JP | 2002247510 A | 8/2002 |

(56) References Cited

FOREIGN PATENT DOCUMENTS

| | | |
|---|---|---|
| JP | 2002323925 A | 11/2002 |
| JP | 2002333920 A | 11/2002 |
| JP | 3356170 | 12/2002 |
| JP | 2002355206 A | 12/2002 |
| JP | 2002360471 A | 12/2002 |
| JP | 2002360479 A | 12/2002 |
| JP | 2002360482 A | 12/2002 |
| JP | 2002366227 A | 12/2002 |
| JP | 2002369778 A | 12/2002 |
| JP | 2003010076 A | 1/2003 |
| JP | 2003010088 A | 1/2003 |
| JP | 2003028528 A | 1/2003 |
| JP | 2003036116 A | 2/2003 |
| JP | 2003038401 A | 2/2003 |
| JP | 2003038402 A | 2/2003 |
| JP | 2003047579 A | 2/2003 |
| JP | 2000066722 A | 3/2003 |
| JP | 2003061882 A | 3/2003 |
| JP | 2003084994 A | 3/2003 |
| JP | 2003167628 A | 6/2003 |
| JP | 2003180586 A | 7/2003 |
| JP | 2003180587 A | 7/2003 |
| JP | 2003186539 A | 7/2003 |
| JP | 2003190064 A | 7/2003 |
| JP | 2003241836 A | 8/2003 |
| JP | 2003262520 A | 9/2003 |
| JP | 2003304992 A | 10/2003 |
| JP | 2003310509 A | 11/2003 |
| JP | 2003330543 A | 11/2003 |
| JP | 2004123040 A | 4/2004 |
| JP | 2004148021 A | 5/2004 |
| JP | 2004160102 A | 6/2004 |
| JP | 2004166968 A | 6/2004 |
| JP | 2004198330 A | 7/2004 |
| JP | 2004219185 A | 8/2004 |
| JP | 2004351234 A | 12/2004 |
| JP | 2005118354 A | 5/2005 |
| JP | 2005211360 A | 8/2005 |
| JP | 2005224265 A | 8/2005 |
| JP | 2005230032 A | 9/2005 |
| JP | 2005245916 A | 9/2005 |
| JP | 2005346700 | 12/2005 |
| JP | 2005352707 A | 12/2005 |
| JP | 2006043071 A | 2/2006 |
| JP | 2006155274 A | 6/2006 |
| JP | 2006164223 A | 6/2006 |
| JP | 2006227673 A | 8/2006 |
| JP | 2006247467 A | 9/2006 |
| JP | 2006260161 A | 9/2006 |
| JP | 2006293662 A | 10/2006 |
| JP | 2007034866 A | 2/2007 |
| JP | 2007213180 A | 8/2007 |
| JP | 2009015611 A | 1/2009 |
| JP | 2010198552 A | 9/2010 |
| WO | WO9526512 A1 | 10/1995 |
| WO | WO9530887 A1 | 11/1995 |
| WO | WO9617258 A1 | 6/1996 |
| WO | WO9715224 A1 | 5/1997 |
| WO | WO9740734 A1 | 11/1997 |
| WO | WO9741451 A1 | 11/1997 |
| WO | WO9853456 A1 | 11/1998 |
| WO | WO9905580 A2 | 2/1999 |
| WO | WO9916078 A1 | 4/1999 |
| WO | WO9928800 A1 | 6/1999 |
| WO | WO9938056 A1 | 7/1999 |
| WO | WO9938237 A1 | 7/1999 |
| WO | WO9943250 A1 | 9/1999 |
| WO | WO9959042 A1 | 11/1999 |
| WO | WO0004430 A1 | 1/2000 |
| WO | WO0038026 A1 | 6/2000 |
| WO | WO0038028 A1 | 6/2000 |
| WO | WO0038029 A1 | 6/2000 |
| WO | WO0106904 A1 | 2/2001 |
| WO | WO0106905 A1 | 2/2001 |
| WO | WO0180703 A1 | 11/2001 |
| WO | WO0191623 A2 | 12/2001 |
| WO | WO02039864 A1 | 5/2002 |
| WO | WO02039868 A1 | 5/2002 |
| WO | WO02058527 A1 | 8/2002 |
| WO | WO02062194 A1 | 8/2002 |
| WO | WO02067744 A1 | 9/2002 |
| WO | WO02067745 A1 | 9/2002 |
| WO | WO02067752 A1 | 9/2002 |
| WO | WO02069775 A2 | 9/2002 |
| WO | WO02071175 A1 | 9/2002 |
| WO | WO02075350 A1 | 9/2002 |
| WO | WO02075356 A1 | 9/2002 |
| WO | WO02075469 A1 | 9/2002 |
| WO | WO02075470 A1 | 9/2002 |
| WO | WO02081074 A1 | 10/2002 |
| WO | WO02101477 A2 | 12/2002 |
| WO | WO03015220 A1 | 2/2003 |
| WO | WO03024292 A2 | 3/2003 |
| WO | WO03040546 A1 | 5/2003 |
| WO | WO03040845 A1 | 5/2003 |
| WO | WO03040846 A1 | 5/2003 |
| WO | WO03062850 A2 | 7/2003 |
| WO | WO03062852 A1 | 7/2003 |
| WO | WO 2004/025947 A2 | 3/2004 |
| WO | WO2004025947 A2 | 3/2004 |
| WO | WO2004058028 A2 | 7/2004 |
| WO | WO2004059409 A1 | 7/2004 |
| WO | WO2005006935 A1 | 1/2005 |
| WO | WO2005037496 A1 | 4/2005 |
| WO | WO2005055795 A1 | 6/2005 |
| WO | WO2005055796 A2 | 6/2005 |
| WO | WO2005076545 A1 | 8/2005 |
| WO | WO2005077243 A1 | 8/2005 |
| WO | WO2005077244 A1 | 8/2005 |
| WO | WO2005081074 A1 | 9/2005 |
| WO | WO2005082223 A1 | 9/2005 |
| WO | WO2005083541 A1 | 9/2005 |
| WO | WO2005098475 A1 | 10/2005 |
| WO | WO2005098476 A1 | 10/2005 |
| WO | WO2006046400 A1 | 5/2006 |
| WO | WO2006061133 A1 | 6/2006 |
| WO | WO2006068403 A1 | 6/2006 |
| WO | WO2006073248 A1 | 7/2006 |
| WO | WO2006089307 A2 | 8/2006 |
| WO | WO2007028049 A2 | 3/2007 |
| WO | WO2007036490 A2 | 4/2007 |
| WO | WO2007065033 A2 | 6/2007 |
| WO | WO2007137234 A2 | 11/2007 |

OTHER PUBLICATIONS

Prassler et al., "A Short History of Cleaning Robots," Autonomous Robots, vol. 9, pp. 211-226 (2000).
Jarosiewicz et al. "Final Report—Lucid", University of Florida, Departmetn of Electrical and Computer Engineering, EEL 5666—Intelligent Machine Design Laboratory, 50 pages, Aug. 4, 1999.
Jensfelt, et al. "Active Global Localization for a mobile robot using multiple hypothesis tracking", IEEE Transactions on Robots and Automation vol. 17, No. 5, pp. 748-760, Oct. 2001.
Jeong, et al. "An intelligent map-building system for indoor mobile robot using low cost photo sensors", SPIE vol. 6042 6 pages, 2005.
Kahney, "Robot Vacs are in the House," www.wired.com/news/technology/o,1282,59237,00.html, 6 pages, Jun. 18, 2003.
Karcher "Karcher RoboCleaner RC 3000", www.robocleaner.de/english/screen3.html, 4 pages, Dec. 12, 2003.
Karcher USA "RC 3000 Robotics cleaner", www.karcher-usa.com, 3 pages, Mar. 18, 2005.
Karlsson et al., The vSLAM Algorithm for Robust Localization and Mapping, Proceedings of the 2005 IEEE International Conference on Robotics and Automation, Barcelona, Spain, pp. 24-29, Apr. 2005.
Karlsson, et al Core Technologies for service Robotics, IEEE/RSJ International Conference on Intelligent Robots and Systems (IROS 2004), vol. 3, pp. 2979-2984, Sep. 28-Oct. 2, 2004.
Kleinberg, The Localization Problem for Mobile Robots, Laboratory for Computer Science, Massachusetts Institute of Technology, 1994 IEEE, pp. 521-531, 1994.

(56) References Cited

OTHER PUBLICATIONS

Knight, et al., "Localization and Identification of Visual Landmarks", Journal of Computing Sciences in Colleges, vol. 16 Issue 4, 2001 pp. 312-313, May 2001.

Kolodko et al. "Experimental System for Real-Time Motion Estimation", Proceedings of the 2003 IEEE/ASME International Conference on Advanced Intelligent Mechatronics (AIM 2003), pp. 981-986, 2003.

Komoriya et al., Planning of Landmark Measurement for the Navigation of a Mobile Robot, Proceedings of the 1992 IEEE/RSJ International Cofnerence on Intelligent Robots and Systems, Raleigh, NC pp. 1476-1481, Jul. 7-10, 1992.

Krotov, et al. "Digital Sextant", Downloaded from the internet at: http://www.cs.cmu.edu/~epk/ , 1 page, 1995.

Krupa et al. "Autonomous 3-D Positioning of Surgical Instruments in Robotized Laparoscopic Surgery Using Visual Servoing", IEEE Transactions on Robotics and Automation, vol. 19, No. 5, pp. 842-853, Oct. 5, 2003.

Kuhl, et al. "Self Localization in Environments using Visual Angles", VRCAI '04 Proceedings of the 2004 ACM SIGGRAPH international conference on Virtual Reality continuum and its applications in industry, pp. 472-475, 2004.

Friendly Robotics, 18 pages http://www.robotsandrelax.com/PDFs/RV400Manual.pdf accessed Dec. 22, 2011.

It's eye, 2003 www.hitachi.co.jp/rd/pdf/topics/hitac2003_10.pdf 2 pages.

Grumet "Robots Clean House", Popular Mechanics, Nov. 2003, 3 pages.

Kurs et al, Wireless Power transfer via Strongly Coupled Magnetic Resonances, Downloaded from www.sciencemag.org , Aug. 17, 2007, 5 pages.

Franz, et al. "Biomimetric robot navigation", Robotics and Autonomous Systems vol. 30 pp. 133-153, 2000.

Friendly Robotics "Friendly Robotics—Friendly Vac, Robotic Vacuum Cleaner", www.friendlyrobotics.com/vac.htm. 5 pages Apr. 20, 2005.

Fuentes, et al. "Mobile Robotics 1994", University of Rochester. Computer Science Department, TR 588, 44 pages, Dec. 7, 1994.

Fukuda, et al. "Navigation System based on Ceiling Landmark Recognition for Autonomous mobile robot", 1995 IEEE/RSJ International Conference on Intelligent Robots and Systems 95. 'Human Robot Interaction and Cooperative Robots', Pittsburgh, PA, pp. 1466/1471, Aug. 5-9, 1995.

Gat, Erann "Robust Low-Computation Sensor-driven Control for Task-Directed Navigation", Proc of IEEE International Conference on robotics and Automation , Sacramento, CA pp. 2484-2489, Apr. 1991.

Gionis "A hand-held optical surface scanner for environmental Modeling and Virtual Reality", Virtual Reality World, 16 pages 1996.

Goncalves et al. "A Visual Front-End for Simultaneous Localization and Mapping", Proceedings of the 2005 IEEE International Conference on Robotics and Automation, Barcelona, Spain, pp. 44-49, Apr. 2005.

Gregg et al. "Autonomous Lawn Care Applications", 2006 Florida Conference on Recent Advances in Robotics, FCRAR 2006, pp. 1-5, May 25-26, 2006.

Hamamatsu "Si PIN Diode S5980, S5981 S5870—Multi-element photodiodes for surface mounting", Hamatsu Photonics, 2 pages Apr. 2004.

Hammacher Schlemmer "Electrolux Trilobite Robotic Vacuum" www.hammacher.com/publish/71579.asp? promo=xsells, 3 pages, Mar. 18, 2005.

Haralick et al. "Pose Estimation from Corresponding Point Data", IEEE Transactions on systems, Man, and Cybernetics, vol. 19, No. 6, pp. 1426-1446, Nov. 1989.

Hausler "About the Scaling Behaviour of Optical Range Sensors", Fringe '97, Proceedings of the 3rd International Workshop on Automatic Processing of Fringe Patterns, Bremen, Germany, pp. 147-155, Sep. 15-17, 1997.

Hitachi: News release: "The home cleaning robot of the autonomous movement type (experimental machine)", www.i4u.com./japanreleases/hitachirobot.htm, 5 pages, Mar. 18, 2005.

Hoag, et al. "Navigation and Guidance in interstellar space", ACTA Astronautica vol. 2, pp. 513-533 , Feb. 14, 1975.

Huntsberger et al. "CAMPOUT: A Control Architecture for Tightly Coupled Coordination of Multirobot Systems for Planetary Surface Exploration", IEEE Transactions on Systems, Man, and Cybernetics—Part A: Systems and Humans, vol. 33, No. 5, pp. 550-559, Sep. 2003.

Iirobotics.com "Samsung Unveils Its Multifunction Robot Vacuum", www.iirobotics.com/webpages/hotstuff.php? ubre=111, 3 pages, Mar. 18, 2005.

InMach "Intelligent Machines", www.inmach.de/inside.html, 1 page, Nov. 19, 2008.

Borges et al. "Optimal Mobile Robot Pose Estimation Using Geometrical Maps", IEEE Transactions on Robotics and Automation, vol. 18, No. 1, pp. 87-94, Feb. 2002.

Braunstingl et al. "Fuzzy Logic Wall Following of a Mobile Robot Based on the Concept of General Perception" ICAR '95, 7th International Conference on Advanced Robotics, Sant Feliu De Guixols, Spain, pp. 367-376, Sep. 1995.

Bulusu, et al. "Self Configuring Localizaton systems: Design and Experimental Evaluation" ACM Transactions on Embedded Computing Systems vol. 3 No. 1 pp. 24-60, 2003.

Caccia, et al. "Bottom-Following for Remotely Operated Vehicies", 5th IFAC conference, Alaborg, Denmark, pp. 245-250 Aug. 1, 2000.

Chae, et al. "StarLITE: A new artificial landmark for the navigation of mobile robots", http://www.irc.atr.jp/jk-nrs2005/pdf/Starlite.pdf, 4 pages, 2005.

Chamberlin et al. "Team 1: Robot Locator Beacon System" NASA Goddard SFC, Design Proposal, 15 pages, Feb. 17, 2006.

Champy "Physical management of IT assets in Data Centers using RFID technologies", RFID 2005 University, Oct. 12-14, 2005.

Chiri "Joystck Control for Tiny OS Robot", http://eecs.berkeley.edu/Programs/ugrad/superb/papers2002/chiri.pdf. 12 pages, Aug. 8, 2002.

Christensen et al. "Theoretical Methods for Planning and Control in Mobile Robotics" 1997 First International Conference on Knowledge-Based Intelligent Electronic Systems, Adelaide, Australia, pp. 81-86, May 21-27, 1997.

Andersen et al., "Landmark based navigation strategies", SPIE Conference on Mobile Robots XIII, SPIE vol. 3525, pp. 170-181, 1998.

Clerentin, et al. "A localization method based on two omnidirectional perception systems cooperation" Proc of IEEE International Conference on Robotics & Automation, San Francisco, CA vol. 2, pp. 1219-1224, Apr. 2000.

Corke "High Performance Visual serving for robots end-point control". SPIE vol. 2056 Intelligent robots and computer vision 1993, 378-387.

Cozman et al. "Robot Localization using a Computer Vision Sextant", IEEE International Midwest Conference on Robotics and Automation, pp. 106-111, 1995.

D'Orazio, et al. "Model based Vision System for mobile robot position estimation", SPIE vol. 2058 Mobile Robots VIII, pp. 38-49, 1992.

De Bakker, et al. "Smart PSD—array for sheet of light range imaging", Proc. of SPIE vol. 3965, pp. 1-12, May 15, 2000.

Desaulniers, et al. "An Efficient Algorithm to find a shortest path for a car-like Robot", IEEE Transactions on robotics and Automation vol. 11 No. 6, pp. 819-828, Dec. 1995.

Dorfmüller-Ulhaas "Optical Tracking From User Motion to 3D Interaction", http://www.cg.tuwien.ac.at/research/publications/2002/Dorfmueller-Ulhaas-thesis, 182 pages, 2002.

Dorsch, et al. "Laser Triangulation: Fundamental uncertainty in distance measurement", Applied Optics, vol. 33 No. 7, pp. 1306-1314, Mar. 1, 1994.

Yuta, et al. "Implementation of an Active Optical Range sensor Using Laser Slit for In-Door Intelligent Mobile Robot", IEE/RSJ International workshop on Intelligent Robots and systems (IROS 91) vol. 1, Osaka, Japan, pp. 415-420, Nov. 3-5, 1991.

(56) References Cited

OTHER PUBLICATIONS

Doty et al. "Sweep Strategies for a Sensory-Driven, Behavior-Based Vacuum Cleaning Agent", AAAI 1993 Fall Symposium Series, Instantiating Real-World Agents, pp. 1-6. Oct. 22-24, 1993.
Electrolux Trilobite, Time to enjoy life, 38 pages http://www.robocon.co.kr/trilobite/Presentation_Trilobite_Kor_030104.ppt accessed Dec. 22, 2011.
Dudek, et al. "Localizing a Robot with Minimum Travel" Proceedings of the sixth annual ACM-SIAM symposium on Discrete algorithms, vol. 27 No. 2 pp. 583-604, Apr. 1998.
Dulimarta, et al. "Mobile Robot Localization in Indoor Environment", Pattern Recognition, vol. 30, No. 1, pp. 99-111, 1997.
EBay "Roomba Timer -> Timed Cleaning—Floorvac Robotic Vacuum", Cgi.ebay.com/ws/eBayISAPI.dll?viewitem&category=43526&item=4375198387&rd=1, 5 pages, Apr. 20, 2005.
Electrolux "Welcome to the Electrolux trilobite" www.electroluxusa.com/node57.asp?currentURL=node142.asp%3F, 2 pages, Mar. 18, 2005.
Eren, et al. "Accuracy in position estimation of mobile robots based on coded infrared signal transmission", Proceedings: Integrating Intelligent Instrumentation and Control, Instrumentation and Measurement Technology Conference, 1995. IMTC/95. pp. 548-551, 1995.
Eren, et al. "Operation of Mobile Robots in a Structured Infrared Environment", Proceedings. 'Sensing, Processing, Networking', IEEE Instrumentation and Measurement Technology Conference, 1997 (IMTC/97), Ottawa, Canada vol. 1, pp. 20-25, May 19-21, 1997.
Everyday Robots "Everyday Robots: Reviews, Discussion and News for Consumers", www.everydayrobots.com/index.php?option=content&task=view&id=9, Apr. 20, 2005, 7 pages.
Evolution Robotics "NorthStar—Low-cost Indoor Localiztion—How it Works", E Evolution robotics , 2 pages, 2005.
Becker, et al. "Reliable Navigation Using Landmarks" IEEE International Conference on Robotics and Automation, 0-7803-1965-6, pp. 401-406, 1995.
Benayad-Cherif, et al., "Mobile Robot Navigation Sensors" SPIE vol. 1831 Mobile Robots, VII, pp. 378-387, 1992.
Facchinetti, Claudio et al. "Using and Learning Vision-Based Self-Positioning for Autonomous Robot Navigation", ICARCV '94, vol. 3 pp. 1694-1698, 1994.
Betke, et al., "Mobile Robot localization using Landmarks" Proceedings of the IEEE/RSJ/GI International Conference on Intelligent Robots and Systems '94 "Advanced Robotic Systems and the Real World" (IROS '94), 8 pages.
Facchinetti, Claudio et al. "Self-Positioning Robot Navigation Using Ceiling Images Sequences", ACCV '95, 5 pages, Dec. 5-8, 1995.
Fairfield, Nathaniel et al. "Mobile Robot Localization with Sparse Landmarks", SPIE vol. 4573 pp. 148-155, 2002.
Favre-Bulle, Bernard "Efficient tracking of 3D—Robot Position by Dynamic Triangulation", IEEE Instrumentation and Measurement Technology Conference IMTC 98 Session on Instrumentation and Measurement in Robotics, vol. 1, pp. 446-449, May 18-21, 1998.
Fayman "Exploiting Process Integration and Composition in the context of Active Vision", IEEE Transactions on Systems, Man, and Cybernetics—Part C: Application and reviews, vol. 29 No. 1, pp. 73-86, Feb. 1999.
Bison, P et al., "Using a structured beacon for cooperative position estimation" Robotics and Autonomous Systems vol. 29, No. 1, pp. 33-40, Oct. 1999.
Blaasvaer, et al. "AMOR—An Autonomous Mobile Robot Navigation System", Proceedings of the IEEE International Conference on Systems, Man, and Cybernetics, pp. 2266-2271, 1994.
Wolf et al. "Robust Vision-Based Localization by Combining an Image-Retrieval System with Monte Carol Localization", IEEE Transactions on Robotics, vol. 21, No. 2, pp. 208-216, Apr. 2005.
Wong "EIED Online>>Robot Business", ED Online ID# 13114, 17 pages, Jul. 2006.
Yamamoto et al. "Optical Sensing for Robot Perception and Localization", 2005 IEEE Workshop on Advanced Robotics and its Social Impacts, pp. 14-17, 2005.
Yata et al. "Wall Following Using Angle Information Measured by a Single Ultrasonic Transducer", Proceedings of the 1998 IEEE, International Conference on Robotics & Automation, Leuven, Belgium, pp. 1590-1596, May 1998.
Yun, et al. "Image-Based Absolute Positioning System for Mobile Robot Navigation", IAPR International Workshops SSPR, Hong Kong, pp. 261-269, Aug. 17-19, 2006.
Yun, et al. "Robust Positioning a Mobile Robot with Active Beacon Sensors", Lecture Notes in Computer Science, 2006, vol. 4251, pp. 890-897, 2006.
Zha et al. "Mobile Robot Localization Using Incomplete Maps for Change Detection in a Dynamic Environment", Advanced Intelligent Mechatronics '97. Final Program and Abstracts., IEEE/ASME International Conference, pp. 110, Jun. 16-20, 1997.
Zhang, et al. "A Novel Mobile Robot Localization Based on Vision", SPIE vol. 6279, 6 pages, Jan. 29, 2007.
Prassler et al., "A Short History of Cleaning Robots", Autonomous Robots 9, 211-226, 2000, 16 pages.
Remazeilles, et al. "Image based robot navigation in 3D environments", Proc. of SPIE, VOl. 6052, pp. 1-14, Dec. 6, 2005.
Rives, et al. "Visual servoing based on ellipse features", SPIE vol. 2056 Intelligent Robots and Computer Vision pp. 356-367, 1993.
Robotics World Jan. 2001: "A Clean Sweep" (Jan. 2001)., 5 pages.
Ronnback "On Methods for Assistive Mobile Robots", http://www.openthesis.org/documents/methods-assistive-mobile-robots-595019.html, 218 pages, Jan. 1, 2006.
Roth-Tabak, et al. "Environment Model for mobile Robots Indoor Navigation", SPIE vol. 1388 Mobile Robots pp. 453-463, 1990.
Sadath M Malik et al. "Virtual Prototyping for Conceptual Design of a Tracked Mobile Robot". Electrical and Computer Engineering, Canadian Conference on, IEEE, PI. May 1, 2006, pp. 2349-2352.
Sahin, et al. "Development of a Visual Object Localization Module for Mobile Robots", 1999 Third European Workshop on Advanced Mobile Robots, (Eurobot '99), pp. 65-72, 1999.
Salomon, et al. "Low-Cost Optical Indoor Localization system for Mobile Objects without Image Processing", IEEE Conference on Emerging Technologies and Factory Automation, 2006. (ETFA '06), pp. 629-632, Sep. 20-22, 2006.
Sato "Range Imaging Based on Moving Pattern Light and Spatio-Temporal Matched Filter", Proceedings International Conference on Image Processing, vol. 1., Lausanne, Switzerland, pp. 33-36, Sep. 16-19, 1996.
Schenker, et al. "Lightweight rovers for Mars science exploration and sample return", Intelligent Robots and Computer Vision XVI, SPIE Proc. 3208, pp. 24-36, 1997.
Schofield Monica "Neither Master nor slave" A Practical Study in the Development and Employment of Cleaning Robots, Emerging Technologies and Factory Automation, 1999 Proceedings ETFA '99 1999 7th IEEE International Conference on Barcelona, Spain, Oct. 18-21, 1999, pp. 1427-1434.
Shimoga et al. "Touch and Force Reflection for Telepresence Surgery", Engineering in Medicine and Biology Society, 1994. Engineering Advances: New Opportunities for Biomedical Engineers. Proceedings of the 16th Annual International Conference of the IEEE, Baltimore, MD, pp. 1049-1050, 1994.
Sim, et al "Learning Visual Landmarks for Pose Estimation", IEEE International Conference on Robotics and Automation, vol. 3, Detroit, MI, pp. 1972-1978, May 10-15, 1999.
Sobh et al. "Case Studies in Web-Controlled Devices and Remote Manipulation", Automation Congress, 2002 Proceedings of the 5th Biannual World, pp. 435-440, Dec. 10, 2002.
Stella, et al. "Self-Location for Indoor Navigation of Autonomous Vehicles", Part of the SPIE conference on Enhanced and Synthetic Vision SPIE vol. 3364 pp. 298-302, 1998.
Summet "Tracking Locations of Moving Hand-held Displays Using Projected Light", Pervasive 2005, LNCS 3468 pp. 37-46 (2005).
Svedman et al. "Structure from Stereo Vision using Unsynchronized Cameras for Simultaneous Localization and Mapping", 2005 IEEE/RSJ International Conference on Intelligent Robots and Systems, pp. 2993-2998, 2005.

(56) References Cited

OTHER PUBLICATIONS

Takio et al. "Real-Time Position and Pose Tracking Method of Moving Object Using Visual Servo System", 47th IEEE International Symposium on Circuits and Systems, pp. 167-170, 2004.
Teller "Pervasive pose awareness for people, Objects and Robots", http://www.ai.mit.edu/lab/dangerous-ideas/Spring2003/teller-pose.pdf, 6 pages, Apr. 30, 2003.
Terada et al. "An Acquisition of the Relation between Vision and Action using Self-Organizing Map and Reinforcement Learning", 1998 Second International Conference on Knowledge-Based Intelligent Electronic Systems, Adelaide, Australiam pp. 429-434, Apr. 21-23, 1998.
The Sharper Image "E Vac Robotic Vacuum", www.sharperiamge.com/us/en/templates/products/pipmorework1printable.jhtml, 2 pages, Mar. 18, 2005.
TheRobotStore.com "Friendly Robotics Robotic Vacuum RV400—The Robot Store", www.therobotstore.com/s.nl/sc.9/category.-109/it.A/id.43/.f, 1 page, Apr. 20, 2005.
TotalVac.com RC3000 RoboCleaner website Mar. 18, 2005, 3 pages.
Trebi-Ollennu et al. "Mars Rover Pair Cooperatively Transporting a Long Payload", Proceedings of the 2002 IEEE International Conference on Robotics & Automation, Washington, D.C. pp. 3136-3141, May 2002.
Tribelhorn et al., "Evaluating the Roomba: A low-cost, ubiquitous platform for robotics research and education," 2007, IEEE, p. 1393-1399.
Tse et al. "Design of a Navigation System for a Household Mobile Robot Using Neural Networks", Department of Manufacturing Engg. & Engg. Management, City University of Hong Kong, pp. 2151-2156, 1998.
UAMA (Asia) Industrial Co., Ltd. "RobotFamily", 2005, 1 page.
Watanabe et al. "Position Estimation of Mobile Robots With Internal and External Sensors Using Uncertainty Evolution Technique", 1990 IEEE International Conference on Robotics and Automation, Cincinnati, OH, pp. 2011-2016, May 13-18, 1990.
Watts "Robot, boldly goes where no man can", The Times—pp. 20, Jan. 1985.
Wijk et al. "Triangulation-Based Fusion of Sonar Data with Application in Robot Pose Tracking", IEEE Transactions on Robotics and Automation, vol. 16, No. 6, pp. 740-752, Dec. 2000.
Wolf et al. "Robust Vision-based Localization for Mobile Robots Using an Image Retrieval System Based on Invariant Features", Proceedings of the 2002 IEEE International Conference on Robotics & Automation, Washington, D.C. pp. 359-365, May 2002.
Robot Buying Guide, LG announces the first robotic vacuum cleaner for Korea, Apr. 21, 2003 http://robotbg.com/news/2003/04/22/lg_announces_the_first_robotic_vacu, 1 page.
Taipei Times, Robotic vacuum by Matsuhita about ot undergo testing, Mar. 26, 2002 http://www.taipeitimes.com/News/worldbiz/archives/2002/03/26/0000129338 accessed, 2.
Special Reports, Vacuum Cleaner Robot Operated in Conjunction with 3G Celluar Phone vol. 59, No. 9 (2004) 3 pages http://www.toshiba.co.jp/tech/review/2004/09/59_0.
Lambrinos, et al. "A mobile robot employing insect strategies for navigation", http://www8.cs.umu.se/kurser/TDBD17/VT04/dl/Assignment%20Papers/lambrinos-RAS-2000.pdf, 38 pages, Feb. 19, 1999.
Lang et al. "Visual Measurement of Orientation Using Ceiling Features", 1994 IEEE, pp. 552-555, 1994.
Lapin, "Adaptive position estimation for an automated guided vehicle", SPIE vol. 1831 Mobile Robots VII, pp. 82-94, 1992.
Morland,"Autonomous Lawnmower Control", Downloaded from the internet at: http://cns.bu.edu/~cjmorlan/robotics/lawnmower/report.pdf, 10 pages, Jul. 24, 2002.
LaValle et al. "Robot Motion Planning in a Changing, Partially Predictable Environment", 1994 IEEE International Symposium on Intelligent Control, Columbus, OH, pp. 261-266, Aug. 16-18, 1994.
Lee, et al. "Localization of a Mobile Robot Using the Image of a Moving Object", IEEE Transaction on Industrial Electronics, vol. 50, No. 3 pp. 612-619, Jun. 2003.

Lee, et al. "Development of Indoor Navigation system for Humanoid Robot Using Multi-sensors Integration", ION NTM, San Diego, CA pp. 798-805, Jan. 22-24, 2007.
Leonard, et al. "Mobile Robot Localization by tracking Geometric Beacons", IEEE Transaction on Robotics and Automation, vol. 7, No. 3 pp. 376-382, Jun. 1991.
Li et al. "Making a Local Map of Indoor Environments by Swiveling a Camera and a Sonar", Proceedings of the 1999 IEEE/RSJ International Conference on Intelligent Robots and Systems, pp. 954-959, 1999.
Lin, et al.. "Mobile Robot Navigation Using Artificial Landmarks", Journal of robotics System 14(2). pp. 93-106, 1997.
Linde "Dissertation, "On Aspects of Indoor Localization"" https://eldorado.tu-dortmund.de/handle/2003/22854, University of Dortmund, 138 pages, Aug. 28, 2006.
Lumelsky, et al. "An Algorithm for Maze Searching with Azimuth Input", 1994 IEEE International Conference on Robotics and Automation, San Diego, CA vol. 1, pp. 111-116, 1994.
Luo et al., "Real-time Area-Covering Operations with Obstacle Avoidance for Cleaning Robots," 2002, IEeE, p. 2359-2364.
Ma "Thesis: Documentation on Northstar", California Institute of Technology, 14 pages, May 17, 2006.
Madsen, et al. "Optimal landmark selection for triangulation of robot position", Journal of Robotics and Autonomous Systems vol. 13 pp. 277-292, 1998.
Matsutek Enterprises Co. Ltd "Automatic Rechargeable Vacuum Cleaner", http://matsutek.manufacturer.globalsources.com/si/6008801427181/pdtl/Home-vacuum/10 . . . , Apr. 23, 2007, 3 pages.
McGillem, et al. "Infra-red Lacation System for Navigation and Autonomous Vehicles", 1988 IEEE International Conference on Robotics and Automation, vol. 2, pp. 1236-1238, Apr. 24-29, 1988.
McGillem,et al. "A Beacon Navigation Method for Autonomous Vehicles", IEEE Transactions on Vehicular Technology, vol. 38, No. 3, pp. 132-139, Aug. 1989.
Michelson "Autonomous Navigation", 2000 Yearbook of Science & Technology, McGraw-Hill, New York, ISBN 0-07-052771-7, pp. 28-30, 1999.
Miro, et al. "Towards Vision Based Navigation in Large Indoor Environments", Proceedings of the IEEE/RSJ International Conference on Intelligent Robots and Systems, Beijing, China, pp. 2096-2102, Oct. 9-15, 2006.
MobileMag "Samsung Unveils High-tech Robot Vacuum Cleaner", http://www.mobilemag.com/content/100/102/C2261/, 4 pages, Mar. 18, 2005.
Monteiro, et al. "Visual Servoing for Fast Mobile Robot: Adaptive Estimation of Kinematic Parameters", Proceedings of the IECON '93., International Conference on Industrial Electronics, Maui, HI, pp. 1588-1593, Nov. 15-19, 1993.
Moore, et al. A simple Map-bases Localization strategy using range measurements, SPIE vol. 5804 pp. 612-620, 2005.
Munich et al. "SIFT-ing Through Features with ViPR", IEEE Robotics & Automation Magazine, pp. 72-77, Sep. 2006.
Munich et al. "ERSP: A Software Platform and Architecture for the Service Robotics Industry", Intelligent Robots and Systems, 2005. (IROS 2005), pp. 460-467, Aug. 2-6, 2005.
Nam, et al. "Real-Time Dynamic Visual Tracking Using PSD Sensors and extended Trapezoidal Motion Planning", Applied Intelligence 10, pp. 53-70, 1999.
Nitu et al. "Optomechatronic System for Position Detection of a Mobile Mini-Robot", IEEE Ttransactions on Industrial Electronics, vol. 52, No. 4, pp. 969-973, Aug. 2005.
On Robo "Robot Reviews Samsung Robot Vacuum (VC-RP30W)", www.onrobo.com/reviews/AT_Home/vacuum_cleaners/on00vcrb30rosam/index.htm . . . 2 pages, 2005.
OnRobo "Samsung Unveils Its Multifunction Robot Vacuum", www.onrobo.com/enews/02101samsung_vacuum.shtml, 3 pages, Mar. 18, 2005.
Pages et al. "Optimizing Plane-to-Plane Positioning Tasks by Image-Based Visual Servoing and Structured Light", IEEE Transactions on Robotics, vol. 22, No. 5, pp. 1000-1010, Oct. 2006.

(56) References Cited

OTHER PUBLICATIONS

Pages et al. "A camera-projector system for robot positioning by visual servoing", Proceedings of the 2006 Conference on Computer Vision and Pattern Recognition Workshop (CVPRW06), 8 pages, Jun. 17-22, 2006.
Pages, et al. "Robust decoupled visual servoing based on structured light", 2005 IEEE/RSJ Int. Conf. on Intelligent Robots and Systems, pp. 2676-2681, 2005.
Park et al. "A Neural Network Based Real-Time Robot Tracking Controller Using Position Sensitive Detectors," IEEE World Congress on Computational Intelligence., 1994 IEEE International Conference on Neutral Networks, Orlando, Florida pp. 2754-2758, Jun. 27-Jul. 2, 1994.
Park, et al. "Dynamic Visual Servo Control of Robot Manipulators using Neutral Networks", The Korean Institute Telematics and Electronics, vol. 29-B, No. 10, pp. 771-779, Oct. 1992.
Paromtchik, et al. "Optical Guidance System for Multiple mobile Robots", Proceedings 2001 ICRA. IEEE International Conference on Robotics and Automation, vol. 3, pp. 2935-2940 (May 21-26, 2001).
Penna, et al. "Models for Map Building and Navigation", IEEE Transactions on Systems. Man. and Cybernetics. vol. 23 No. 5, pp. 1276-1301, Sep./Oct. 1993.
Pirjanian "Reliable Reaction", Proceedings of the 1996 IEEE/SICE/RSJ International Conference on Multisensor Fusion and Integration for Intelligent Systems, pp. 158-165, 1996.
Pirjanian "Challenges for Standards for consumer Robotics", IEEE Workshop on Advanced Robotics and its Social impacts, pp. 260-264, Jun. 12-15, 2005.
Pirjanian et al. "Distributed Control for a Modular, Reconfigurable Cliff Robot", Proceedings of the 2002 IEEE International Conference on Robotics & Automation, Washington, D.C. pp. 4083-4088, May 2002.
Pirjanian et al. "Representation and Execution of Plan Sequences for Multi-Agent Systems", Proceedings of the 2001 IEEE/RSJ International Conference on Intelligent Robots and Systems, Maui, Hawaii, pp. 2117-2123, Oct. 29-Nov. 3, 2001.
Pirjanian et al. "Multi-Robot Target Acquisition using Multiple Objective Behavior Coordination", Proceedings of the 2000 IEEE International Conference on Robotics & Automation, San Francisco, CA, pp. 2696-2702, Apr. 2000.
Pirjanian et al. "A decision-theoretic approach to fuzzy behavior coordination", 1999 IEEE International Symposium on Computational Intelligence in Robotics and Automation, 1999. CIRA '99., Monterey, CA, pp. 101-106, Nov. 8-9, 1999.
Pirjanian et al. "Improving Task Reliability by Fusion of Redundant Homogeneous Modules Using Voting Schemes", Proceedings of the 1997 IEEE International Conference on Robotics and Automation, Albuquerque, NM, pp. 425-430, Apr. 1997.
McLurkin "The Ants: A community of Microrobots", Paper submitted for requirements of BSEE at MIT, May 21, 1995, 60 pages.
McLurkin Stupid Robot Tricks: A Behavior-based Distributed Algorithm Library for Programming Swarms of Robots, Paper submitted for requirements of BSEE at MIT, May 2004, 127 pages.
Kurth, "Range-Only Robot Localization and SLAM with Radio", http://www.ri.cmu.edu/pub_files/pub4/kurth_derek_2004_1/kurth_derek_2004_1.pdf. 60 pages, May 2004, accessed Jul. 27, 2012.
Florbot GE Plastics, 1989-1990, 2 pages, available at http://www.fuseid.com/, accessed Sep. 27, 2012.

\* cited by examiner

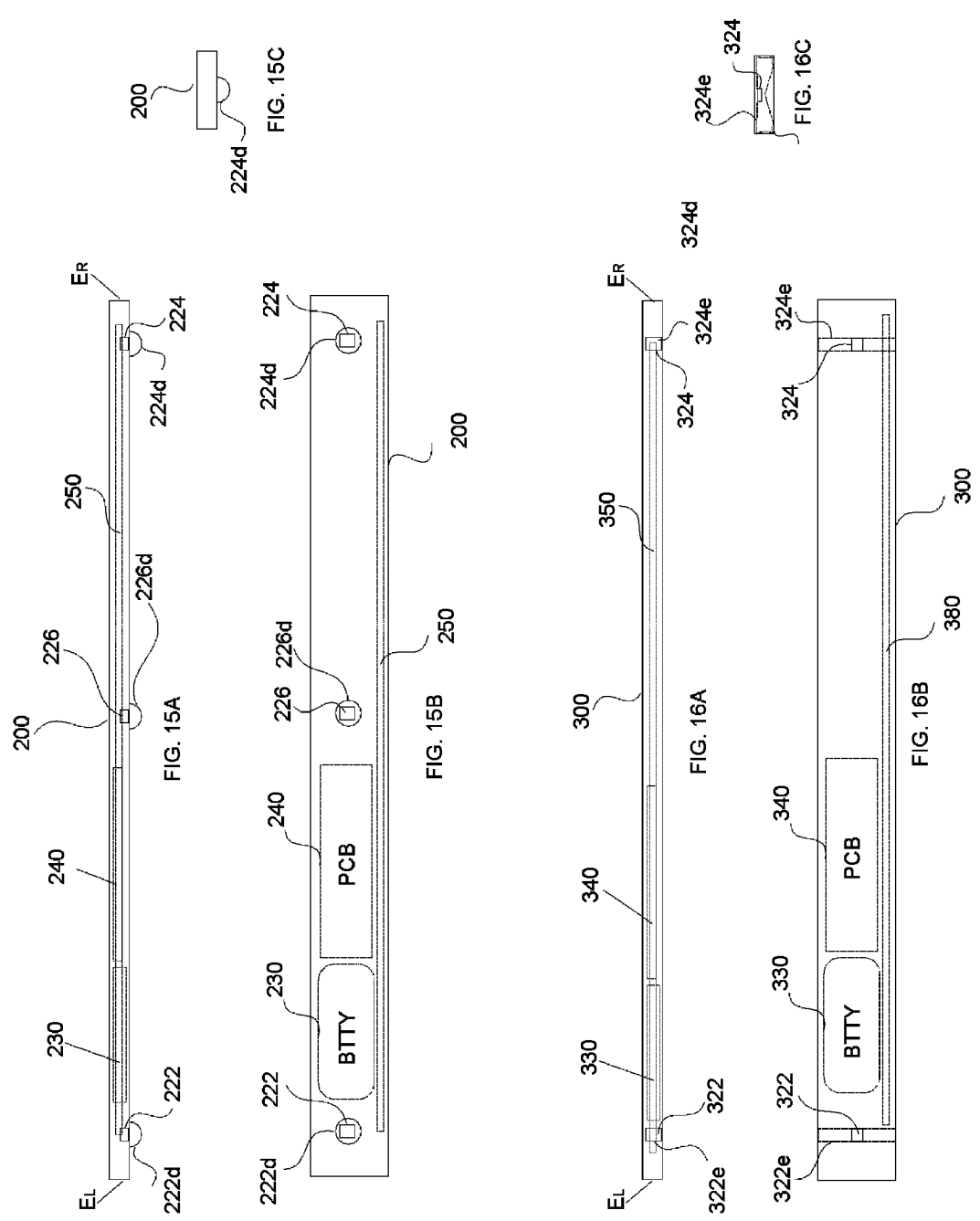

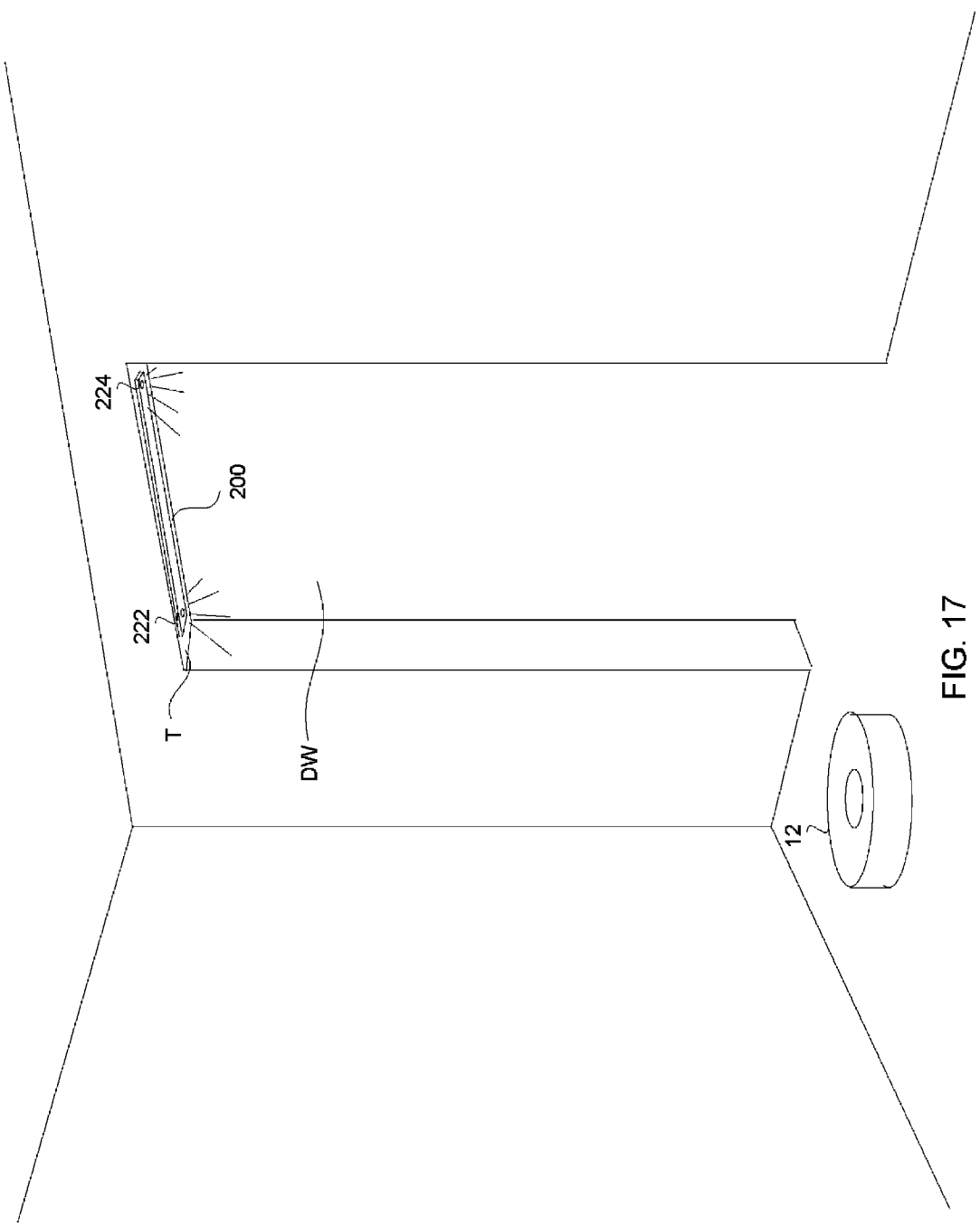

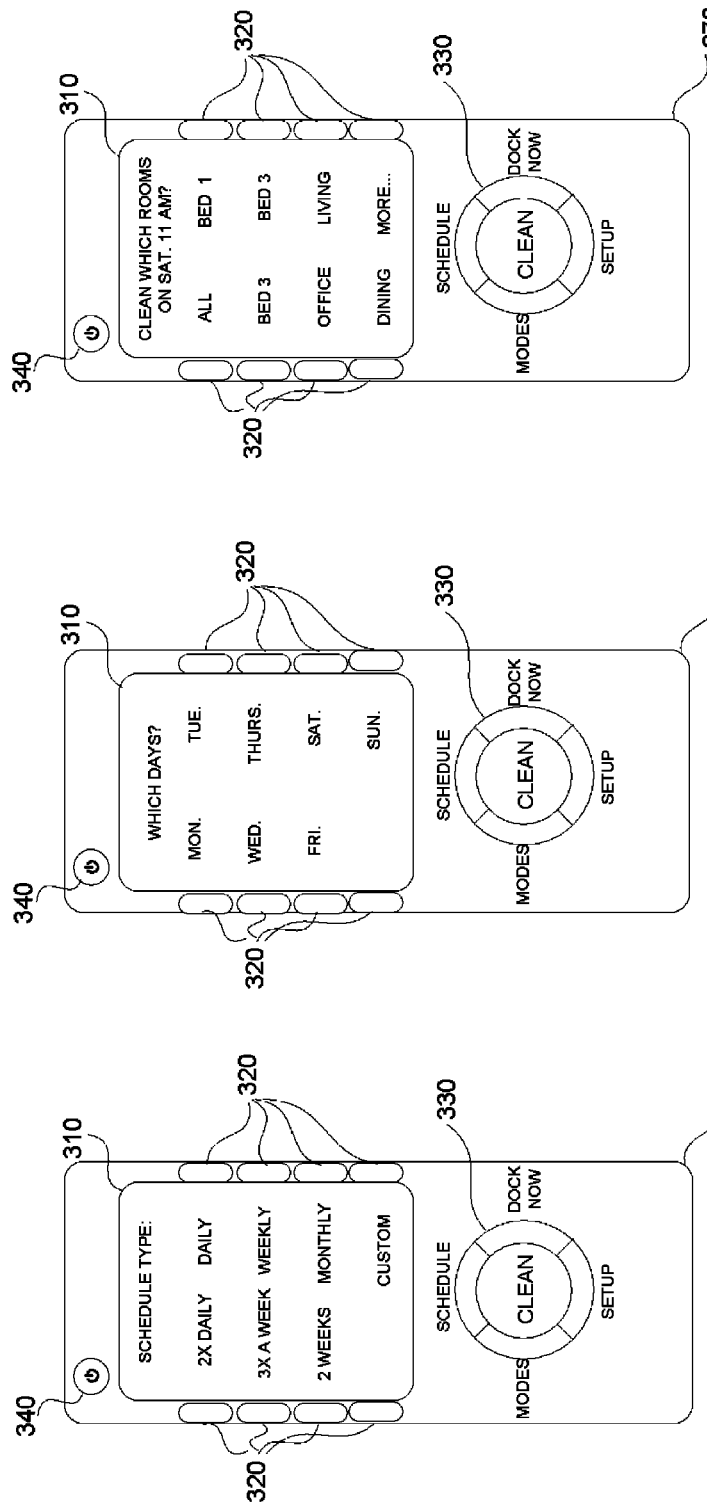

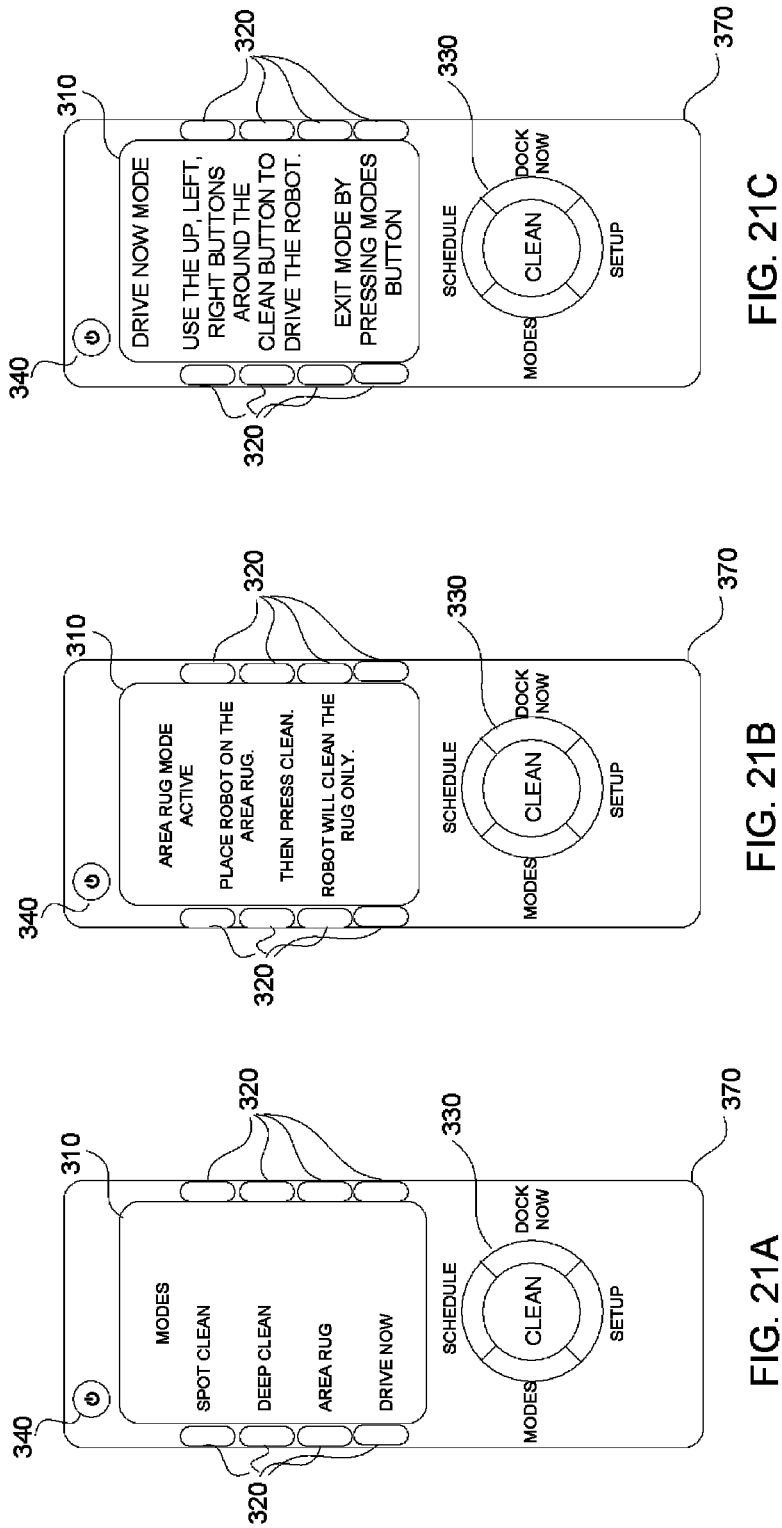

CELESTIAL NAVIGATION SYSTEM FOR AN AUTONOMOUS VEHICLE

INTRODUCTION

This application is a continuation-in-part of U.S. patent application Ser. No. 12/415,554, filed Mar. 3, 2009 now U.S. Pat. No. 8,594,840 and U.S. patent application Ser. No. 12/415,512, filed Mar. 3, 2009. These two Applications are continuations of U.S. patent application Ser. No. 11/176,048, filed Jul. 7, 2005 now U.S. Pat. No. 7,706,917, which claims priority to and incorporates by reference U.S. Provisional Patent Application No. 60/586,046, entitled "Celestial Navigation System for an Autonomous vehicle," filed on Jul. 7, 2004.

The present teachings relate to robotic systems and, more specifically, to navigation systems for autonomous vehicles.

BACKGROUND

Autonomous vehicles including robotic devices are becoming more prevalent today and are used to perform tasks traditionally considered mundane, time-consuming, or dangerous. As programming technology increases, so does the demand for robotic devices that can navigate around a complex environment or working space with little or no assistance from a human operator.

Autonomous vehicles and associated controls, navigation systems, and other related systems are being developed. For example, U.S. Pat. No. 6,594,844 discloses a Robot Obstacle Detection System, the disclosure of which is hereby incorporated by reference in its entirety. Additional robot control and navigation systems, and other related systems, are disclosed in PCT Published Patent Application No. WO 2004/025947, and in U.S. Pat. Nos. 6,809,490, 6,690,134, 6,781,338, 7,024,278, 6,883,201, and 7,332,890, the disclosures of which are hereby incorporated by reference in their entireties.

Many autonomous vehicles navigate a working space by moving randomly until an obstacle is encountered. Generally, these types of vehicles have on-board obstacle detectors, such as bump sensors or similar devices, which register contact with an obstacle. Once contact is made, command routines can direct the autonomous vehicle to move in a direction away from the obstacle. These types of systems, which are useful for obstacle avoidance, are limited in their ability to allow an autonomous vehicle to track its location within a room or other working environment. Other systems, often used in conjunction with bump sensors as described above, use an infrared or other detector to sense the presence of nearby walls, obstacles, or other objects, and either follow the obstacle or direct the vehicle away from it. These systems, however, are also limited in their ability to allow an autonomous vehicle to navigate effectively in a complex environment, as they only allow the vehicle to recognize when objects are in its immediate vicinity.

In more advanced navigation systems, an autonomous vehicle comprises an infrared or other type of transmitter, which directs a series of infrared patterns in horizontal directions around the autonomous vehicle. These patterns can be detected by a stationary receiver placed at or near a boundary of the working space, for example on a wall. A microprocessor can use the information from signals generated by the receiver to calculate where in the working space the autonomous vehicle is located at all times. Using such systems, the vehicle can navigate around an entire area. These systems, however, are best employed in working spaces where few objects are present that may interfere with the dispersed patterns of infrared signals.

Limitations of the above types of navigation systems are, at present, a hurdle to creating a highly independent autonomous vehicle that can navigate in a complex environment.

SUMMARY

The present teachings provide a navigation control system for an autonomous vehicle. The system comprises a transmitter and an autonomous vehicle. The transmitter comprises an emitter for emitting at least one signal, a power source for powering the emitter, a device for capturing wireless energy to charge the power source, and a printed circuit board for converting the captured wireless energy to a form for charging the power source. The autonomous vehicle operates within a working area and comprises a receiver for detecting the at least one signal emitted by the emitter, and a processor for determining a relative location of the autonomous vehicle within the working area based on the signal emitted by the emitter.

The present teachings also provide a transmitter for use in a navigation control system for an autonomous vehicle. The transmitter comprises an emitter for emitting at least one signal, a power source for powering the emitter, a device for capturing wireless energy to charge the power source, and a printed circuit board for converting the captured wireless energy to a form for charging the power source.

The present teachings further provide a method for controlling navigation of an autonomous vehicle within one or more work areas. The method comprises emitting one or more signals from a transmitter, receiving the one or more signals on the autonomous vehicle, powering the transmitter with a power source, charging the power source wirelessly, localizing the autonomous vehicle with respect to the transmitter, and navigating the autonomous vehicle within the one or more work areas.

Additional objects and advantages of the present teachings will be set forth in part in the description which follows, and in part will be obvious from the description, or may be learned by practice of the teachings. The objects and advantages of the present teachings will be realized and attained by means of the elements and combinations particularly pointed out in the appended claims.

It is to be understood that both the foregoing general description and the following detailed description are exemplary and explanatory only and are not restrictive of the present teachings, as claimed.

The accompanying drawings, which are incorporated in and constitute a part of this specification, illustrate several embodiments of the present teachings and together with the description, serve to explain the principles of the present teachings.

BRIEF DESCRIPTION OF THE DRAWINGS

FIGS. 15A-15C illustrate side, bottom, and end views, respectively, of an exemplary embodiment of a transmitter in accordance with the present teachings.

FIGS. 16A-16C illustrate side, bottom, and end views, respectively, of another exemplary embodiment of a transmitter in accordance with the present teachings.

FIG. 17 illustrates the transmitter of FIGS. 15A-15C used in a doorway.

FIGS. 20A-20C illustrate exemplary embodiments of schedule screens on an exemplary remote control in accordance with the present teachings.

FIGS. 21A-21C illustrate exemplary embodiments of mode screen on an exemplary remote control in accordance with the present teachings.

DESCRIPTION OF THE PRESENT TEACHINGS

Reference will now be made in detail to embodiments of the present teachings, examples of which are illustrated in the accompanying drawings. Wherever possible, the same reference numbers will be used throughout the drawings to refer to the same or like parts.

Figure 1:
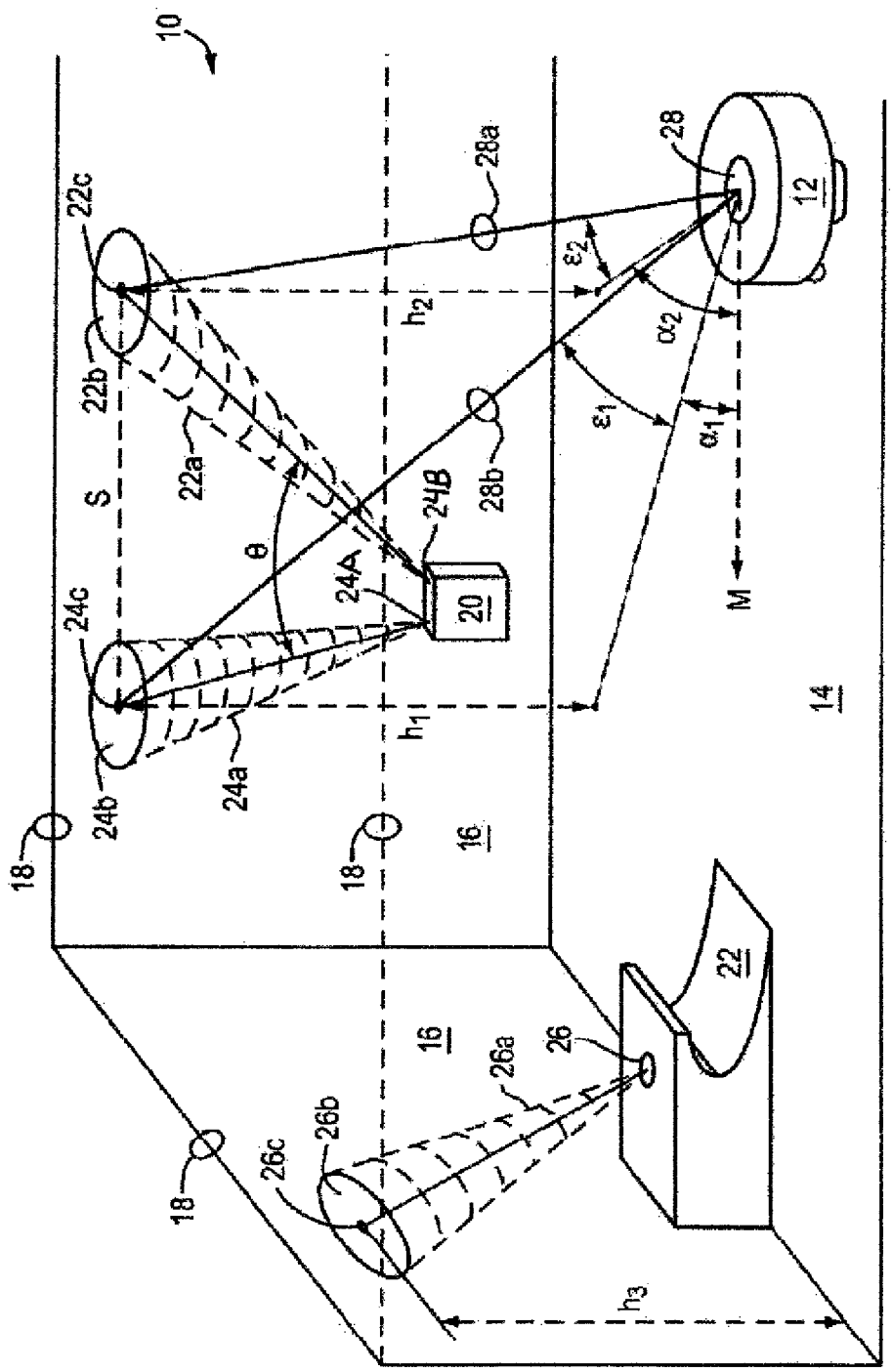
FIG. 1 is a schematic view of a navigation system for an autonomous vehicle in accordance with an exemplary embodiment of the present teachings.

In accordance with an exemplary implementation of the present teachings, FIG. 1 is a schematic view of a navigation system 10 for an autonomous vehicle such as a robotic cleaning device 12. The components of the system 10 include, in this embodiment, a transmitter 20, a charging or base station 22, and an autonomous vehicle 12 that operates in a room or other similar working area 14. The working area 14 can be a floor of a room, bounded at least in part by walls 16. Borders of a ceiling 18 intersect the walls 16 and are remote from the working area 14. The depicted transmitter 20 includes two emitters 24A, 24B. In this exemplary embodiment, the base station 22 includes an emitter 26 as well. In various embodiments, any combination or quantity of emitters may be used on the base station 22, or transmitter 20, or both. The autonomous vehicle 12 can include an on-board microprocessor, power and drive components, task-specific components (dirt sensors, vacuums, brushes, etc.), and at least one receiver, such as an infrared receiver 28. The vehicle 12 may also include certain buttons, switches, etc. for programming the robot, or such instructions may be directed by a remote control (see FIG. 18) or a personal computer (not shown). Depending on the application, certain components may be removed from the disclosed system 10, or other components may be added.

For simplicity, this disclosure will describe vacuuming as a demonstrative task of the depicted robotic cleaning device 12. It will be apparent, though, that the navigation system disclosed herein has wide applications across a variety of autonomous systems. For example, an autonomous vehicle may be used for floor waxing and polishing, floor scrubbing, ice resurfacing, sweeping and vacuuming, unfinished floor sanding, stain/paint application, ice melting and snow removal, grass cutting, etc. Any number of task-specific components may be required for such duties, and may each be incorporated into the autonomous vehicle, as necessary.

The transmitter 20 directs at least two infrared signals 22a, 24a from emitters 24A and 24B to a surface remote from the working area 14 upon which the autonomous vehicle 12 operates. The depicted embodiment directs the infrared signals 22a, 24a to the ceiling 18, but it may also direct the signals 22a, 24a to a portion of a wall 16 or to both the walls 16 and ceiling 18. The signals 22a, 24a can be directed to a variety of points on the remote surface, but directing the signals as high as possible above the working area 14 can allow the signals 22a, 24a to be more easily detected by the autonomous vehicle 12, because the field of view of the autonomous vehicle's receiver 28 is less likely to be blocked by an obstacle (such as, for example, a high-backed chair or tall plant). In this disclosure, the regions of contact 22b, 24b of the signals 22a, 24a on the remote surface will be referred to as "points," regardless of the size of the intersection. For example, by using a collimator in conjunction with the emitters (described below), the points of intersection 22b, 24b of the signals 22a, 24a can be a finite area with the signal strongest at approximately central points.

In certain embodiments of the transmitter 20, the signals 22a, 24a are directed toward a ceiling 18, at two points 22c, 24c, forming a line proximate and parallel to the wall 16 upon which the transmitter 20 is located. Alternatively, and as depicted in FIG. 1, the signals 22a, 24a can be directed away from the wall 16, at an angle of approximately 5° or more, to avoid interference with objects such as pictures secured to or hung from the wall 16. The signals 22a, 24a can be transmitted at a known angle θ therebetween. In an exemplary embodiment, angle θ can equal approximately 30°, but other angles are contemplated by the present teachings. In accordance with certain embodiments, angle θ can be set at the time of manufacture or user-defined based on particular applications or other requirements. By setting the angle θ to a known value, the distance S between the signals 22a, 24a at the point of contact 22c, 24c with ceiling 18 may be determined, provided the heights of the ceiling $h_1$, $h_2$ at the points of contact 22c, 24c are known. When used on a flat ceiling 18, as depicted, $h_1$ equals $h_2$. In the embodiment depicted in FIG. 1, base station 22 emits a signal 26a that can serve as an additional or optional signal for utilization by the autonomous vehicle 12. Signal 26a is directed toward a wall 16, so that the point of contact 26b is high enough to avoid objects that may obstruct the autonomous vehicle's field of view. A central point 26c (or laser point) of the point of contact 26b contacts the wall 16 at height h3.

As the autonomous vehicle 12 moves within a working area 14, it detects the signals 22a, 24a emitted by the transmitter 20 as energy bouncing or reflecting off of the diffuse ceiling surface 18. In an alternative embodiment, visible points can be used in place of infrared points. A camera onboard the autonomous vehicle can replace the infrared receiver in detecting either infrared or visible points. The autonomous vehicle's microprocessor can convert the signals 22a, 24a sensed by the receiver 28 into bearings from the robot 12 to the signals 22a, 24a. The microprocessor can then calculate representative elevation angles $\epsilon_1$, $\epsilon_2$ and azimuths $\alpha_1$, $\alpha_2$ of the signals to determine the location of the autonomous vehicle 12 within the working area 14. In this embodiment, the azimuths $\alpha_1$, $\alpha_2$ are measured using a "forward" direction of movement M of the autonomous vehicle 12 as a datum, but any suitable datum can be used. By calculating the elevation angle and azimuth from the autonomous vehicle 12 to the two signals 22a, 24a, the autonomous vehicle 12 can locate itself within a working area with improved accuracy.

Figure 2:
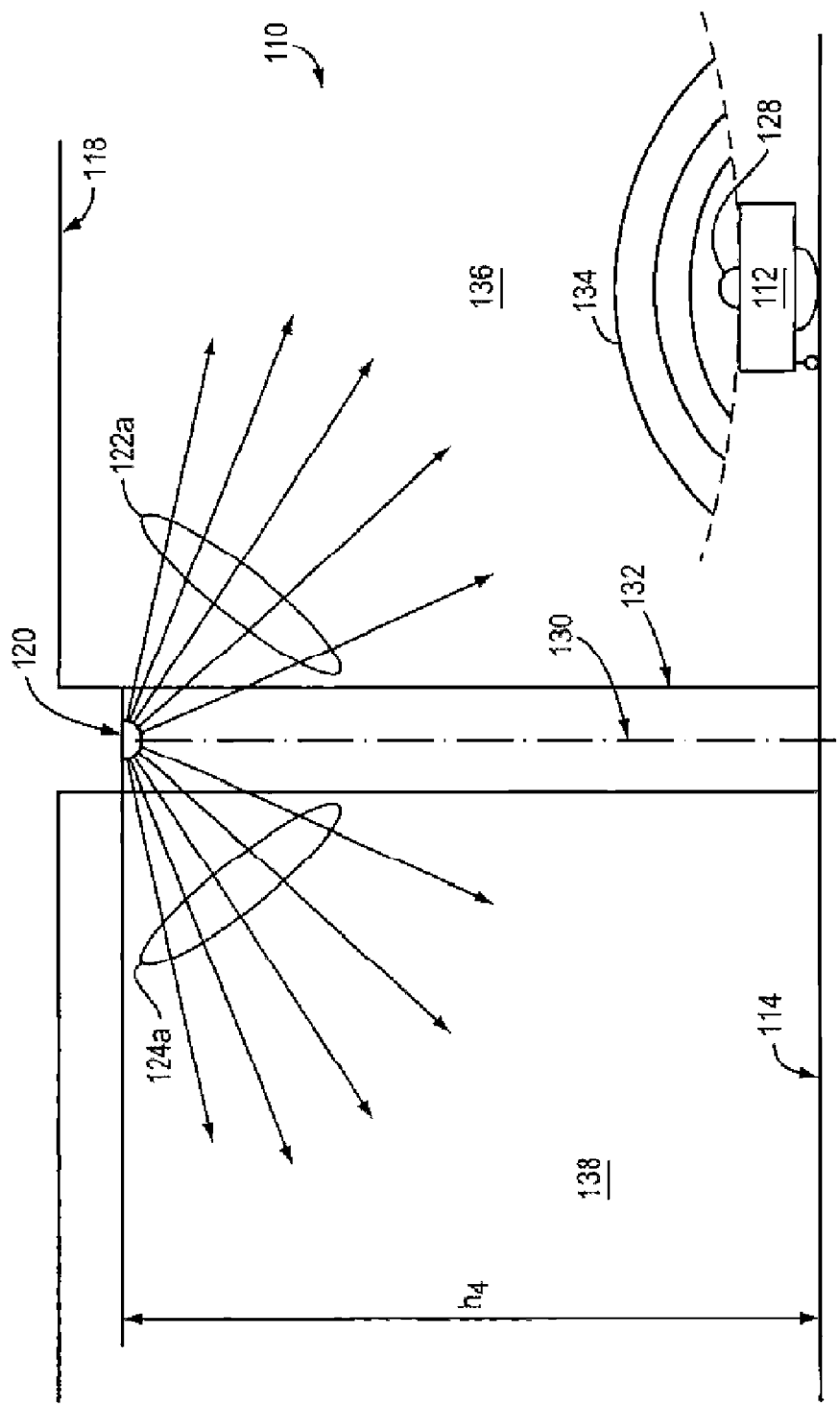
FIG. 2 is a schematic view of a navigation system for an autonomous vehicle in accordance with another exemplary embodiment of the present teachings.

FIG. 2 depicts another exemplary embodiment of a navigation system 110 for an autonomous vehicle 112. In the illustrated exemplary embodiment, an autonomous vehicle 112 moves in a working area having a floor 114. A transmitter 120 can be mounted at a top frame of a doorway 132 between two rooms 136, 138. Similar to the embodiment depicted in FIG. 1, the transmitter 120 is installed at a known distance $h_4$ above the floor 114. In alternative embodiments, the transmitter 120 can be installed at the height of the ceiling 118. The transmitter 120 can be recessed within the door frame 130 or ceiling 118 to reduce its profile and limit its impact on architectural aesthetics of a room. Additionally, the transmitter 120 can be disguised to resemble a cover plate for a sprinkler head, speaker, or other device.

The transmitter 120 emits two signals 122a, 124a (depicted graphically by a plurality of arrows) into the two rooms 136, 138, respectively. The signals 122a, 124a can be configured to not overlap each other, thus providing a distinct signal on each side of the door centerline 130. In other embodiments, an overlap of the signals 122a, 124a can be desirable. The autonomous vehicle 112 includes a receiver 128 having a field of vision 134. The emitted signals 122a, 124a can be detected by the receiver 128 when the autonomous vehicle's field of vision 134 intersects the signals 122a, 124a. Similar to the embodiment of FIG. 1, the autonomous vehicle can calculate the azimuth and elevation to the transmitter 120 to determine its relative location. Similar to the embodiment described above, by detecting only one signal, the autonomous vehicle 112 can calculate a bearing to the transmitter 120. Accordingly, the transmitter 120 functions as a beacon for the autonomous vehicle 112 to follow and, if the signal is coded, the autonomous vehicle 112 can determine which room of a number of rooms it is located in, based on the coded signal. The autonomous vehicle 112 is thus able to determine its relative location, on a room-by-room basis, as opposed to determining its location within a room. Exemplary embodiments of a doorway-based transmitter are described in more detail with reference to FIGS. 15-18.

Figure 3A:
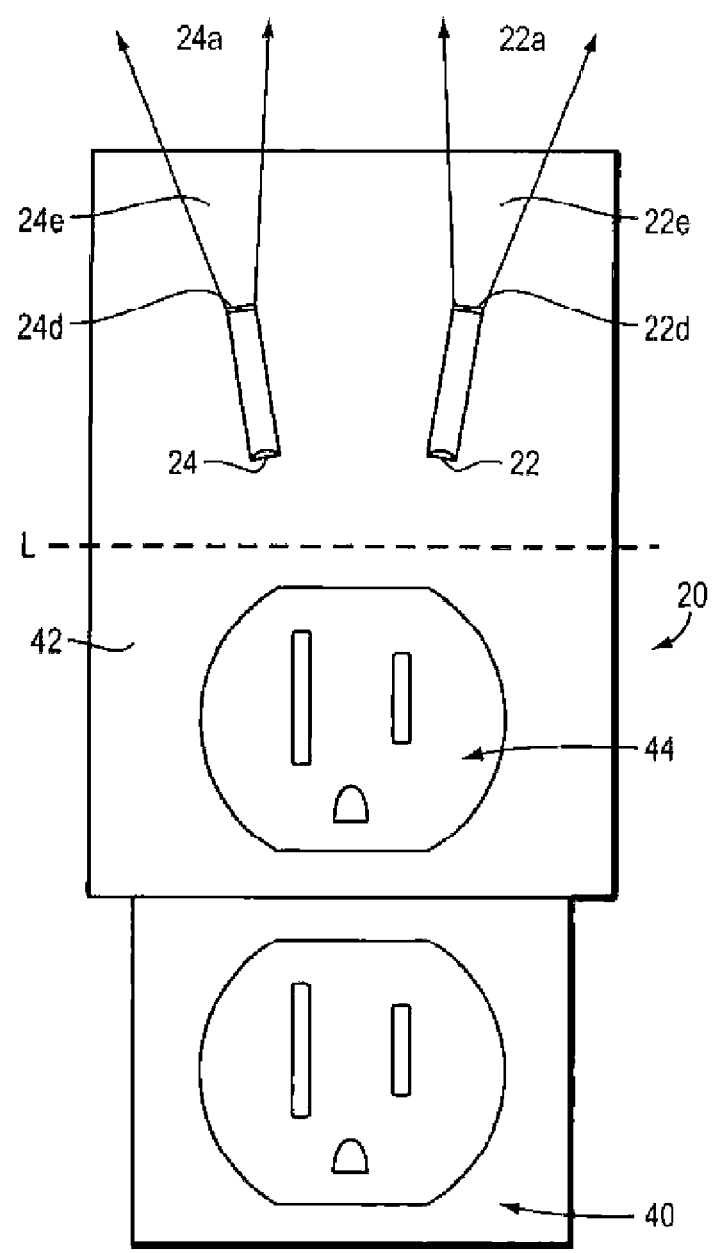
FIG. 3A is a side view of a stationary emitter in accordance with an exemplary embodiment of the present teachings.

FIG. 3A shows a transmitter 20 in accordance with certain embodiments of the present teachings. The depicted transmitter 20 receives power from a wall outlet 40 for convenience and unobtrusiveness, but one skilled in the art will appreciate that transmitters can be powered by means other than a wall outlet. For example, the transmitter can be placed anywhere in a room, provided it has an available power source. For example, battery-powered transmitters are particularly versatile, because they can be located remote from a wall outlet. Such battery-operated transmitters can be unobtrusively located above window or door frames, or on top of tall furniture such as dressers or bookshelves.

In accordance with various embodiments of the present teachings, the transmitter can include a visible signal option (not shown), aligned with the emitted signals, allowing a user to direct the signals to particular locations. In accordance with the present teachings, more than one transmitter may be used. Such a system could include communication capability between the various transmitters, for example to ensure that only one signal or a subset of signals is emitted at any given time.

A battery-powered transmitter located above a window or door frame can not only permit the autonomous vehicle to localize within a map, coordinate system, or cell grid relative to the transmitter, but can also localize the transmitter within the same map, coordinate system, or cell grid, thereby localizing the window or door frame. Localization of an autonomous vehicle within a working environment is described in detail in U.S. Patent Publication No. 2008/0294288, filed Nov. 27, 2008, the entire disclosure of which is incorporated herein by reference. In the case of a door frame, the door is ordinarily the passage by which the autonomous vehicle navigates from room to room. The transmitter illustrated in FIG. 3A, which can project points upward onto a wall or ceiling, can be battery operated. A transmitter as illustrated in FIGS. 3B-3D can be placed above or at the top of a door (e.g., more than six feet high, where household power may be unavailable) and can also benefit from battery operation (see below).

The exemplary embodiment of a transmitter 20 illustrated in FIG. 3A includes a housing 42 constructed of, for example, a plastic or like material. In this figure, the transmitter 20 is shown cut-away above the line L so that the emitters can be seen. The transmitter 20 can include a power receptacle 44, allowing the outlet used by the transmitter 20 to remain available for other uses. The transmitter 20 includes two emitters 24A, 24B, set within the housing 42. Alternatively, the emitters 24A, 24B can be flush with or extend beyond the housing 42. Setting the emitters 24A, 24B within the housing 42 allows the signals 22a, 24a to be directed by utilizing collimators 22e, 24e. The collimators 22e, 24e can be formed within the housing 42 or can be discreet components within the housing 42. Alternatively, the collimators 22e, 24e can be secured to the outside of the housing 42. In alternative embodiments, lenses 22d, 24d can be included, with or without collimators 22e, 24e, to focus and direct the signals 22a, 24a. These basic manufacturing considerations can also be adapted for emitters located on charging or base stations. One or more emitters on a base station can serve as an additional point of navigation for the autonomous vehicle within the room, or may simply aid the autonomous vehicle in locating the base station.

Figure 3B:
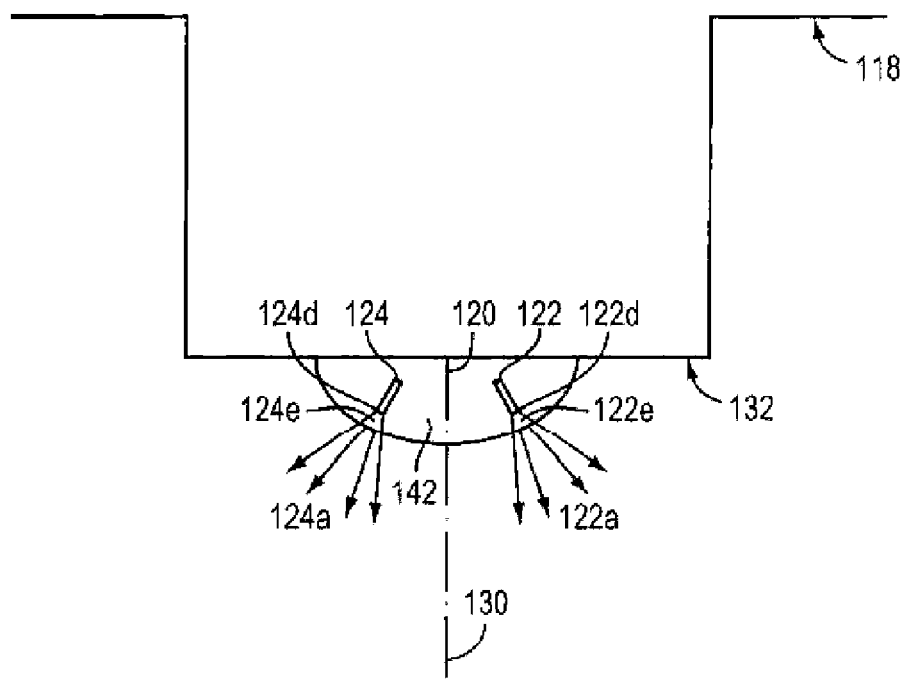
FIG. 3B is a side view of a stationary emitter in accordance with another exemplary embodiment of the present teachings.

FIG. 3B depicts an embodiment of a transmitter 120 for use, for example, with the navigation system 110 depicted in FIG. 2. The transmitter 120 is secured to the underside of an upper cross member of the door frame 132, but can also be recessed therein or secured to or recessed in a ceiling 118. The transmitter 120 includes two emitters 122, 124. Other embodiments of the transmitter 120 can include more than two emitters or a single emitter. By utilizing two emitters, the transmitter 120 can direct signals into two different rooms, on either side of the centerline 130 of the door frame 132. This can allow an autonomous vehicle to distinguish which room it is located in.

In accordance with various embodiments of the present teachings, more than two emitters can be utilized with collimators 22e, 24e, 122e, 124e, to distinguish different areas within a room. Such a configuration allows the autonomous vehicle to sense its relative location within a room and adjust its cleaning behavior accordingly. For example, a signal could mark an area of the room that an autonomous vehicle would likely get stuck in. The signal could allow an autonomous vehicle to recognize the area and accordingly not enter it, even though it might otherwise be able to do so unimpeded. Alternatively, or in addition, different signals could mark areas that require different cleaning behaviors (e.g., due to carpeting or wood floors, high traffic areas, etc.).

Turning back to FIG. 3B, the emitters 122, 124 can be installed flush with or extend beyond the housing 142. Setting the emitters 122, 124 within the housing 142 allows the signals 122a, 124a to be directed by utilizing collimators 122e, 124e. The collimators 122e, 124e allow the signals 122a, 124a to be directed to two sides of a centerline 130 of a doorframe 132, without any signal overlap, if so desired. The collimators 122e, 124e can be formed within the housing 142 or can be discreet components within the housing 142. Alternatively, the collimators 122e, 124e can be secured to the outside of the housing 142. In alternative embodiments, lenses 122d, 124d may be included, with or without collimators 122e, 124e, to focus and direct the signals 122a, 124a.

In various embodiments of the present teachings, each signal (regardless of the emitter's location or the number of signals) can be modulated at 10 kHz and coded with an 8-bit code serving as a unique signal identifier, preventing the autonomous vehicle from confusing one signal or point with another. Accordingly, more than two uniquely encoded signals can be employed to increase the accuracy of the autonomous vehicle's calculations regarding its location within a working area. As noted above, using only one emitter allows an autonomous vehicle to take a heading based on that signal. Using two or more signals can allow the autonomous vehicle to continue navigating if fewer than all of the signals are detected (either due to a failure of a signal transmission or the autonomous vehicle moving to a location where fewer than all of the signals are visible).

In certain embodiments, the transmitter can pulse the coded signals as follows. After an initial synchronization pulse, a first signal at 10 kHz is emitted for 100 ms. This can provide a sufficient time for the autonomous vehicle's receiver and processor to calculate azimuth and elevation angles, as discussed in detail below. So that the autonomous vehicle can determine which signal is being received, the transmitter can pulse a series of five bits, each for 10 ms. The five bits include two start bits, for example a zero and a one, followed by a unique three bit identifier to identify that particular signal or point. After a 100 ms delay, the transmitter repeats the sequence for the second signal or point. By changing the modulation frequency and/or the identifier, the second signal or point can be uniquely distinguished from the first. Any number of unique signals can be transmitted and identified in this manner. After the series of signals are transmitted, the transmitter can wait a substantially longer period of time, for example on the order of one to two seconds, before repeating the transmitting sequence, starting again with the first signal. The length of time for each transmission is merely exemplary, and may be varied based on a particular application, device, etc. As stated above, the signals can be modulated at the same or different frequencies.

Figure 4A:
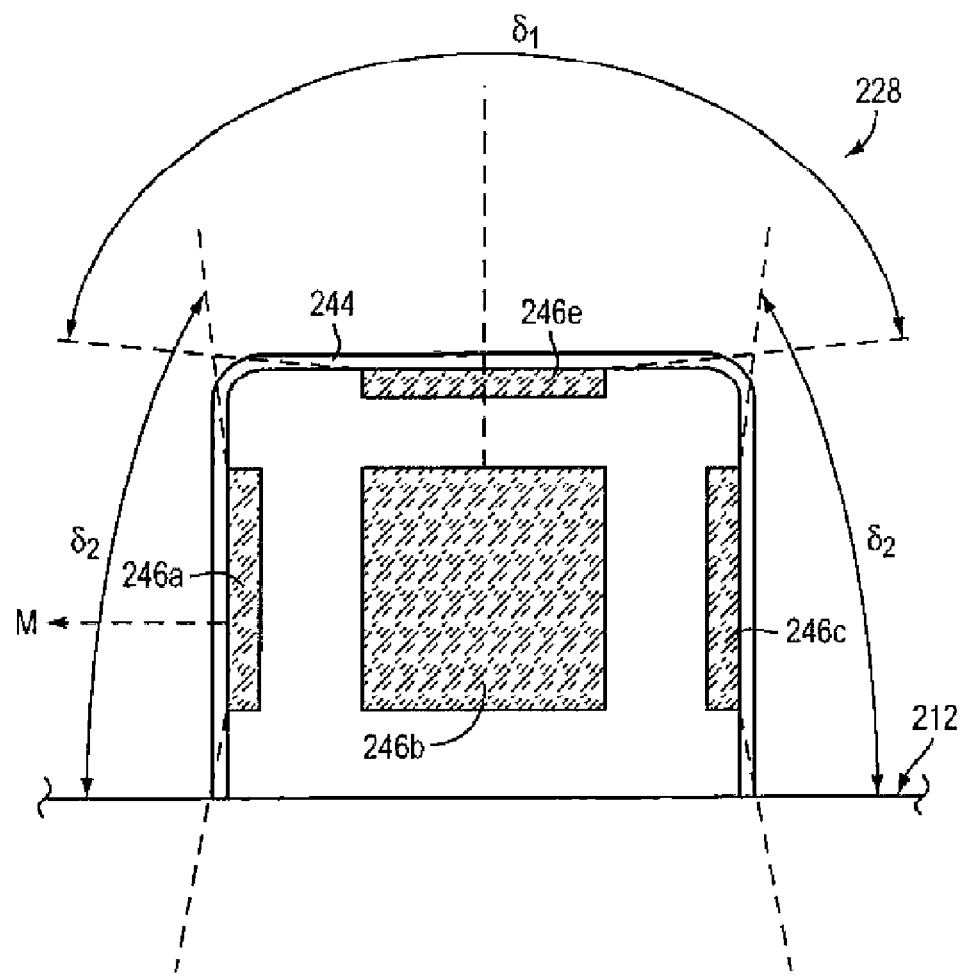
FIG. 4A is a side view of an infrared receiver for an autonomous vehicle in accordance with an exemplary embodiment of the present teachings.
Figure 4B:
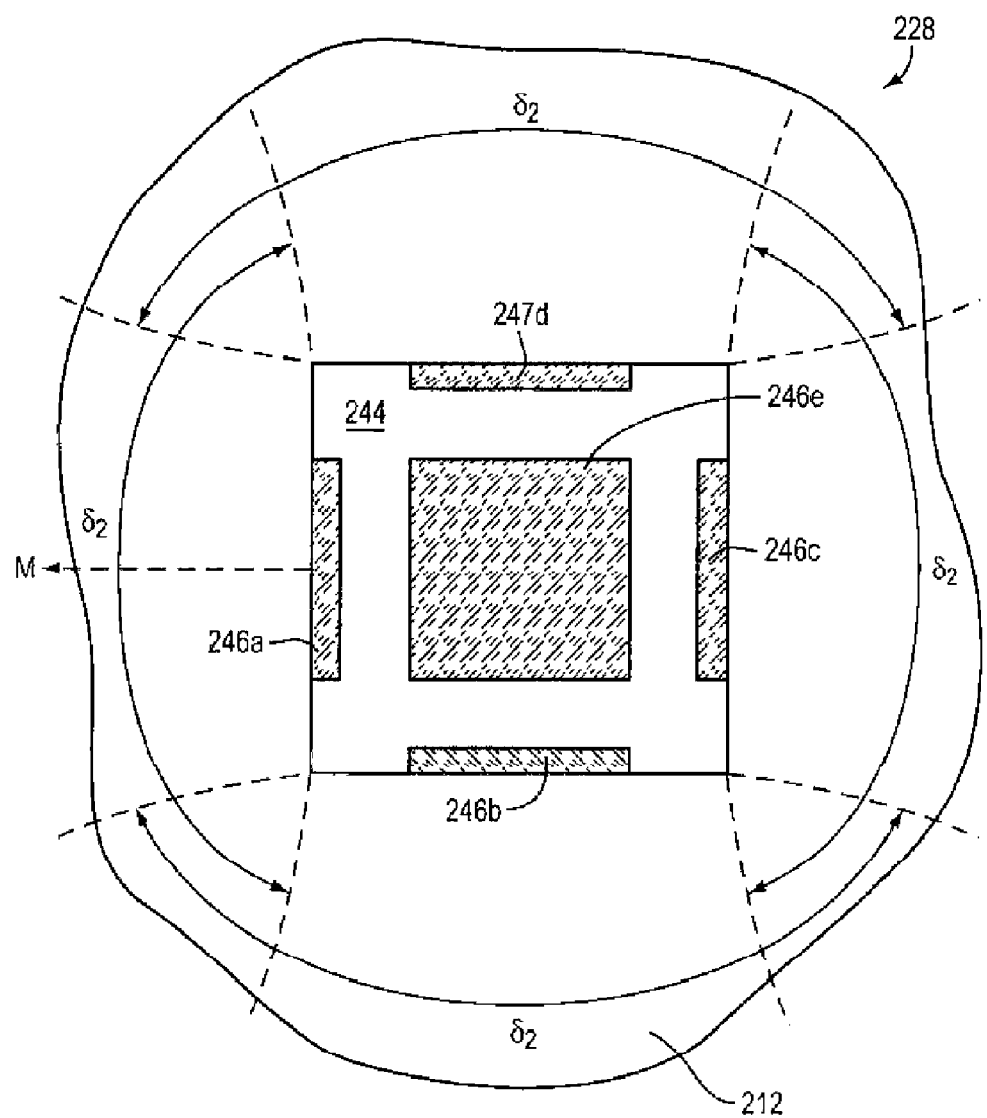
FIG. 4B is a top view of the infrared receiver of FIG. 4A.

FIG. 4A depicts a side view of an exemplary receiver 228 that is surface mounted on a housing 212 of an autonomous vehicle. FIG. 4B is a top view of the same receiver 228. The receiver 228 can include an outer shell or housing 244 comprising a generally translucent or transparent, high-impact plastic or like material. Four photodiodes 246a, 246b, 246c, and 246d can be installed in an orientation in the housing 244 generally corresponding to four adjacent sides of a cube. Accordingly, each photodiode can be generally perpendicular to the photodiodes on either side of it and parallel to the photodiode opposite it. In certain embodiments, a fifth photodiode 246e can be located generally above the plane of orientation of photodiodes 246a-246d. At least one photodiode, in this case photodiode 246a, is oriented toward a direction of forward movement M of the robot. The photodiodes can be connected via control wiring and other components to the autonomous vehicle's microprocessor and related systems. Installing a receiver 228 on top of the housing 212 can provide the autonomous vehicle with a wide field of view. As depicted, the field of view δ1 for a horizontally-oriented photodiode 246e is extremely wide. Depending on the sensitivity of the photodiode 246e, the thickness or translucence of the plastic, and other factors, the field of view δ1 may approach or exceed 180°. Similarly, due to the orientation of photodiodes 246a-246d, their field of view δ2 approaches near vertical in an upward direction from the autonomous vehicle's housing 212 and is limited below only by the autonomous vehicle's housing 212. There can be an overlap between the fields of view δ1 and δ2 in the longitudinal plane, as depicted in FIG. 4B.

As illustrated in FIG. 4A, there can be overlap between the fields of view δ1 and δ2, allowing the autonomous vehicle to detect signals in its operating area. The overlap creates a total field of view for the receiver that approaches the entire volume of the room above the robot housing. Accordingly, this embodiment of the receiver 212, is well-suited to the exemplary embodiment of the navigation system depicted and described in FIG. 2, wherein a signal is projected into an entire room. Of course, this receiver 228 could also be used with the system depicted in FIG. 1. Although installing the receiver closer to or above a top surface of the autonomous vehicle can provide for a wider range of view, this configuration increases a height of the autonomous vehicle slightly and can limit autonomous vehicle travel beneath certain obstacles such as couches, low tables, or the like.

Figure 4C:
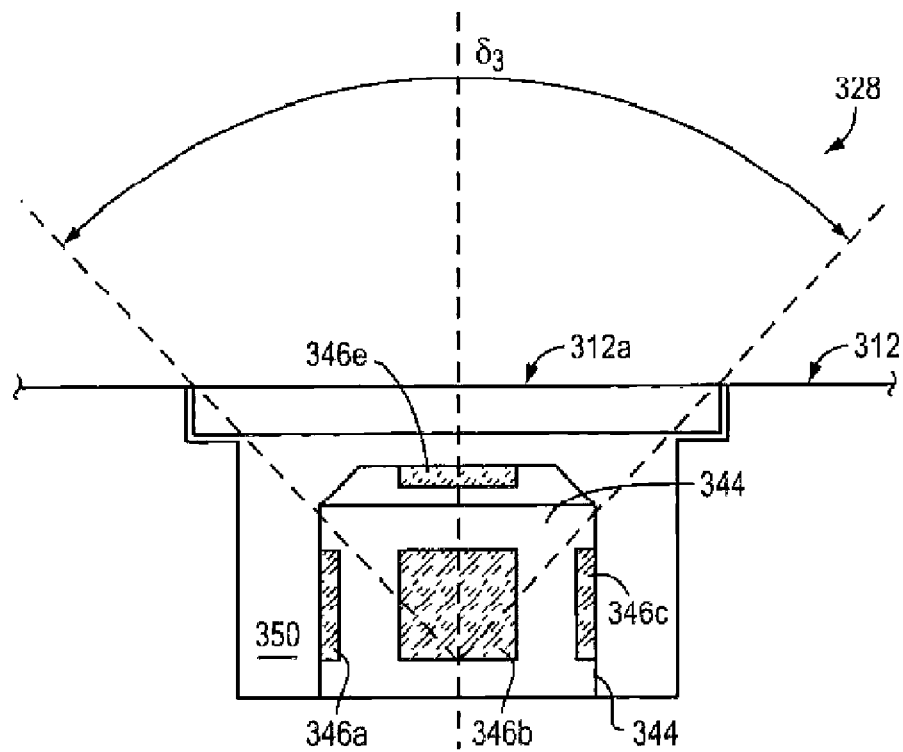
FIG. 4C is a side view of an infrared receiver for an autonomous vehicle in accordance with another exemplary embodiment of the present teachings.

FIG. 4C depicts an exemplary embodiment of the receiver 328 installed below a surface of the autonomous vehicle housing 312. The photodiodes 346a-346e (as a group referred to as 346) can be installed in a void 350 or other cavity below the surface of the autonomous vehicle housing 312. A translucent or transparent plastic cover 312a can be fitted over the photodiodes 346. The cover 312a can be secured to the housing 312, for example, with screws, press-fit connections, or other connectors. Alternatively, the cover 312a can be set in place without connectors, allowing easier access to the photodiodes 346 for service or replacement. This lower profile version reduces or eliminates the risk associated with a surface mounted receiver getting stuck below obstacles (as described above).

The construction of the receiver 328 can be similar to that of FIG. 4A. Four of the photodiodes 346a-346d can be installed orthogonal to each other, facing a predefined direction on the autonomous vehicle (e.g., front, back, right, and left). The fifth photodiode 346e can be installed orthogonal to the other four photodiodes, facing directly up from a top of the autonomous vehicle. Because the photodiodes 346 are set within the housing 312, the receiver's overall field of view δ3 can be limited to a certain degree. In this embodiment, δ3 equals approximately 120°. The field of view δ3 can be wider or narrower depending on the depth of installation below the surface of the autonomous vehicle housing 312. Alternatively, the field of view δ3 can be modified by utilizing a cover 312a having particular effects on signal transmission, such as a fish-eye lens or the like.

Figure 5A:
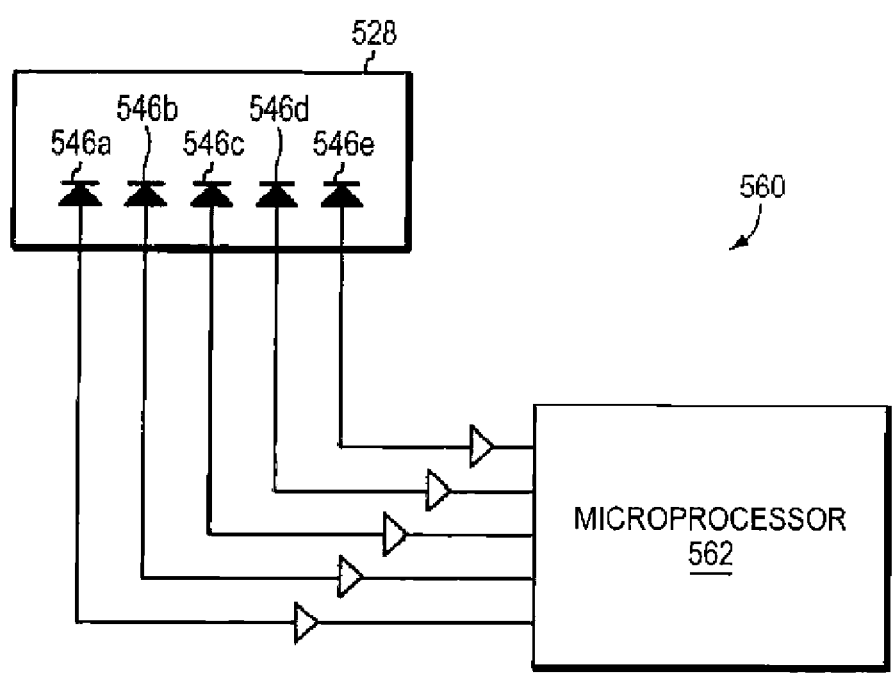
FIG. 5A illustrates a control system for an infrared receiver for an autonomous vehicle in accordance with an exemplary embodiment of the present teachings.

FIG. 5A illustrates an exemplary embodiment of a control schematic 560 for a receiver 528. The receiver 528 can include a number of independent photodiodes 546a-546e (as a group referred to as 546), pre-amplified and multiplexed into a single microprocessor 562. As described above, four of the photodiodes 546a-546d can be installed orthogonal to each other, facing a predefined direction on the autonomous vehicle (e.g., front, back, right, and left). A fifth photodiode 546e can be installed orthogonal to the other four, facing directly up from the top of the robot. Once a reflected signal is received by a photodiode 546, the receiver 528 determines the frequency of modulation of the signal, the identity sequence, if any, and the envelope of received energy (i.e., the demodulation of energy). These values can be sent to the microprocessor 562, which can calculate the location of the autonomous vehicle relative to the signals and the identities of the signals. Additionally, if only a single point is detected by the receiver 528 (if for example, the robot's view of the second signal is obstructed), the autonomous vehicle can use this point as a heading. By following this heading, the autonomous vehicle can move within the work area until a second point is detected.

In operation, a receiver (e.g., an infrared receiver) can first measure the "noise floor" of the autonomous vehicle's environment, comprising the amount of energy (e.g., infrared energy) present in the autonomous vehicle's environment, which it sets as the threshold value. This value can represent an average of the values for each photodiode. Any subsequent measurement above this threshold value can trigger an event (e.g., a calculation of point azimuth and elevation). The receiver can then measure the modulation frequency again, searching for an expected increase at 10 kHz (i.e., the frequency of the initial synchronization signal transmitted by the transmitter). If a 10 kHz frequency increase is detected, the autonomous vehicle recognizes the increase as an emitted navigation signal. The autonomous vehicle can then measure the amplitude of the reflected point on all five photodiodes to determine an average value. This value can then be compared to a list of signal frequencies to determine which of the signals has been detected. Alternatively, any detected identity sequence associated with the signal can be compared to a list of transmitter codes or signal IDs stored in a lookup table in the autonomous vehicle's processor memory.

The on-board microprocessor can use the amplitude value to determine the azimuth and elevation of the received signals, which it can then use to determine its location within a working area. To determine the azimuth, the microprocessor enters the values of the two strongest readings from the four side photodiodes into an algorithm. The algorithm takes the ratio of these two readings to determine the azimuth angle. For example, if the two strongest readings from two photodiodes are equal, the algorithm recognizes that the point is located at an azimuth angle that is directly between the two photodiodes (i.e., at 45°). In a similar algorithm, the amplitude value measured from the strongest side photodiode and the amplitude value measured from the top-facing photodiode value are used to determine the elevation of the signal. These values can be stored in the autonomous vehicle's memory for future reference.

After the receiver has detected at least two points, and determines the azimuth and elevation of each point, it determines its location within the working space. A triangulation algorithm based on the known ceiling height and the azimuth and elevation of the two detected points allows the processor to determine where in the working space the autonomous vehicle is located. Over time, the values of elevation and azimuth between each coded point and specific locations of the autonomous vehicle within the workspace can be stored in the autonomous vehicle's memory, creating a map of the environment in which the autonomous vehicle operates.

Figure 5B:
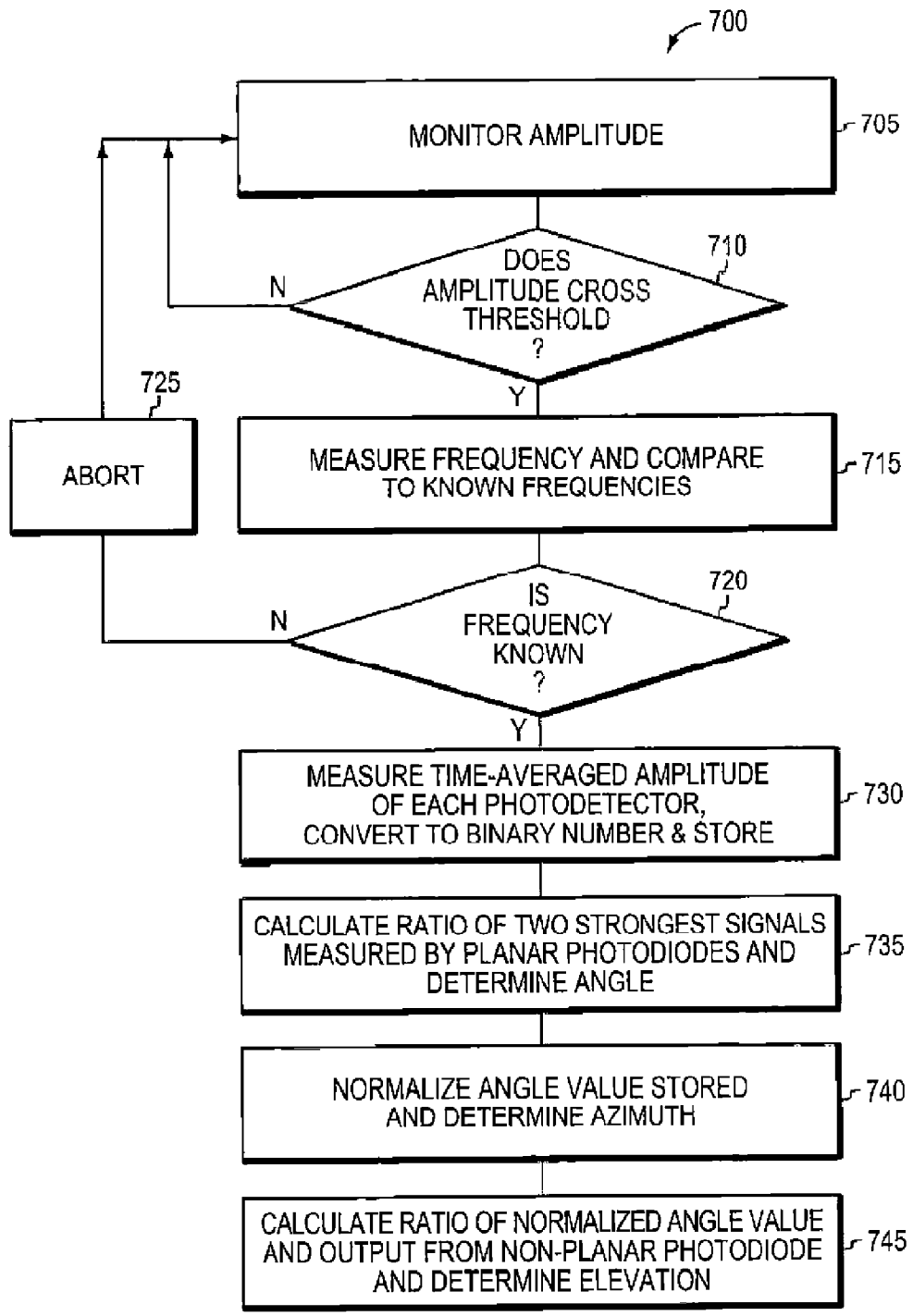
FIG. 5B is a flowchart of a signal detection and localization program in accordance with an exemplary embodiment of the present teachings.

In various embodiments, a navigation system 200 as depicted in FIG. 5B uses an angle-based localization system. Values corresponding to elevation and azimuth are determined by synchronously comparing average amplitudes from the number of detectors arranged on the robot. Of the five detectors, four are arranged in a plane and are angularly spaced by 90° increments. The fifth detector is in the center of the aforementioned four-detector array and aimed so that it is orthogonal to the plane in which the other detectors lie, directed vertically from the autonomous vehicle. Together, this five-element array can have a full or near-full hemispherical field of view.

In the embodiment depicted in FIG. 5B, all five detectors monitor for amplitude (Step 705) until an amplitude that crosses a preset threshold is detected (Step 710). After the amplitude on any detector crosses the preset detection threshold, the frequency of the signal on the strongest detector is measured and compared against known transmit frequencies (Step 715). If the measured frequency is one of the known transmit frequencies (Step 720), the next step in the detection process can be executed. If the signal is not a known transmit frequency, the detection process can be aborted (Step 725) and the signal detected can be declared to be "out of band." Once an "in band" frequency is detected, a time-averaged amplitude for each photo detector can be measured, converted to a binary number, and stored for later processing in a microprocessor memory (Step 730). Upon storing the five numerical values (one for each photodiode), the azimuth angle can be determined.

Of the four detectors that reside in a single plane, the values of the two strongest signals detected are used to form a ratio to determine the azimuth angle (Step 735). The ratio of second-strongest signal over the strongest signal is either compared to a look-up table or inserted into a mathematical equation to determine an azimuth angle output. Both the look-up table and the equation represent the overlap of the received sensitivity patterns of two orthogonal detectors with known sensor responses. In this embodiment, the photo detector output is modeled as a fourth-order Gaussian response to angle off of "boresight," a term that generally refers to a vector that is orthogonal to the semiconductor die in the detector package.

To calculate elevation, the strongest signal from azimuth calculation (i.e., the denominator of the ratio) must first be normalized, as if it were on boresight of the respective detector (Step 740). For example, if the azimuth has been determined to be 10° off of boresight from a given detector, that 10° angle is entered into a look-up table or equation that describes the sensor response of any single photo detector. At zero degrees, the output of this look-up table/equation would be 1.00000. As the angle deviates from zero degrees, the output drops to some fraction of 1.00000 (the normalized value at boresight). For example, if a value of 10° is entered into the equation, the output of this operation can be, for example. 0.99000. The denominator of the azimuth ratio can then be divided by this fractional value in order to scale up, or "normalize" that value to what it would be if the azimuth were actually zero degrees. This normalized value can then be stored in memory and elevation can be determined therefrom.

To calculate elevation, the normalized output from the previous step is used to produce a new ratio with the output from the upward-looking (fifth) detector, so that the numerator is the second-strongest of the two values and the denominator is the strongest of the two values (Step 745). This ratio is then entered into the same look-up table or equation from the step above (used to calculate azimuth), thus outputting an elevation angle.

The benefits of this type of navigation system can be numerous. As the autonomous vehicle moves about a working area, measuring the azimuth and elevation of the various points detected, it can create a map of the area, thus determining its location within a given space. With this information, it can fuse data from all of its on-board sensors and improve cleaning or other task efficiency. One way it can do this is to create a map where the high-traffic areas in a house or other building are located (as indicated by readings from the dirt sensor, for example). The autonomous vehicle would then clean the areas it identified as high traffic (and therefore, often dirty) each time it passes over that area, whether directed to or not. The autonomous vehicle may also improve its cleaning function by merging the output from the wheel drop, stasis, bumper, and wall-following sensors to roughly mark areas of entrapment, or where large obstacles exist, so that those areas can potentially be avoided in future runs.

In accordance with various embodiments of the present teachings, another method of improving cleaning efficiency involves selectively programming the autonomous vehicle to clean particular areas, as detailed below. For example, a personal computer or remote control may be used to control the autonomous vehicle. Although the autonomous vehicle can operate without operator intervention, an operator can initially set up the autonomous vehicle, or can direct the autonomous vehicle to operate in particular areas or at particular times. For example, by using more than one transmitter in various rooms on one floor of a house, an operator may be able to direct the autonomous vehicle to clean specific rooms in a particular order and/or at a specific time. The operator could select, in a control program field of a computer program for example, the living room, family room, bathroom, and kitchen areas for cleaning. A remote control for use in accordance with the present teachings is described in more detail with respect to FIGS. 19-22.

Once commanded (either immediately or on a predefined schedule), the autonomous vehicle can be signaled to begin its cleaning cycle. The autonomous vehicle undocks from its base/charging station and begins cleaning the closest or first room on the programmed list. It can recognize this room and can differentiate it by the coded group of infrared points (e.g., on a ceiling of the room) or the coded signal emitted in the room. After the first room is cleaned, the autonomous vehicle can, for example, check its level of power and return to its charger for additional charging if needed. In accordance with certain embodiments, in order to return to the charger, the autonomous vehicle can follow the point or points on the ceiling back to the base station. Alternatively, the autonomous vehicle can use a known docking behavior. After charging is complete, the autonomous vehicle can traverse roughly back to the place it left off and resume cleaning. This sequence of events continues until all of the programmed rooms have been cleaned. Alternatively, the selection of particular areas to clean could be, for example, made by remote control or by pressing buttons on a control panel located on the base station. By using a personal computer, however, multiple transmitters could communicate with each other and with the base station via power lines using a known communication technology.

Figure 6:
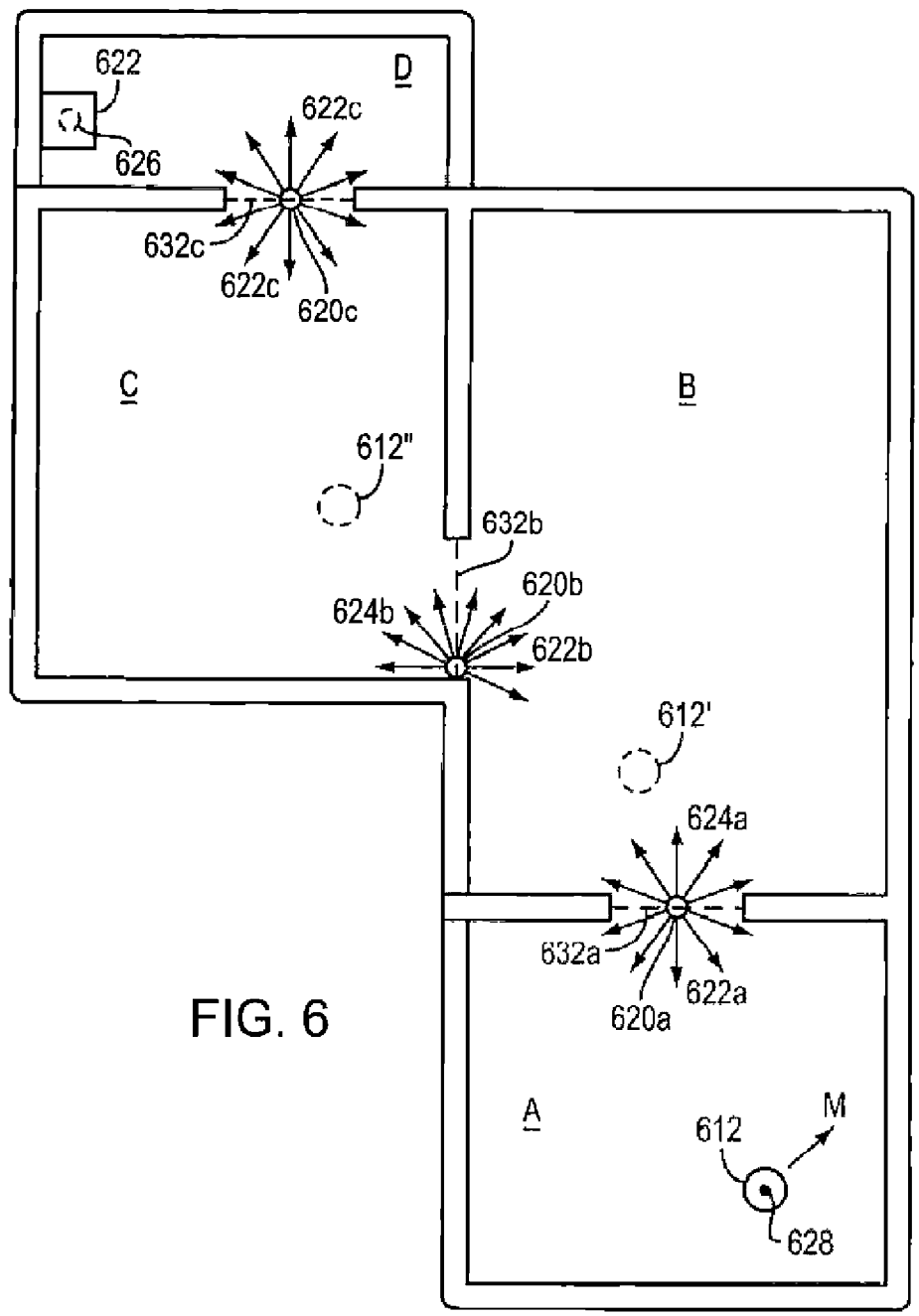
FIG. 6 is a top view of a navigation system for an autonomous vehicle in accordance with another exemplary embodiment of the present teachings.

An alternative embodiment of the present teachings is depicted in FIG. 6, wherein an autonomous vehicle uses a number of signals for headings to move from room to room. The autonomous vehicle 612 is moving in a direction M within room A when its power level drops below a predetermined level, requiring its return to a base charging station 622. Upon crossing the predetermined power level, the autonomous vehicle's receiver 628 searches for a signal from a nearby emitter. As the vehicle is located in room A, it detects the signal 622a emitted from transmitter 620a and, using the signal 622a as a heading, moves directly for that signal 622a.

Alternatively, the autonomous vehicle 612 can emit its own coded pulse, to determine if any transmitters are in the area. This coded pulse could "awaken" sleeping or otherwise dormant transmitters, which would then begin their own emission cycle. Alternatively, the pulse can be an audible or visual signal such as a distinct beep, buzz, or visual strobe. Some pulses need not be within the field of view of the transmitter.

The robot 612 will continue to move toward signal 622a until one of several events happens at or near doorway 632a. In a first event, the autonomous vehicle may determine, based on readings from its photodiodes, that it is directly under the transmitter 620a. In a second event, the autonomous vehicle 612 may sense a second signal 624a, which may overlap the first detected signal 622a. This could occur if the configuration of the emitters, collimators, etc., as described in more detail above, provides overlapping signal patterns between signals 622a and 624a. In a third event, autonomous vehicle 612 can sense a signal from an entirely different transmitter, in this case signal 622b from transmitter 620b. Other events are also contemplated, as suitable for a particular application. The occurrence of an event presents the autonomous vehicle 612 with any number of behavioral, functional, or other options. For example, each coded signal may serve as a unique marker for a different working space. Upon detecting the unique marker associated with a particular working space, the autonomous vehicle may alter its cleaning function. Thus, if room A is carpeted but room B is uncarpeted, the autonomous vehicle can adjust its cleaning as it moves from room A to room B. Upon detecting a second signal (in this case, signal 622b) the autonomous vehicle can, in certain embodiments, completely disregard the first signal 622a received when its return to the base station 622 began. Using new signal 622b as a heading, it begins moving toward that signal 622b. The autonomous vehicle 612 can, in certain embodiments, check its battery level at each event, storing that value in its microprocessor. Over time, the autonomous vehicle can thereby create a table of battery levels at each event (and battery level change from event to event), and be able to accurately determine precise battery power remaining at each transmitter location.

Once the autonomous vehicle is traversing room B (shown in phantom as 612'), it will eventually determine, based on battery level, time, or other factors, to follow the heading provided by signal 622b, and continue its return to its base station 622. The autonomous vehicle 612 can follow the heading until an event occurs at or near doorway 632b. Again, the event can be detecting a strength of signal 622b, indicating that the autonomous vehicle is directly below the transmitter, detecting an overlap signal from 624b, or detecting a new signal 622c. The autonomous vehicle 612 can again perform any of the behaviors described above: check and store its battery level; change cleaning characteristics; etc.

Once in room C, the autonomous vehicle can begin following the heading provided by signal 622c. At or near the doorway 632c to room D, an event may direct the autonomous vehicle to perform any number of behaviors. Alternatively, the autonomous vehicle can move directly to charging station 622, guided by emitted signal 626 or another signal or program.

During its return to the base station, as the autonomous vehicle 612 moves from room A to room B to room C and so on, it detects and stores information about each coded signal that it detects along its route. By storing this information, the autonomous vehicle can create a map, using the coded signals as guideposts, allowing it to return to its starting location in the future. After charging, the autonomous vehicle can return to the room it was working in prior to returning to its base by comparing the detected signals and their strengths to the stored information.

Figure 7:
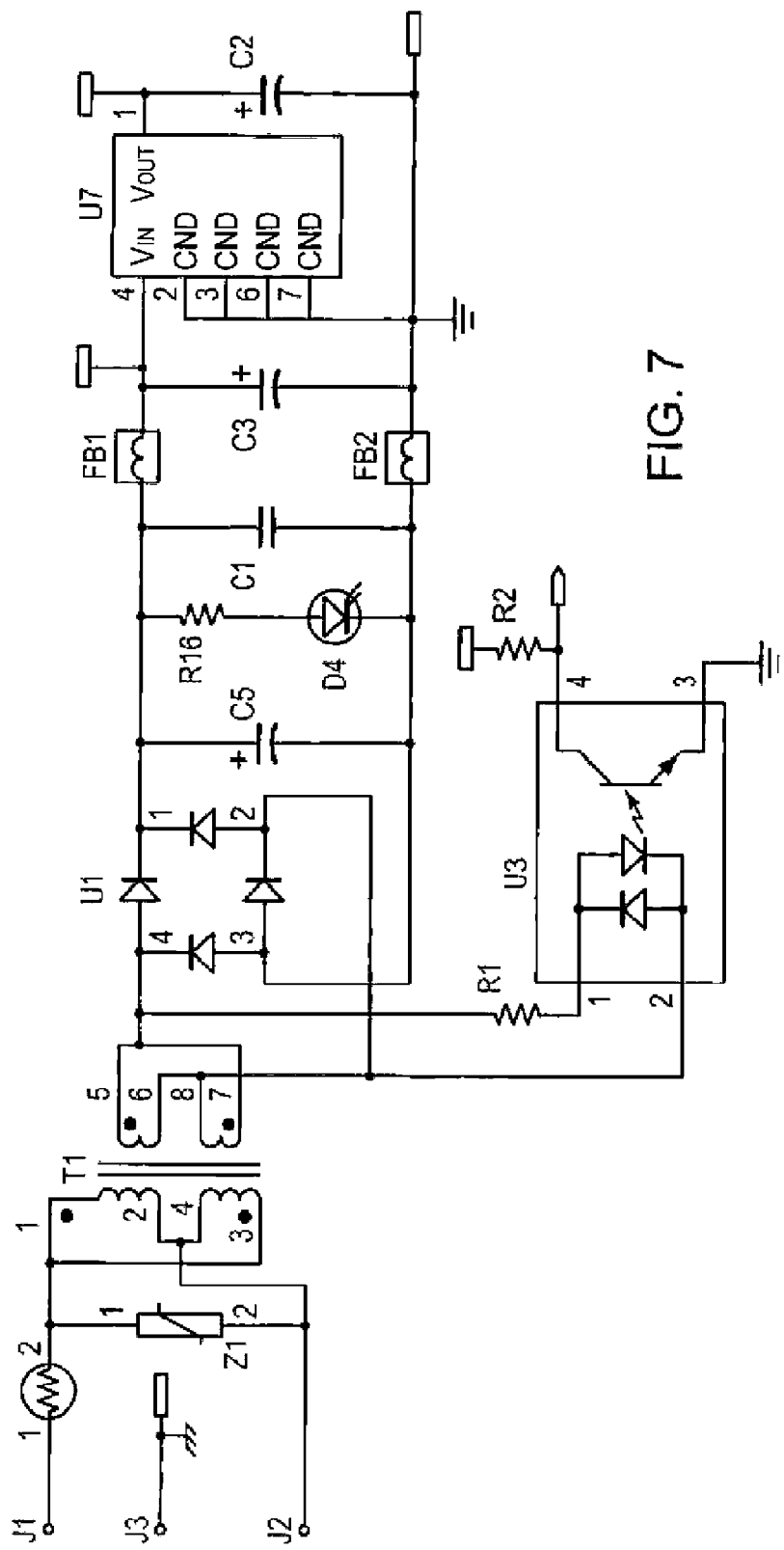
FIGS. 7-14 are schematic circuit diagrams of infrared receivers and transmitters for a navigation system in accordance with an exemplary embodiment of the present teachings.
Figure 8:
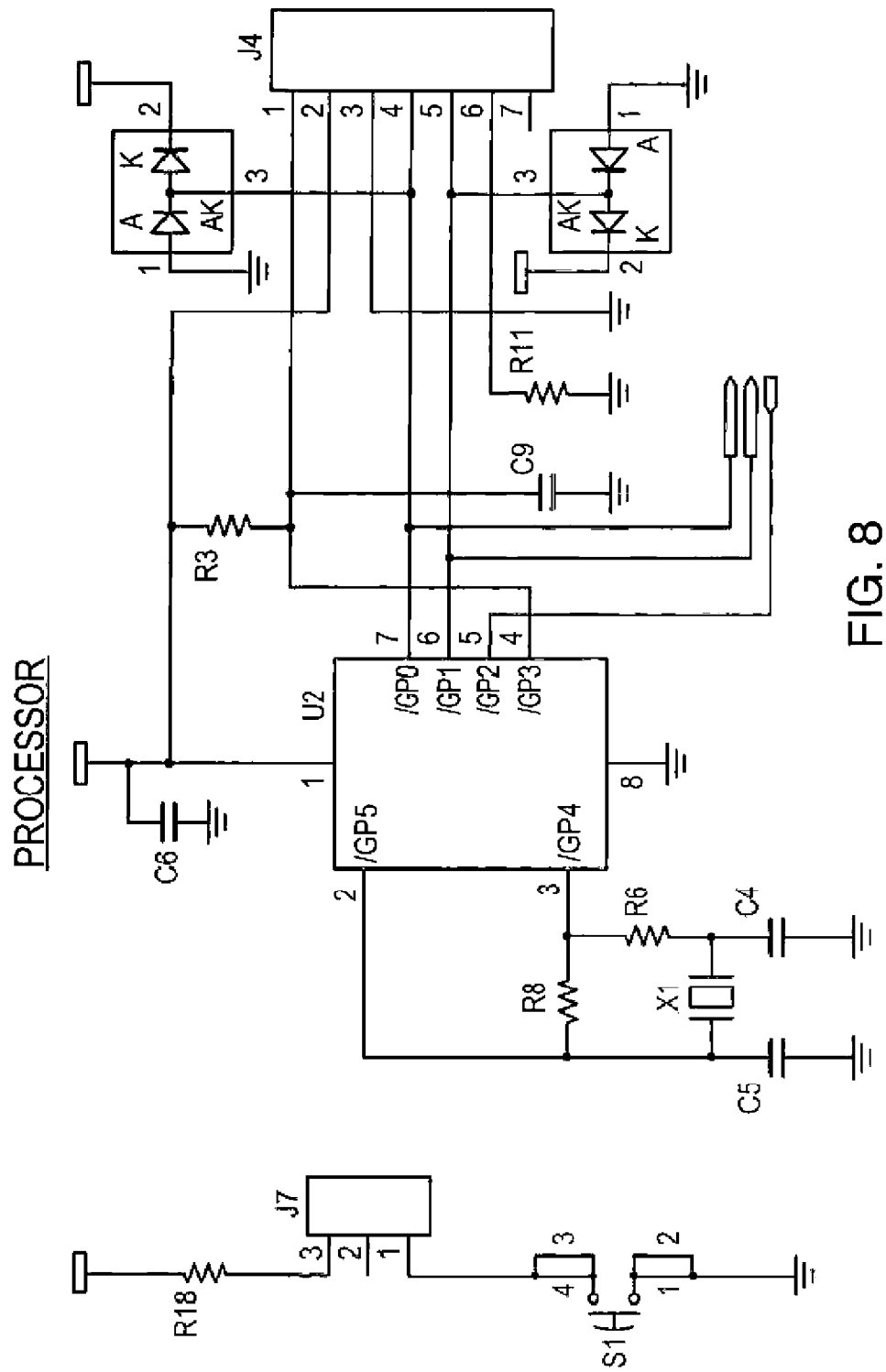
Figure 9:
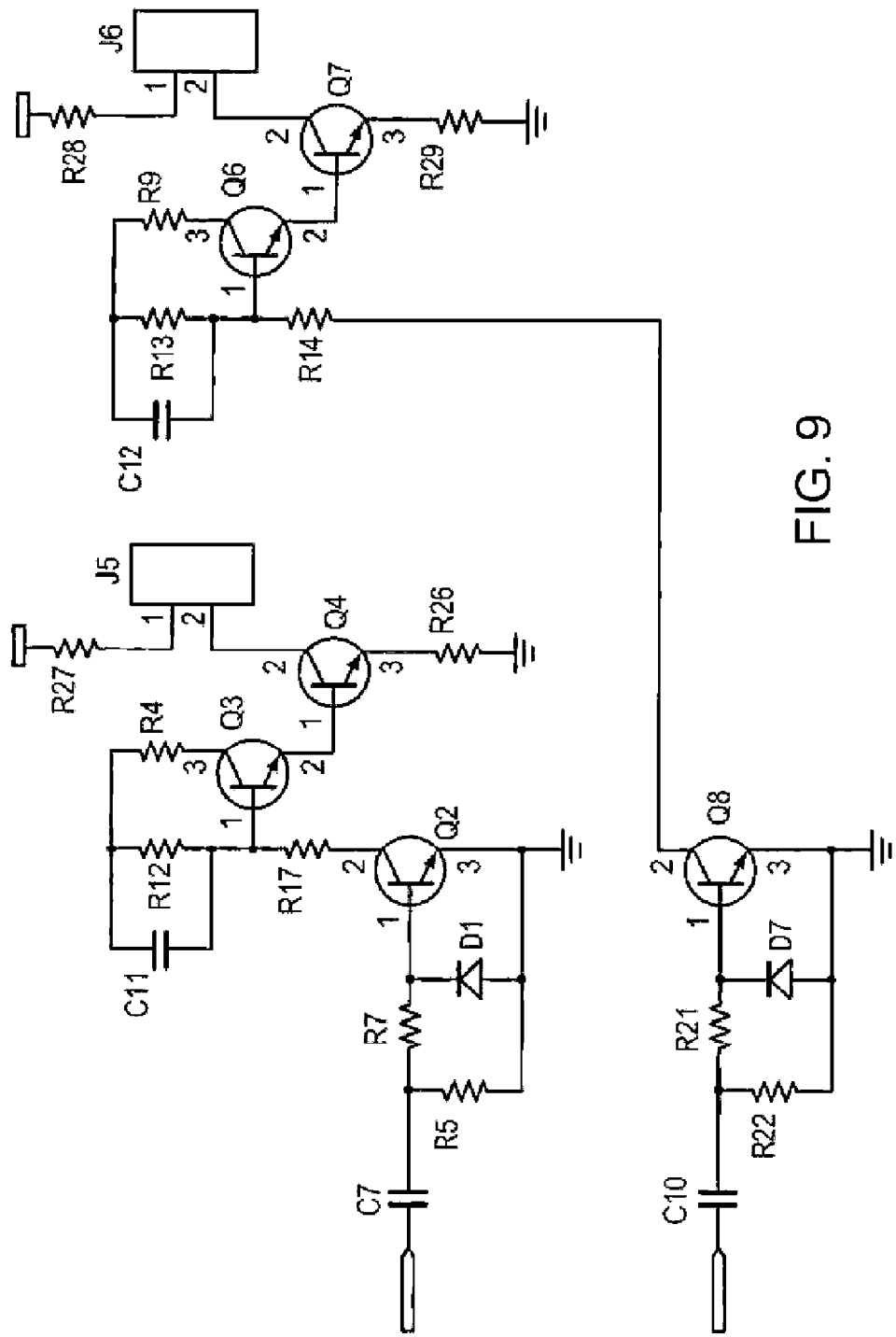

FIGS. 7-9 depict schematic circuit representations for exemplary embodiments of various components of an infrared signal transmitter, namely an AC-DC converter, a microcontroller and support circuitry, and LED drivers. More specifically, FIG. 7 illustrates an electronic circuit that takes 120VAC160 Hz line voltage and converts it to a regulated +5VDC supply. This supply can be used to power the microcontroller and associated circuitry of the transmitter depicted in FIG. 8. In addition to power conversion, this circuit can also provide an isolated digital logic signal to the microcontroller, whenever a "zero-crossing" in the AC line input is detected.

FIG. 8 illustrates a transmitter microcontroller and support circuitry (i.e., a clock oscillator and an in-circuit serial programming port). In addition, there is a circuit that allows a user-initiated button press to project visible light from a pair of LEDs, co-located with a pair of IR LEDs, onto a remote surface for the purpose of assisting the user in aiming the infrared signal points.

FIG. 9 illustrates two channels of an IR LED driver. Each driver can control a preset constant current into a single IR LED, which can then emit near-infrared light that can be collimated by an external lens and projected onto the remote surface. Each IR LED can be modulated and pulse-coded independently of the other. This allows the microcontroller in the autonomous vehicle to discern between the different transmitter signals, to determine which detected signal is which.

Figure 10:
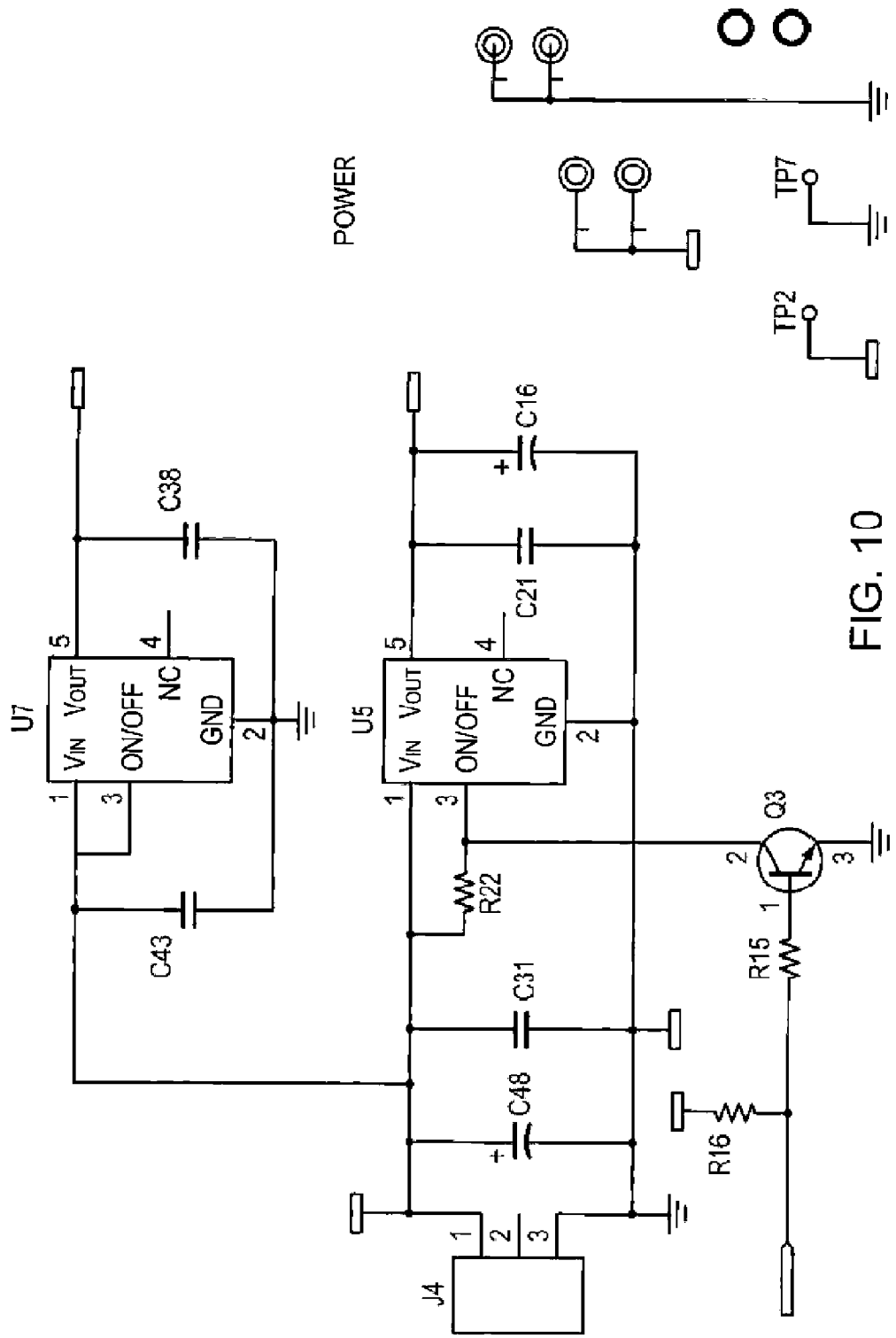

FIGS. 10-14 depict schematic circuit representations in accordance with certain embodiments of various components of a vehicle-mounted infrared receiver, namely DC-DC linear power converters, a five channel preamplifier, a multiplexer and programmable tuned amplifier, detectors, and a microcontroller and associated peripherals. More specifically, FIG. 10 depicts two independent linear voltage regulators. One of the regulation circuits can be switched ON-OFF via a microcontroller to conserve battery power during a sleep mode.

Figure 11A:
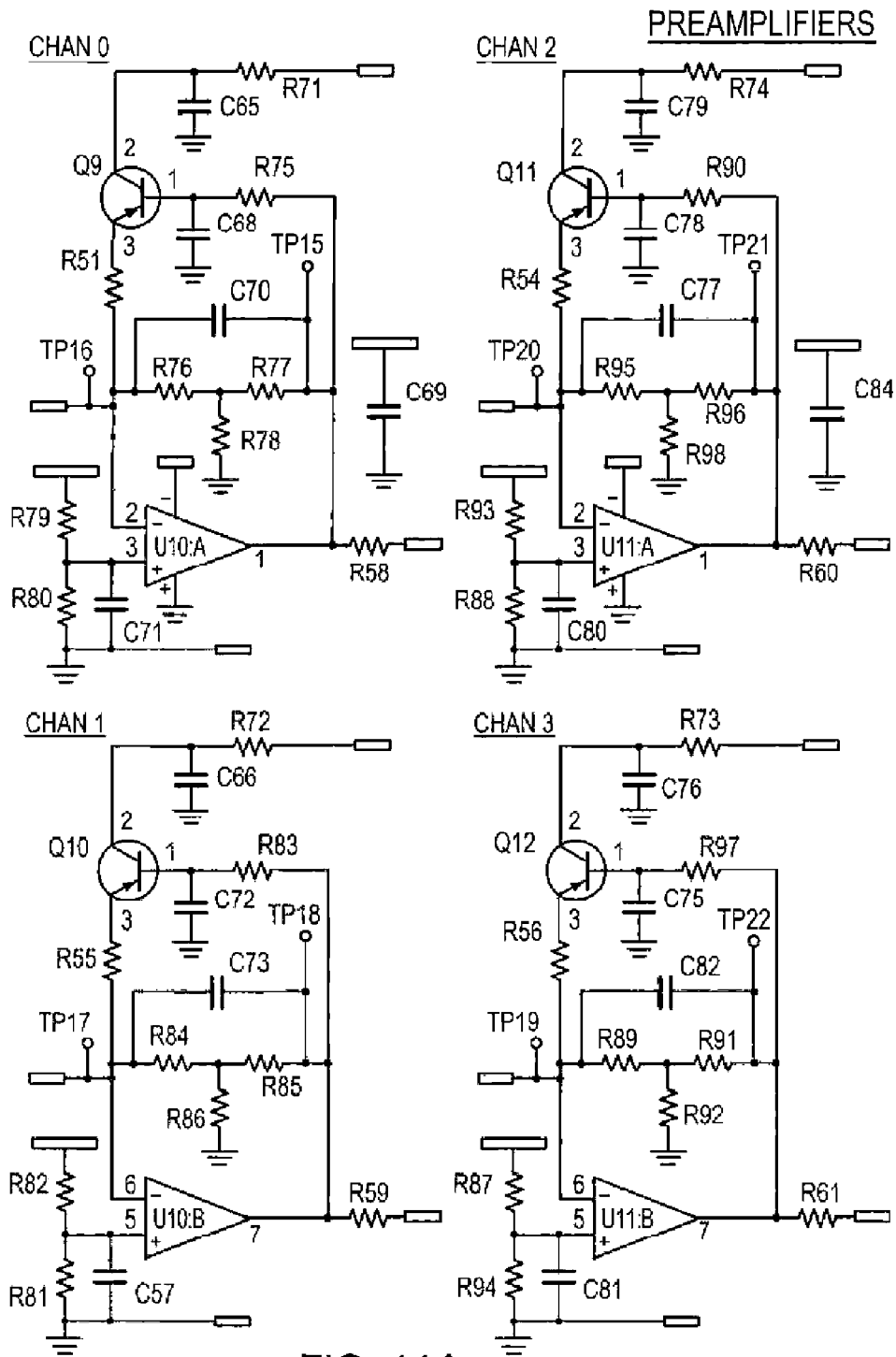
Figure 11B:
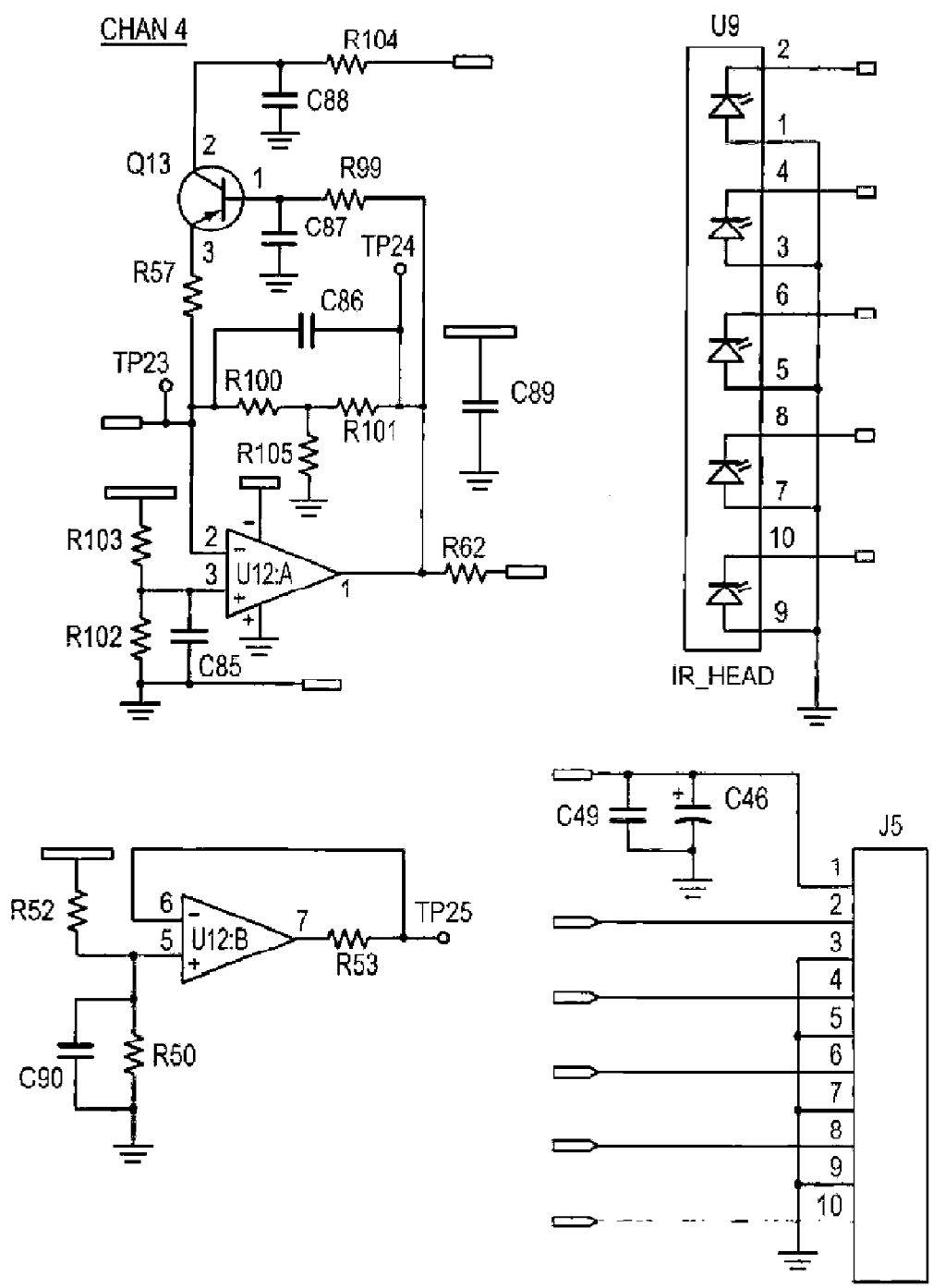

FIG. 11 depicts five independent preamplifiers that can convert respective photodiode output currents into voltages of much larger magnitudes. Each preamplifier is built using an operational amplifier in a transimpedance topology. This allows the preamplifiers to be configured with low noise. Also, there is an active feedback circuit that is used to null large photodiode current offsets caused by exposure of the circuit to sunlight and other strong low-frequency light sources.

Figure 12:
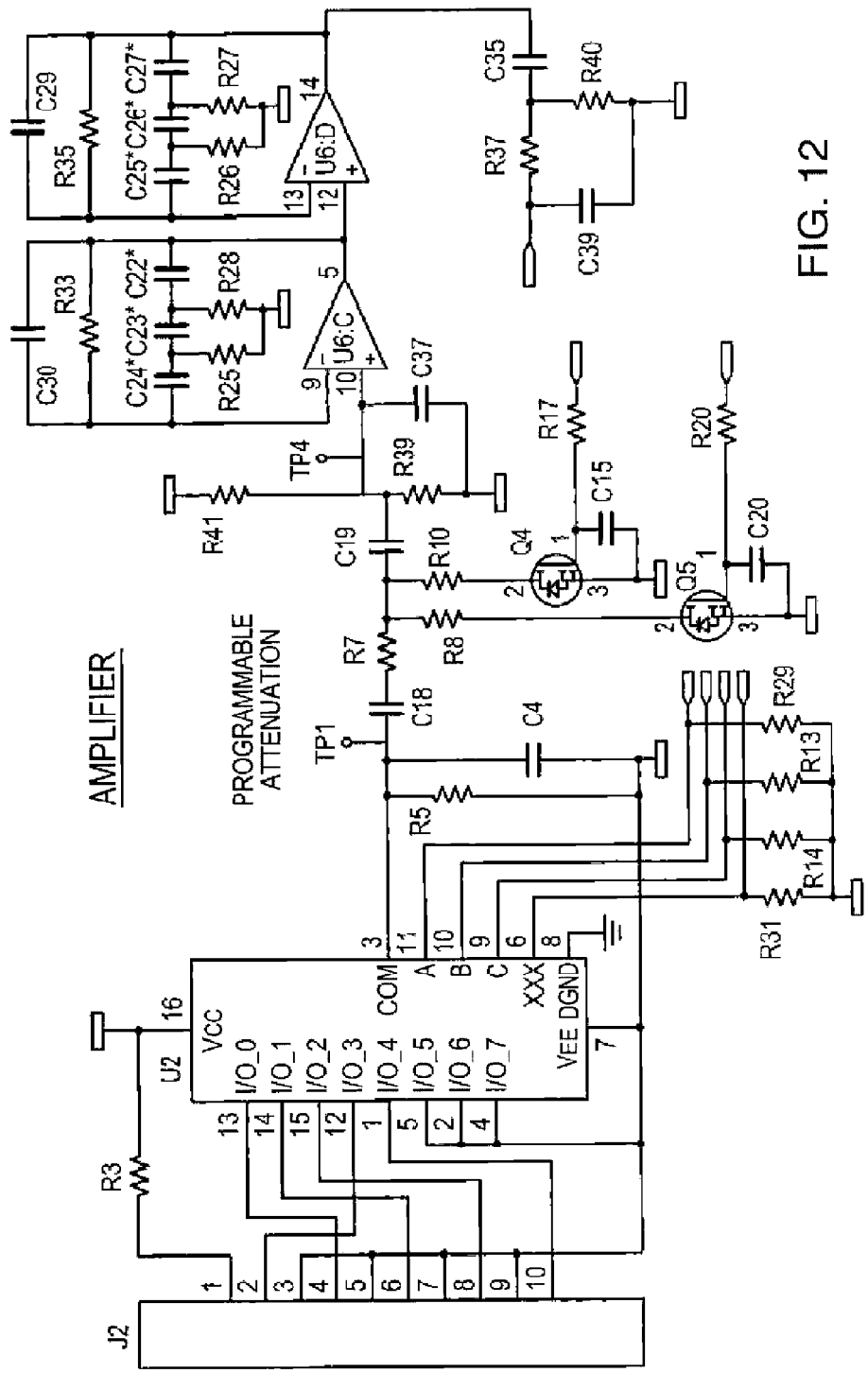

FIG. 12 illustrates an exemplary multiplexer and programmable tuned amplifier for the receiver. This circuitry can be segregated into three functional blocks. The first block is a multiplexer that receives signals from the five photodiode preamplifiers and outputs one of the signals to a programmable attenuator, as commanded by the receiver's microcontroller. The second block is a programmable attenuator that can be used to reduce the overall receiver gain, to deal with the large dynamic range of received signals. As depicted herein, there are two digital inputs from the microcontroller, which permits four discrete gain levels to be selected. The third block is a tuned, band-pass amplifier that can provide the bulk of the voltage amplification to signals that fall within the circuit's pass band.

Figure 13:
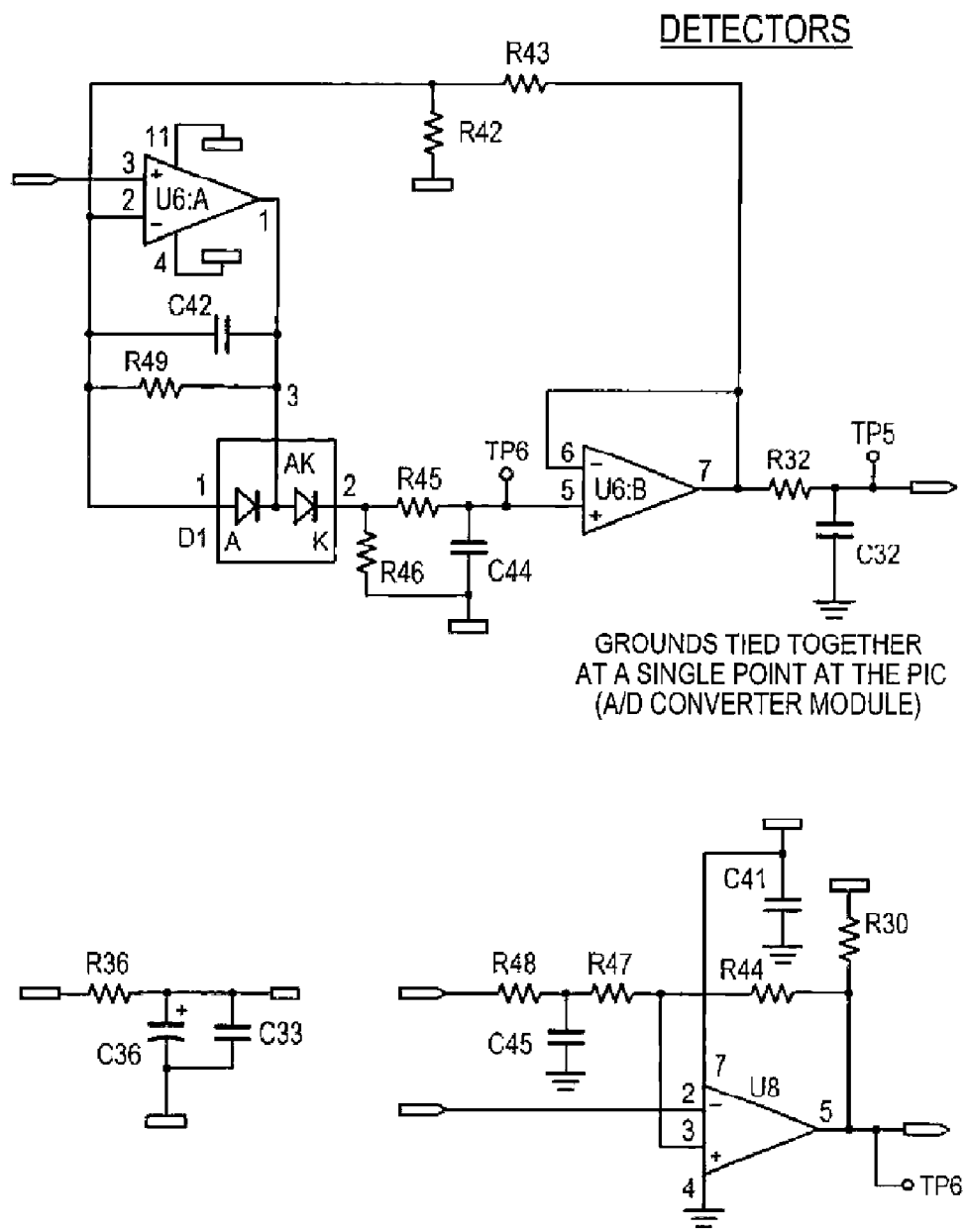

FIG. 13 depicts an exemplary embodiment of two detectors that can be used in the receiver. The first detector is a rectifying, envelope detector with integral voltage gain, and can be used to strip modulation frequency and provide a signal envelope to the microcontroller's analog to-digital converter. The signal envelope can be used the by microcontroller to determine the magnitude of the received signal. The second detector is a voltage comparator, which can be used to "square up" received pulses and convert them to a CMOS logic level, thereby allowing the microcontroller to extract digital data from the received signals.

Figure 14:
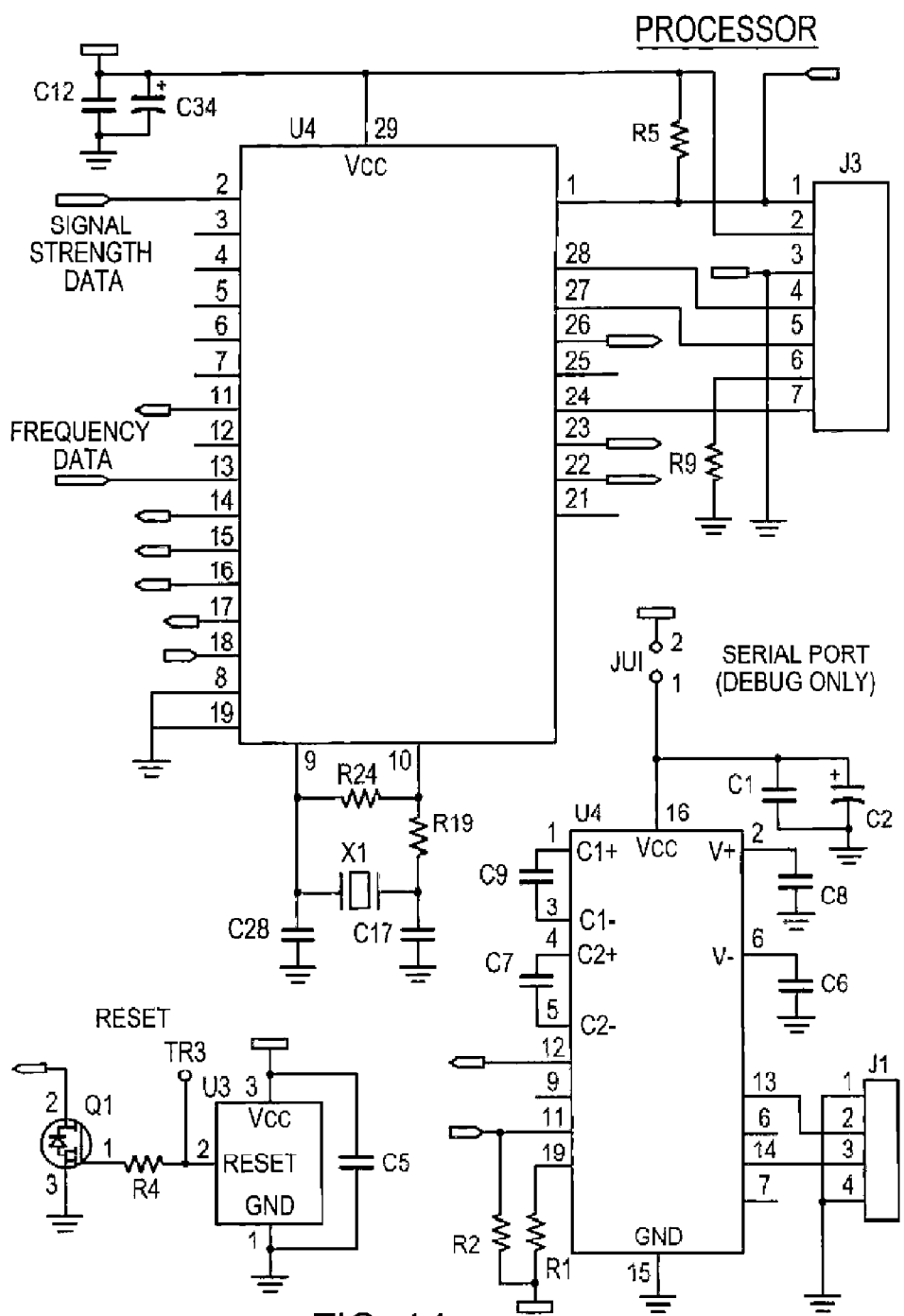

Lastly, FIG. 14 illustrates the microcontroller and its peripherals. The peripherals can include a clock oscillator, ICSP port, voltage supervisor/reset generator, and RS-232 level serial port for interfacing with a host personal computer or a main robot processor.

Accordingly, the navigation system can be operationally robust and adapted to compensate for variances in infrared energy. For example, if the autonomous vehicle is operating in an environment with high base infrared readings (e.g., a space with a large number of fluorescent lighting fixtures or windows that allow entry of sunlight), the autonomous vehicle can distinguish the infrared signals generated by the transmitter from the infrared noise present in the space. Similarly, the receiver can distinguish between other off-band signals, such as infrared remote controls. In such cases, establishing an initial threshold value of infrared energy and emitting a predefined, known, modulated infrared signal from the transmitter overcomes these environmental disturbances. Additionally, the transmitter can be tuned to emit a sufficiently strong infrared signal to accommodate surfaces with varied reflectivity.

FIGS. 15A-15C illustrate side, bottom, and end views, respectively, of an exemplary embodiment of a transmitter 200 having a thin rectangular housing and configured for placement in a variety of locations including a top surface of a doorway as illustrated in FIGS. 2, 6, 17, and 18. In the illustrated embodiment, an emitter 222, 224 is located adjacent each edge $E_L$, $E_R$ of the transmitter 200. In accordance with certain embodiments of the present teachings, each emitter can comprise a lens 222d, 224d as described above to focus and direct the emitted signal. The present teachings also contemplate the transmitter 200 comprising a third emitter 226 with a lens 226d to focus and direct the emitted signal. The illustrated transmitter 200 also comprises a battery 230 and a printed circuit board 240. As discussed above, the battery 230 can provide power to the transmitter 200 while allowing the transmitter 200 to be located without regard to proximity of power supplies such as wall outlets. Other portable power sources such as capacitors can also be used instead of, or in addition to, the battery. The printed circuit board 240 can be employed to modulate and code the emitted signals, and to provide power conversion for wirelessly charging the battery 230 or other power source. An antenna 250 can be utilized to intercept fields for conversion to current for wirelessly charging the battery, as described in more detail below.

Figure 23:
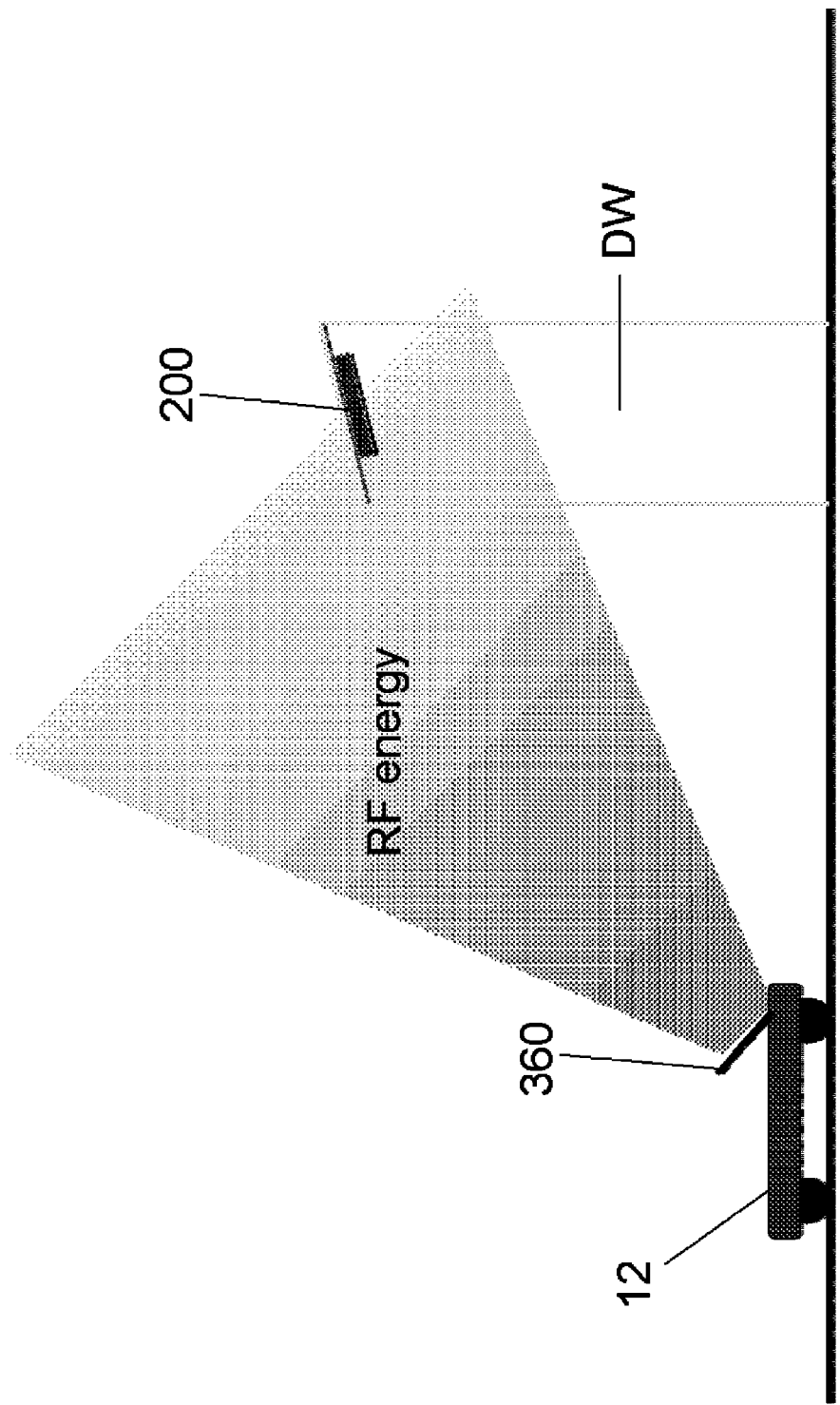
FIG. 23 schematically illustrates an embodiment of a system in accordance with the present teachings.

Wireless charging in accordance with the present teachings can comprise, for example, RF scavenging or magnetoresonance. Wireless charging via RF scavenging can be accomplished as disclosed in U.S. Patent Publication No. 2009/0102296, the entire disclosure of which is incorporated herein by reference. The antenna 250 (e.g., a RF wireless communication antenna) can facilitate both energy harvesting and wireless communication for the transmitter 200 and, to facilitate energy harvesting, can harvest RF energy from a variety of sources including, for instance, medium frequency AM radio broadcast, very high frequency (VHF) FM radio broadcast, cellular base stations, wireless data access points, etc. The energy can be harvested from that naturally available in the environment (work area) or can be broadcast by a source such as an RF signal emitter on the autonomous vehicle or on another device such as a base station or a dedicated emitter. FIG. 23 schematically illustrates an embodiment of the present teachings wherein an autonomous vehicle 12 includes a RF signal emitter 360 that directs an RF signal toward the transmitter 200 for harvesting to ensure adequate RF energy for recharging the battery 230 or other power source. The printed circuit board 240 can serve to convert the harvested RF energy into a usable form, for example AC voltage or DC voltage. The printed circuit board 240 can also regulate the converted power.

Certain embodiments of the present teachings contemplate wireless charging via strongly coupled magnetic resonances, or magnetoresonance. Such wireless charging is described in detail in Kurs, et al., *Wireless Power Transfer via Strongly Coupled Magnetic Resonances*, Science, Vol. 317, pp. 83-86 (Jul. 6, 2008), the entire disclosure of which is incorporated herein by reference. For wireless charging via magnetoresonance, the antenna 250 can comprise, for example, a capture coil that can capture and convert magnetic energy to AC voltage or DC voltage. The magnetic energy captured by the capture coil can be supplied by a power source such as a highly resonant magnetic source. The power source can be located, for example, on the autonomous vehicle (in a scenario such as that illustrated in FIG. 23), on a dedicated device, or on a base station for the autonomous vehicle.

One skilled in the art will appreciate that the transmitter 200 can derive its power from a source other than a battery, for example from a wall plug or by direct connection to a building's power supply. Also, the emitters can have differing locations on the transmitter, and need not be combined with a lens as illustrated. The size of the transmitter can vary in accordance with functional considerations (e.g., being large enough to house its components) as well as aesthetic considerations (e.g., minimizing size to be less obtrusive).

FIGS. 16A-16C illustrate side, bottom, and end views, respectively, of another exemplary embodiment of a transmitter 300 having a thin rectangular housing and configured for placement in a variety of locations including a top surface of a doorway as illustrated in FIGS. 2, 6, 17, and 18. In the illustrated embodiment, an emitter 322, 324 is located adjacent each edge of the transmitter 300. In accordance with certain embodiments of the present teachings, each emitter can comprise a collimator 322e, 324e and a lens 324d (see FIG. 16C) as described above to focus and direct the emitted signal. Although a third emitter is not illustrated in this embodiment, the transmitter can comprise at least one additional emitter and can employ a lens and/or collimator thereon to focus and direct the emitted signal. The illustrated exemplary transmitter 300 also comprises a battery 330 and a printed circuit board 340. As discussed above, the battery 330 can provide power to the transmitter 300 while allowing the transmitter 300 to be located without regard to proximity of power supplies such as wall outlets. The printed circuit board 340 can be employed to modulate and code the emitted signals, and to provide power conversion for wirelessly charging the battery 330 or other power source. An antenna 350 can be utilized to intercept magnetic or RF fields for conversion to current for wirelessly charging the battery 330, as described above with respect to FIG. 15.

One skilled in the art will appreciate that the transmitter 300 can derive its power from a source other than a battery, for example from a wall plug or by direct connection to a building's power supply. Also, the emitters can have differing locations on the transmitter, and need not be combined with a collimator and/or a lens as illustrated. The size of the transmitter can vary in accordance with functional considerations (e.g., being large enough to house its components) as well as aesthetic considerations (e.g., minimizing size to be less obtrusive).

FIG. 17 illustrates a transmitter 200 mounted on a top surface T of a doorway DW or other passage between two areas. In the illustrated embodiment, because the transmitter 200 is placed at a high position within the room or work area, the emitted signals should not be directed upward toward the ceiling and instead should be directed toward the portion of the room through which the autonomous vehicle 12 travels. In accordance with various embodiments, the emitted signals can be coded and modulated as discussed above, so that the autonomous vehicle 12 can recognize the transmitter for localization and/or navigation purposes. In addition, in accordance with certain embodiments, the emitted signals can include information for the autonomous vehicle 12, such as information instructing the autonomous vehicle to adjust its cleaning behavior.

In embodiments of the present teachings employing more than two emitters, the signals can be utilized, e.g., with collimators or lenses, to distinguish different areas within a room. Such a configuration allows the autonomous vehicle 12 to sense its relative location within a room and adjust its cleaning behavior accordingly. For example, a signal could mark an area of the room that an autonomous vehicle would likely get stuck in. The signal could allow an autonomous vehicle to recognize the area and accordingly not enter it, even though it might otherwise be able to do so unimpeded. Alternatively or additionally, different signals could mark areas that require different cleaning behaviors (e.g., due to carpeting or wood floors, high traffic areas, etc.).

The transmitters 200, 300 as illustrated in FIGS. 15A-15C and FIGS. 16A-16C, respectively, can function in a manner similar to transmitter 120 in FIG. 2, as described above, with the additional emitter(s) allowing more functionality, as described above, such as indicating areas requiring different cleaning behaviors. The transmitters 200, 300 can also function in a manner similar to the transmitters illustrated in FIG. 6, and particularly those located within the doorway/room transitions in FIG. 6.

Figure 18:
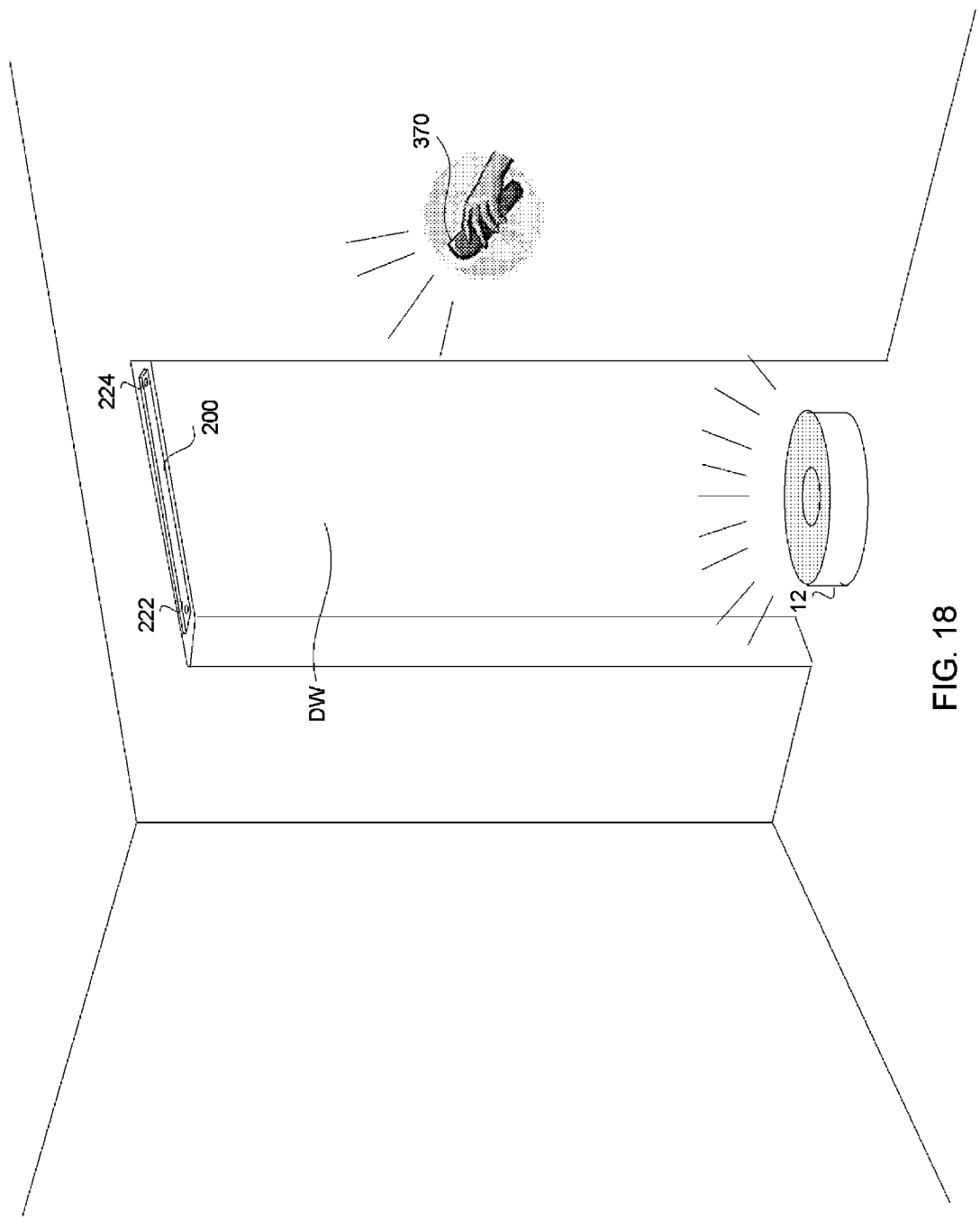
FIG. 18 also illustrates the transmitter of FIGS. 15A-15C used in a doorway.

FIG. 18 illustrates the autonomous vehicle of FIG. 17 passing through a doorway DW, and additionally illustrates an exemplary embodiment of the present teachings utilizing a remote control 370 to communicate with the autonomous vehicle 12 and/or the transmitter 200. An exemplary embodiment of a remote control 370 is disclosed in more detail in FIGS. 19A-22.

Figure 19C:
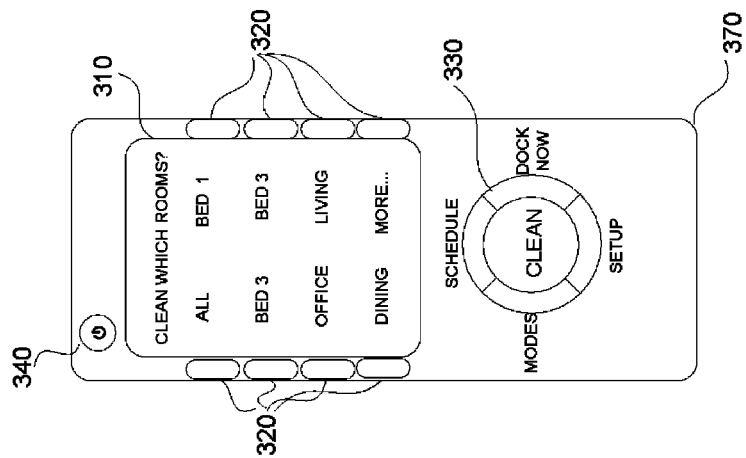
FIGS. 19A-19C illustrate exemplary embodiments of setup screens on an exemplary remote control in accordance with the present teachings.
Figure 19B:
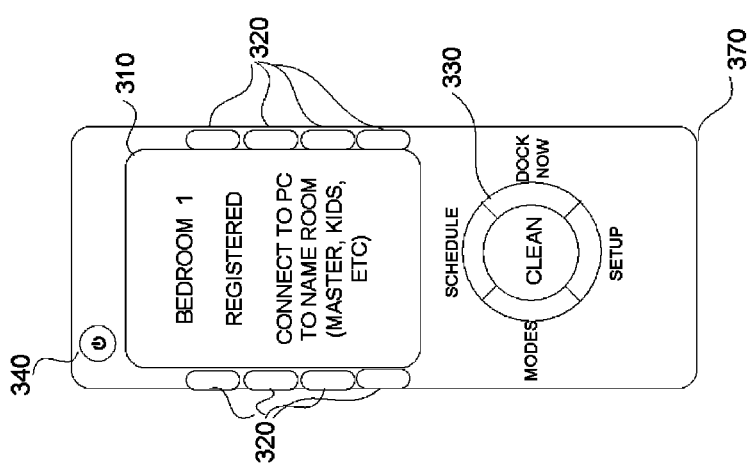
Figure 19A:
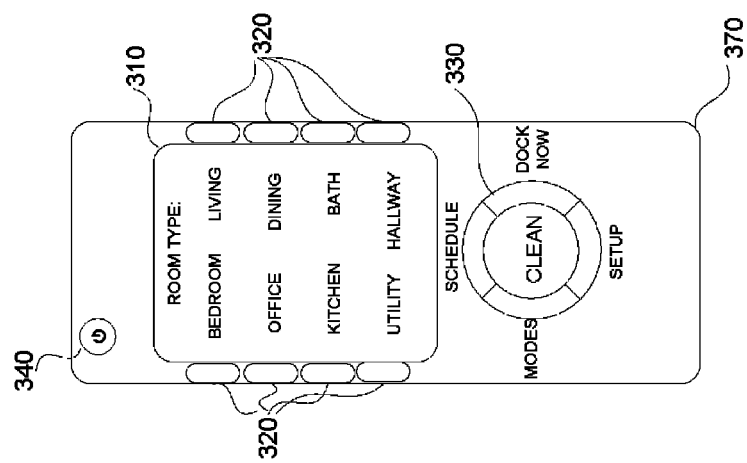

As illustrated in FIGS. 19A-19C, the remote control 370 can include one or more power buttons 340 for powering ON/OFF the remote control 370, the transmitter 200, 300, and/or the autonomous vehicle 12. In addition, the remote control 370 can include a display 310 (e.g., a liquid crystal display) and one or more input devices 320, 330 such as buttons and/or a toggle pad. FIGS. 19A-19C show the remote control 370 being used to set up an autonomous vehicle for cleaning. In FIG. 19A, the display 310 displays a variety of room types to be cleaned by the autonomous vehicle. In the illustrated embodiment, the user can locate himself and the remote control 370 in a work area to be cleaned and select from a number of room type choices, such as bedroom, office, kitchen, utility room, living room, dining room, bathroom, and hallway. The system can identify this room via an encoded and/or modulated emitted signal from a nearby transmitter. The user selects one of the room types by pressing an adjacent button 320. Thereafter, the display 310 can acknowledge the user's selection and automatically connect to a controller (see FIG. 19B), such as a personal computer, to allow the user to provide a specific name for the room. In other embodiments, the remote control can correlate the coded emitted signal with the chosen/assigned name and allow a user to choose whether to engage in specific room naming (e.g., via input 320) or just assign a predetermined name to the room such as bedroom 1, office 1, kitchen 1, etc. Once a room has been assigned an appropriate name, the remote control can allow the user to enter additional names or continue other aspects of setup. In FIG. 19C, the remote control 370 displays the rooms that have been registered and allows the user to select which rooms are to be cleaned. In the illustrated exemplary embodiment, the user can select one or more of the registered rooms by pressing an adjacent button 320. The system can then determine the order of the rooms to be cleaned and the start time (e.g., immediately), or can allow the user to determine the order of the rooms to be cleaned and/or the start time. In certain embodiments, the system can allow the user to select a start time for each selected room.

Another input device 330, shown in the illustrated embodiment as a toggle pad or toggle button, can allow the user to direct the autonomous vehicle to perform a number of functions. For example, the user can press a center "CLEAN" portion of the toggle button to direct the autonomous vehicle to begin cleaning immediately, or can select the right "DOCK NOW" button to direct the autonomous vehicle to begin a homing behavior and dock. A top "SCHEDULE" button can be pressed to allow the user to select a schedule of rooms and/or times for cleaning, an exemplary process for which is illustrated in FIGS. 20A-20C. The user can also select the left "MODES" button to select among a variety of available cleaning modes such as spot clean, deep clean, area rug, drive now, etc. as illustrated in FIG. 21A. The modes displayed in FIG. 21A can be selected by pressing a button 320 adjacent a desired mode. In certain embodiments, after a mode has been selected, the remote control 370 can provide further instructions to the user. For example, if an "area rug" mode has been selected, the remote control 370 can display instructions confirming that the autonomous vehicle is in "area rug" mode and instructing the user to place the autonomous vehicle on the area rug and then press the central "CLEAN" button. In the illustrated embodiment of FIG. 21B, the remote control 370 confirms that the "ROBOT WILL CLEAN THE RUG ONLY." In another example, if a "DRIVE NOW" mode is selected, the remote control 370 can allow the user to drive the vehicle. In accordance with FIG. 21C, the remote control 370 can inform the user that the autonomous vehicle is in a "DRIVE NOW MODE" and instruct the user to press certain buttons to drive the robot. For example, the top "SCHEDULE" button can be pressed to turn the autonomous vehicle forward, the left "MODES" button can be used to turn the vehicle to the left, the right "DOCK NOW" button can be used to move the vehicle to the right, and the bottom "SETUP" button can be used to move the vehicle backward. One skilled in the art will appreciate that other buttons can be used to drive the vehicle, such as a dedicated drive toggle or input buttons 320. In certain embodiments, the remote control 370 can also inform the user how to exit the "DRIVE NOW" mode, such as by pressing a portion of the toggle button 330.

FIGS. 20A-20C illustrate an exemplary embodiment of cleaning schedule displays that can be utilized when the user has pressed the top "SCHEDULE" portion of toggle button 330. In the illustrated exemplary embodiment, cleaning frequency choices are first displayed for user selection. For example, twice daily, daily, three times per week, weekly, bi-weekly, or monthly can be selected. In certain embodiments, a "CUSTOM" selection can also be made. Users select a frequency by pressing a button adjacent their preferred frequency. In accordance with certain embodiments, once a frequency has been selected or, if "CUSTOM" is selected, the remote control can display the days of the week for cleaning (see FIG. 20B). The user can select an appropriate number of desired days by pressing the button 320 adjacent those days. In addition, in accordance with certain embodiments, the user can select a time for cleaning for all selected days or a time for cleaning for each selected day. Thereafter, as illustrated in FIG. 20C, the user can be prompted by the display 310 to select one or more rooms for cleaning at the desired date and time. In accordance with various embodiments of the present teachings, a user could select "CUSTOM" and set a date and time for each room registered in accordance with FIGS. 19A-19C, or could select a predefined schedule as illustrated in FIG. 20A and personalize that selection by choosing days and times if desired.

Figure 22:
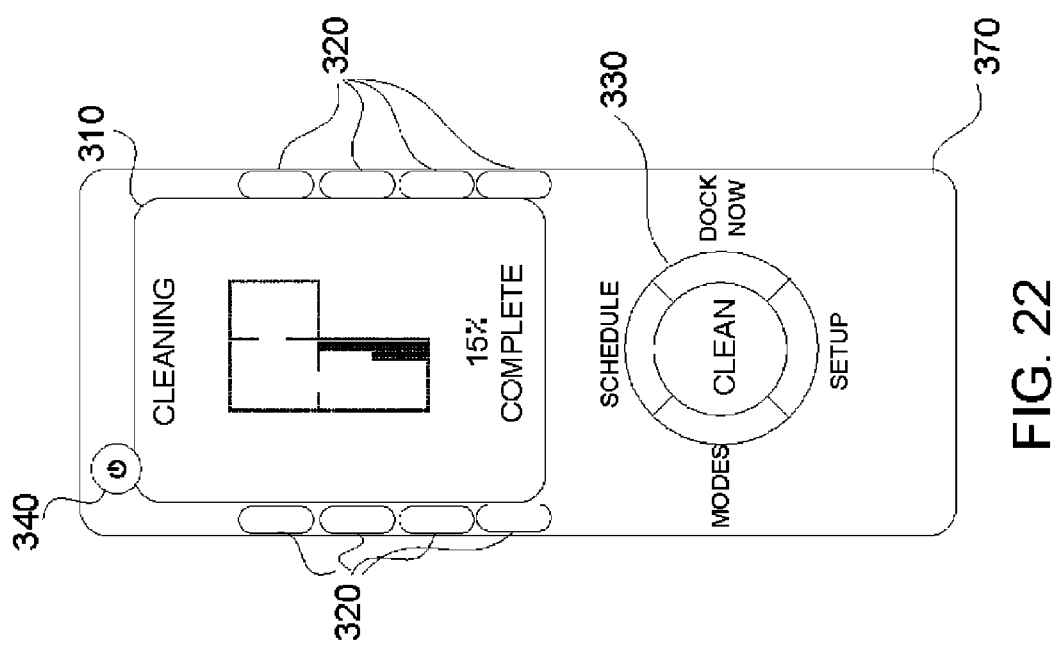
FIG. 22 illustrates exemplary embodiments of a status screen on an exemplary remote control in accordance with the present teachings.

In accordance with certain embodiments of the present teachings, the remote control 370, can also display a status screen such as that illustrated in FIG. 22. The status screen can have a variety of formats for informing the user how much of a scheduled cleaning has been completed. The status screen can be accessed in a variety of ways via manipulation of the remote control 370, or may appear in the manner of a screen saver when the remote control 370 is not being used for controlling an autonomous vehicle or inputting data. One skilled in the art will understand that the selections facilitated by the remote control 370 in FIGS. 19A-22 can also be accomplished via other devices, such as a handheld PDA, a cellular phone, or a laptop or other similar computing devices.

Other embodiments of the present teachings will be apparent to those skilled in the art from consideration of the specification and practice of the teachings disclosed herein. It is intended that the specification and examples be considered as exemplary only, with a true scope and spirit of the present teachings being indicated by the following claims.

What is claimed is:

1. A navigation control system for an autonomous vehicle, the system comprising:
    a transmitter comprising:
        a first emitter for emitting a first signal;
        a second emitter for emitting a second signal;
        a power source for powering both the first emitter and the second emitter;
        an antenna for capturing wireless energy; and
        a printed circuit board for converting the captured wireless energy to a form for charging the power source powering both the first emitter and the second emitter; and
    an autonomous vehicle operating within a working area, the autonomous vehicle having a receiving system comprising:
        a receiver for detecting the first and second signals; and
        a processor for determining a relative location of the autonomous vehicle within the working area based on the first and second signals, wherein a source of the wireless energy is located on the autonomous vehicle.

2. The system of claim 1, wherein the wireless energy is RF energy.

3. The system of claim 1, wherein the wireless energy is magnetoresonance energy.

4. The system of claim 2, wherein the antenna is an RF antenna.

5. The system of claim 3, wherein the antenna is a capture coil.

6. The system of claim 1, wherein a source of the wireless energy is located on a base station for the remote vehicle.

7. The system of claim 1, wherein the wireless energy is naturally available in an environment of the transmitter.

8. The system of claim 7, wherein the first and second signals are coded.

9. The system of claim 8, wherein the printed circuit board codes the first and second signals.

10. A method performed by an autonomous vehicle for controlling navigation within one or more work areas, the method comprising:
    receiving first and second signals emitted by first and second emitters of a transmitter, each of the first and second emitters being powered by a power source of the transmitter;
    localizing the autonomous vehicle with respect to the transmitter using the first and second signals, and, after localizing the autonomous vehicle, charging the power source of the transmitter using wireless energy; and
    navigating the autonomous vehicle within the one or more work areas using the first and second signals.

11. The method of claim 10, wherein the wireless energy is RF energy.

12. The method of claim 10, wherein the wireless energy is magnetoresonance energy.

13. The method of claim 11, wherein the transmitter comprises an RF antenna configured to capture the wireless energy.

14. The method of claim 12, wherein the transmitter comprises a capture coil configured to capture the wireless energy.

15. The method of claim 10, wherein the first and second signals are coded.

16. The method of claim 15, wherein the transmitter comprises a printed circuit board configured to code the first and second signals.

* * * * *